United States Patent
Ito et al.

(10) Patent No.: US 10,782,812 B2
(45) Date of Patent: *Sep. 22, 2020

(54) LIQUID CRYSTAL DISPLAY DEVICE

(71) Applicant: Japan Display Inc., Tokyo (JP)

(72) Inventors: Daisuke Ito, Tokyo (JP); Hiroshi Mizuhashi, Tokyo (JP); Makoto Hayashi, Tokyo (JP); Yasuyuki Teranishi, Tokyo (JP); Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 16/173,689

(22) Filed: Oct. 29, 2018

(65) Prior Publication Data
US 2019/0064982 A1    Feb. 28, 2019

Related U.S. Application Data

(63) Continuation of application No. 14/982,598, filed on Dec. 29, 2015, now Pat. No. 10,168,808.

(30) Foreign Application Priority Data

Jan. 9, 2015    (JP) .................. 2015-003701

(51) Int. Cl.
*G06F 3/041*    (2006.01)
*G02F 1/133*    (2006.01)
(Continued)

(52) U.S. Cl.
CPC ........ *G06F 3/0412* (2013.01); *G02F 1/13306* (2013.01); *G02F 1/134309* (2013.01);
(Continued)

(58) Field of Classification Search
CPC ....... G06F 3/0412; G06F 3/044; G06F 3/0416
See application file for complete search history.

(56) References Cited

U.S. PATENT DOCUMENTS 9,201,541 B2    12/2015   Kida et al.
9,442,596 B2     9/2016   Kida et al.
(Continued)

FOREIGN PATENT DOCUMENTS

JP    2011-233018       11/2011
JP    2012-221485 A     11/2012
(Continued)

OTHER PUBLICATIONS

Japanese Office Action dated Apr. 3, 2018 in corresponding Japanese Application No. 2015-003701.
(Continued)

*Primary Examiner* — Kent W Chang
*Assistant Examiner* — Chayce R Bibbee
(74) *Attorney, Agent, or Firm* — K&L Gates LLP

(57) ABSTRACT

A liquid crystal display device includes: a liquid crystal element array including liquid crystal display elements arranged in a matrix form; scan lines arranged in each row of the liquid crystal element array and configured to supply scan signals to the liquid crystal display elements arranged in a corresponding row; signal lines arranged in each column of the liquid crystal element array and configured to supply image signals to the liquid crystal display elements arranged in a corresponding column; a plurality of driving electrodes arranged in the liquid crystal element array and supplied with driving signals for detecting an external proximity object; a first voltage line of a first voltage; a second voltage line of a second voltage; and a third voltage line of a third voltage.

15 Claims, 21 Drawing Sheets

(51) Int. Cl.
  *G02F 1/1343*  (2006.01)
  *G06F 3/044*   (2006.01)
  *G09G 3/36*    (2006.01)
  *G02F 1/1333*  (2006.01)

(52) U.S. Cl.
  CPC ............ *G06F 3/044* (2013.01); *G06F 3/0416* (2013.01); *G09G 3/3674* (2013.01); *G09G 3/3696* (2013.01); *G02F 1/13338* (2013.01)

(56) References Cited

U.S. PATENT DOCUMENTS

| | | | |
|---|---|---|---|
| 9,804,711 B2 | 10/2017 | Noguchi et al. | |
| 9,927,937 B2 | 3/2018 | Noguchi et al. | |
| 10,133,437 B2 | 11/2018 | Noguchi et al. | |
| 10,168,808 B2 | 1/2019 | Ito et al. | |
| 10,324,579 B2 | 6/2019 | Noguchi et al. | |
| 2010/0302202 A1 | 12/2010 | Takeuchi et al. | |
| 2012/0262387 A1* | 10/2012 | Mizuhashi | G06F 3/0412 345/173 |
| 2013/0187887 A1 | 7/2013 | Hiroshi et al. | |
| 2014/0362042 A1 | 12/2014 | Noguchi et al. | |
| 2016/0364049 A1 | 12/2016 | Kida et al. | |
| 2019/0064982 A1 | 2/2019 | Ito et al. | |
| 2019/0250743 A1 | 8/2019 | Noguchi et al. | |

FOREIGN PATENT DOCUMENTS

| | | |
|---|---|---|
| JP | 2012-230657 A | 11/2012 |
| JP | 2014-132446 A | 7/2014 |
| JP | 2016-129002 | 7/2016 |
| KR | 10-2014-0144651 A | 12/2014 |

OTHER PUBLICATIONS

Notification of Reasons for Refusal (with English translation) dated Jan. 17, 2017 in corresponding Korean Application No. 10-2016-0001647 (20 pages).

Notice of Reasons for Refusal dated Oct. 29, 2019 in corresponding Japanese Application No. 2019-028800.

* cited by examiner

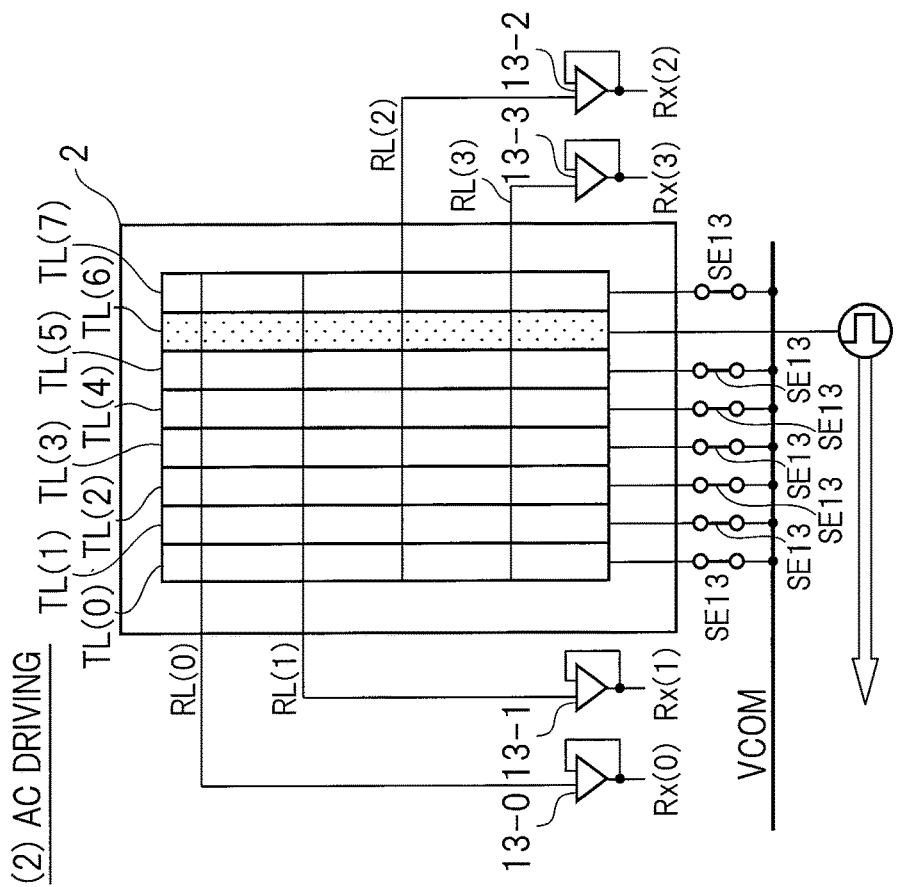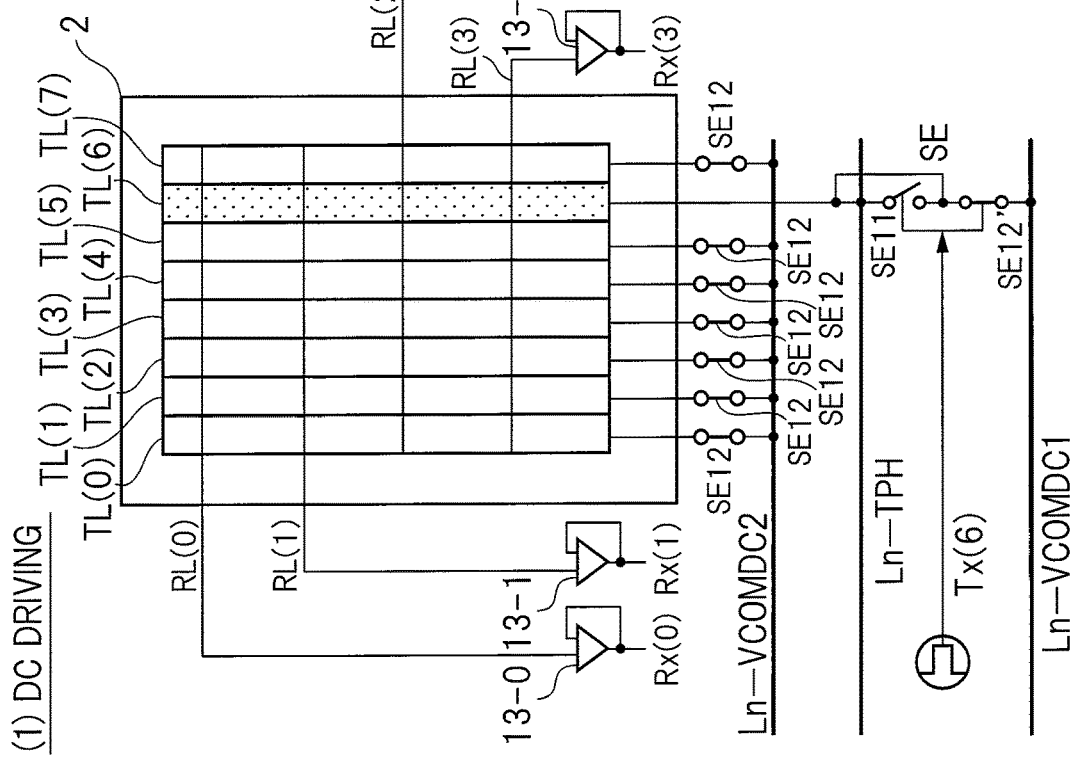

LIQUID CRYSTAL DISPLAY DEVICE

CROSS REFERENCES TO RELATED APPLICATIONS

The present application is a continuation application of U.S. patent application Ser. No. 14/982,598, filed Dec. 29, 2015, which claims priority to Japanese Priority Patent Application JP 2015-003701 filed in the Japan Patent Office on Jan. 9, 2015, the entire content of which is hereby incorporated by reference.

BACKGROUND

The present invention relates to a liquid crystal display device, and more particularly, to a liquid crystal display device having a touch detection function capable of detecting an external proximity object.

Recently, a touch detection device capable of detecting an external proximity object, which is called a touch panel, has attracted attention. The touch panel is mounted or integrated on a display device such as a liquid crystal display device. As such, the liquid crystal display device in which the touch panel is mounted or integrated on the display device, that is, the liquid crystal display device having the touch detection function, displays various button images or the like on the display device and detects the proximity of an external object to the button images through the touch panel. As a result, the touch panel can be used as means of data input, instead of usual mechanical buttons. Since such a liquid crystal display device having the touch detection function does not necessarily require means of data input, such as a keyboard or a mouse, the use of the liquid crystal display device tends to expand even in a portable information terminal such as a mobile phone, as well as a computer.

As a detection method of the touch detection device, there are several methods such as an optical type, a resistance type, and a capacitance type. Among the methods, since the capacitance type touch detection device has a relatively simple structure and has a low power consumption, the capacitance type touch detection device is used in a portable information terminal or the like. The capacitance type touch detection device is disclosed in Japanese Patent Application Laid-Open Publication No. 2012-230657 (Patent Document 1).

In addition, in the liquid crystal display device, there is a growing demand for an increase in a size of a display surface and a high definition. Accordingly, there is a demand for an increase in size and a high precision in the touch panel. Furthermore, it is required to narrow a frame so as to achieve the increase in the size of the display surface while suppressing the increase in the size of the liquid crystal display device. In other words, it is required to narrow a frame that surrounds the display surface of the liquid crystal display device.

SUMMARY

In the capacitance type touch detection device, as illustrated in, for example, Patent Document 1, the proximity of the external object is detected by using the fact that a value of a capacitance in an intersection portion in which a driving electrode and a detection electrode intersect with each other is changed by the proximity (including a contact) of the external object such as a finger. In other words, the proximity of the external object is detected based on a detection signal generated in the detection electrode when a driving signal is supplied to the driving electrode. In the touch detection device, each of the driving electrode and the detection electrode is plurally provided. The plurality of driving electrodes are sequentially arranged in a column direction, and the plurality of detection electrodes are sequentially arranged in a row direction so as to intersect with the plurality of driving electrodes.

In order to achieve the increase in the size of the touch panel and the high precision of the touch panel, it is preferable to increase a speed of a change in the voltage of the driving electrode which is generated by the driving signal. On the other hand, a circuit for forming the driving signal is formed in a region corresponding to a frame. When attempting to increase the speed of the change in the voltage of the driving electrode while suppressing the increase of the frame, the deterioration of the characteristics related to the touch detection is concerned.

An object of the present invention is to provide a liquid crystal display device having a touch detection function capable of suppressing an increase of a frame and improving characteristics of a touch detection.

A liquid crystal display device according to an aspect of the present invention includes: a liquid crystal element array including a plurality of liquid crystal display elements arranged in a matrix form; a plurality of scan lines arranged in each row of the liquid crystal element array and configured to supply scan signals to the plurality of liquid crystal display elements arranged in a corresponding row; a plurality of signal lines arranged in each column of the liquid crystal element array and configured to supply image signals to the plurality of liquid crystal display elements arranged in a corresponding column; a plurality of driving electrodes arranged in the liquid crystal element array and supplied with driving signals for detecting an external proximity object;

a first voltage line configured to supply a first voltage; a second voltage line configured to supply a second voltage different from the first voltage; and a third voltage line being a voltage line different from the first voltage line and the second voltage line and configured to supply a third voltage. In a period of detecting the external proximity object, a selected driving electrode among the plurality of driving electrodes is alternately electrically connected to the first voltage line and the second voltage line, and the selected driving electrode is supplied with the driving signal, and unselected driving electrodes among the plurality of driving electrodes are electrically connected to the third voltage line.

Further, a liquid crystal display device according to another aspect of the present invention includes: a liquid crystal element array including a plurality of liquid crystal display elements arranged in a matrix form; a plurality of driving electrodes arranged in the liquid crystal element array and supplied with driving signals for detecting an external proximity object; a voltage line configured to supply a voltage in a period of detecting the external proximity object; a driving signal forming circuit configured to form a plurality of driving signals respectively corresponding to the plurality of driving electrodes; and a determination circuit configured to determine a selected driving electrode among the plurality of driving electrodes, based on the plurality of driving signals in a period of detecting the external proximity object, supply a driving signal formed by the driving signal forming circuit to a driving electrode determined as the selected driving electrode, and electrically connect driving electrodes, which are determined as unselected electrodes, to the voltage line.

Additional features and advantages are described herein, and will be apparent from the following Detailed Description and the figures.

BRIEF DESCRIPTION OF THE FIGURES

FIGS. 17A and 17B are diagrams schematically illustrating an arrangement of common electrodes;

DETAILED DESCRIPTION

Figure 1:
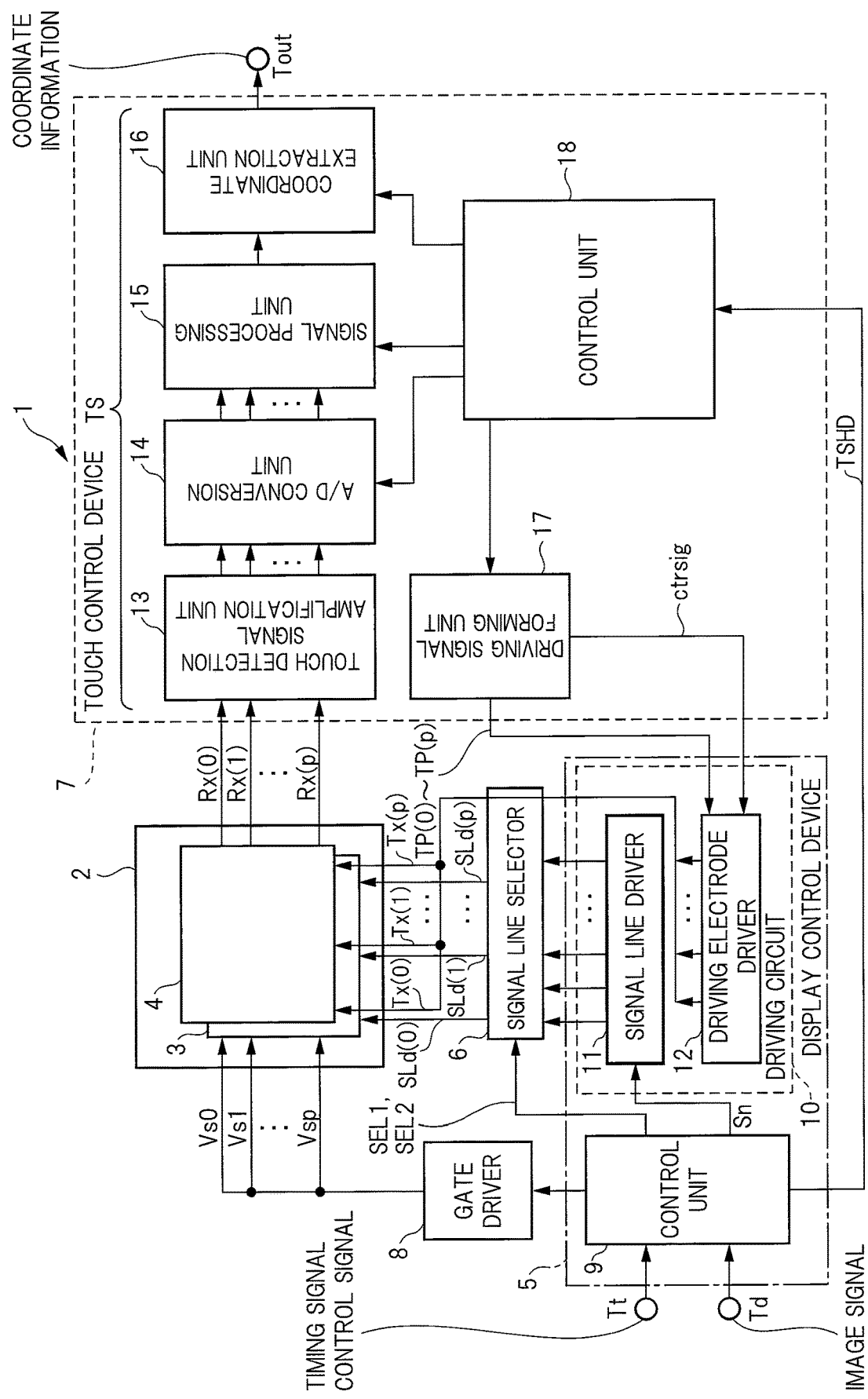
FIG. 1 is a block diagram illustrating a configuration of a liquid crystal display device having a touch detection function according to a first embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Before describing specific embodiments with reference to the drawings, the matters examined by the inventors of the present invention will be described prior to the present invention. As a capacitance type touch detection method, there are a plurality of methods. Here, the examined matters will be described, taking an example in which a mutual capacitance method is adopted as the touch detection method in an embodiment to be described below. In addition, in the present specification, the following description will be given of an example in which a touch detection device is applied to an in-cell type liquid crystal display device having a touch detection function which is integrated with a display device. Here, the in-cell type liquid crystal display device having the touch detection function means a liquid crystal display device having a touch detection function, in which at least one of a driving electrode and a detection electrode included in the touch detection device is provided between a pair of substrates facing each other through liquid crystals of the display device. Specifically, a case where the driving electrode included in the touch detection device is also used as the driving electrode for driving the liquid crystals will be described. Since the driving electrode is shared as a driving electrode for a touch detection and a driving electrode for a liquid crystal display, the driving electrode may also be referred to as a common electrode in the following description.

Basic Principle of Capacitance Type Touch Detection (Mutual Capacitance Method)

Figure 2A:
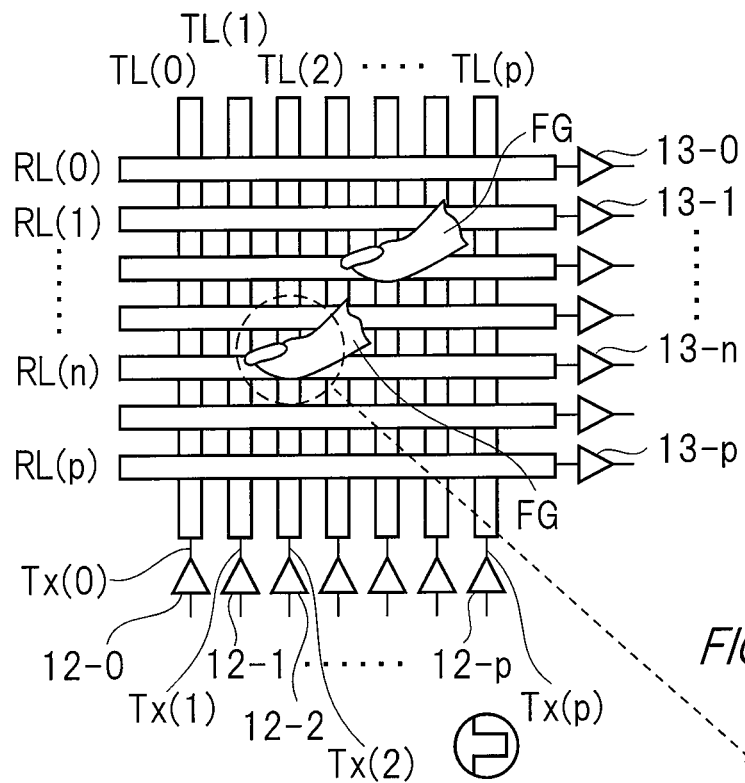
FIGS. 2A to 2C are explanatory diagrams for describing a basic principle of a capacitance type touch detection (mutual capacitance method)
Figure 2B:
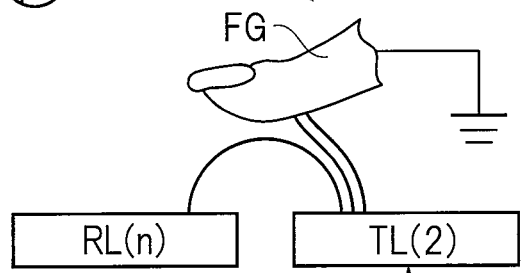
Figure 2C:
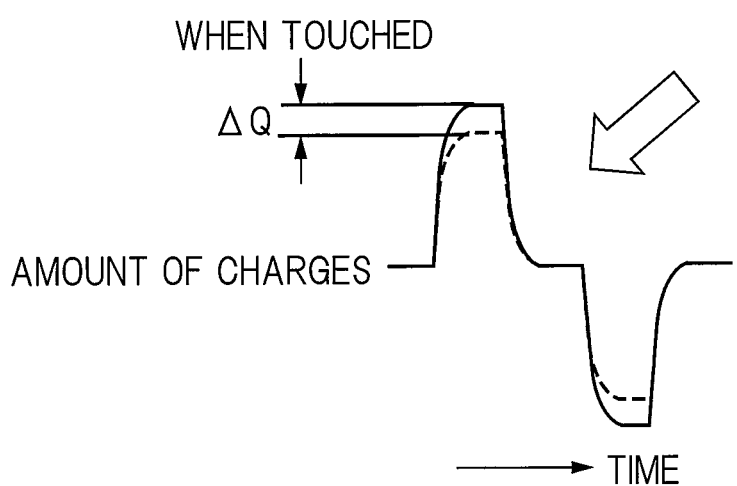

First, a basic principle of a mutual capacitance method will be described. FIGS. 2A to 2C are schematic diagrams for describing a basic principle of a capacitance type touch detection adopted in an embodiment. In FIG. 2A, TL(0) to TL(p) are common electrodes provided in a liquid crystal panel, and RL(0) to RL(p) are detection electrodes provided in a touch detection panel unit. In FIG. 2A, the common electrodes TL(0) to TL(p) extend in a column direction and are arranged in parallel in a row direction. In addition, the detection electrodes RL(0) to RL(p) extend in the row direction and are arranged in parallel in the column direction so as to intersect with the common electrodes TL(0) to TL(p). The detection electrodes RL(0) to RL(p) are formed above the common electrodes TL(0) to TL(p)(that is, on the detection surface side) so that a gap is formed between the detection electrodes RL(0) to RL(p) and the common electrodes TL(0) to TL(p).

In FIG. 2A, each of 12-0 to 12-p schematically represents a unit driving electrode driver. In the same drawing, driving signals Tx(0) to Tx(p) are output from the unit driving electrode drivers 12-0 to 12-p. In addition, each of 13-0 to 13-p schematically represents a unit amplification unit. In FIG. 2A, a pulse signal encircled by a solid line represents a waveform of the driving signal Tx(i). As an external object, a finger is represented as FG in the same drawing.

In the example of FIGS. 2A to 2C, the pulse signal is supplied to the common electrode TL(2) as the driving signal Tx(2) from the unit driving electrode driver 12-2. By supplying the driving signal Tx(2) serving as the pulse signal to the common electrode TL(2), as illustrated in FIG. 2B, an electric field is generated between the common electrode TL(2) and the detection electrode RL(n) intersecting therewith. In this case, when the finger FG touches a position that is in close proximity to the common electrode TL(2) of the liquid crystal panel, an electric field is also generated between the finger FG and the common electrode TL(2), and an electric field generated between the common electrode TL(2) and the detection electrode RL(n) is reduced. Therefore, an amount of charges between the common electrode TL(2) and the detection electrode RL(n) is reduced. As a result, as illustrated in FIG. 2C, in the case of the touch of the finger FG, an amount of charges generated in response to the supply of the driving signal Tx(2) is reduced by ΔQ as compared with the case of non-touch of the finger FG. A difference in the amount of charges is expressed in a detection signal Rx(n) as a voltage difference. The difference in the amount of charges is supplied to the unit amplification unit 13-n and is then amplified.

In FIG. 2C, a horizontal axis represents a time and a vertical axis represents an amount of charges. The amount of charges increases (in the same drawing, increases to an upper side) in response to a voltage rise of the driving signal Tx(2), and the amount of charges increases (in the drawing, increases to a lower side) in response to a voltage fall of the driving signal Tx(2). In this case, the increasing amount of charges is changed according to the presence or absence of the touch of the finger FG. In addition, in this drawing, the reset of the amount of charges is performed after the increase to the upper side and before the increase to the lower side. Similarly, the reset of the amount of charges is performed after the increase to the lower side and before the increase to the upper side. In this manner, the amount of charges is changed up and down based on the reset amount of charges.

By sequentially supplying the driving signals Tx(0) to Tx(p) to the common electrodes TL(0) to TL(p), the detection signals Rx(0) to Rx(p) having a voltage value according to whether the finger FG touches a position that is in close proximity to each intersection portion are output from each of the plurality of detection electrodes RL(0) to RL(p) intersecting with the common electrodes to which the driving signals Tx(i) are supplied. At the time when the difference ΔQ occurs in the amount of charges, each of the detection signals Rx(0) to Rx(p) is sampled and converted into a digital signal by using an analog/digital conversion circuit (hereinafter, referred to as an A/D conversion circuit). Coordinates of the touched position are extracted by processing the digital signal converted by the A/D conversion circuit.

Matters Examined by Inventors of Present Invention

Method of Arranging and Driving Common Electrode

Figure 16B:
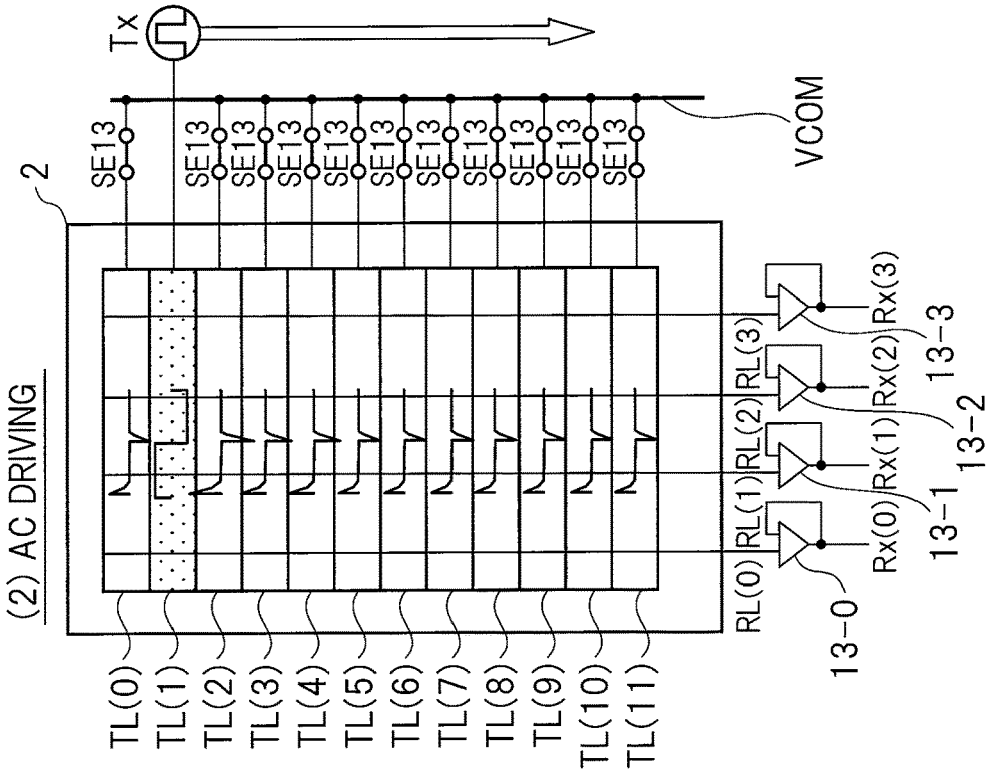
FIGS. 16A and 16B are diagrams schematically illustrating an arrangement of common electrodes.
Figure 16A:
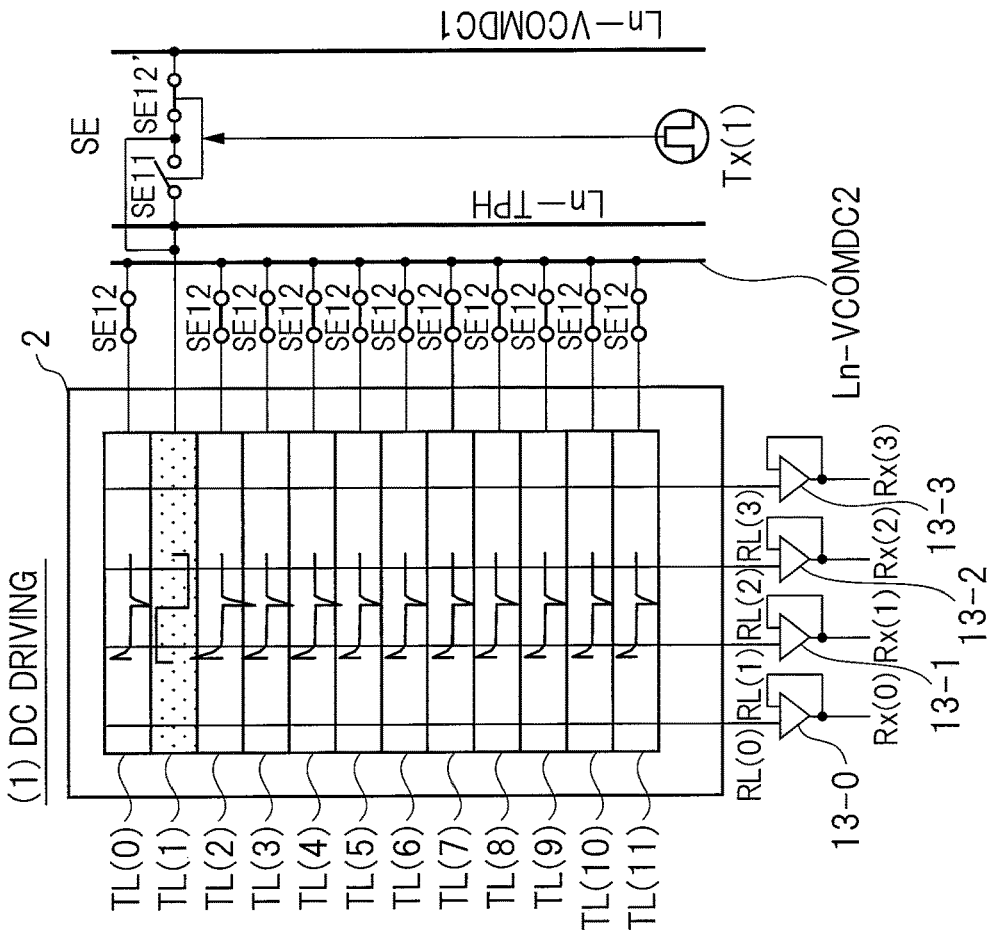

Although described below, a liquid crystal panel includes a plurality of liquid crystal display elements arranged in a matrix form, and a plurality of signal lines through which image signals to be displayed on the liquid crystal elements are supplied. Two kinds of arranging methods are considered according to a method of arranging the signal lines and the common electrodes. That is, a method of arranging the signal lines and the common electrodes so as to intersect with one another (hereinafter, referred to as a horizontal COM arrangement) and a method of arranging the signal lines and the common electrodes so as to be parallel to one another (hereinafter, referred to as a vertical COM arrangement) are considered. FIGS. 16A and 16B schematically illustrate an example of a horizontal COM arrangement, and FIGS. 17A and 17B schematically illustrate an example of a vertical COM arrangement. The horizontal COM arrangement and the vertical COM arrangement will be described below with reference to FIGS. 16A to 17B.

In FIGS. 16A and 16B, 2 represents the liquid crystal panel, TL(0) to TL(11) represent the common electrodes, and RL(0) to RL(3) represent the detection electrodes. Although not illustrated in the same drawing, signal lines are arranged to be parallel to the detection electrodes RL(0) to RL(3). That is, the signal lines are arranged to intersect with the common electrodes TL(0) to TL(11). In addition, in FIGS. 16A and 16B, 13-0 to 13-3 represent unit amplification units.

In addition, in FIGS. 17A and 17B, 2 represents the liquid crystal panel, TL(0) to TL(7) represent the common electrodes, and RL(0) to RL(3) represent the detection electrodes. In this case, signal lines (not illustrated) are arranged to be parallel to the common electrodes TL(0) to TL(7). In addition, in the same drawing, 13-0 to 13-3 represent unit amplification units.

In addition, the liquid crystal panel is controlled such that a period in which a display is performed (hereinafter, referred to as a display period) does not temporally overlap a period in which a touch or an external proximity object is detected (hereinafter, referred to as a touch detection period). When the description is given focusing on the common electrodes, driving signals for the display are supplied to the common electrodes in the display period, and driving signals for the touch detection are supplied to the common electrodes in the touch detection period.

In the touch detection period, the common electrode arranged at the position where the touch is detected is selected from the plurality of common electrodes, and a voltage of the selected common electrode is changed based on the driving signal, as described above with reference to FIGS. 2A to 2C. In the touch detection period, the common electrode changing the voltage thereof based on the driving signal is referred to as the selected common electrode in the present specification. On the other hand, in the touch detection period, the common electrode arranged at the position where the touch is not detected is unselected. In other words, the voltage of the common electrode that is unselected (hereinafter, referred to as the unselected common electrode) is not changed in the touch detection period.

In the touch detection period, two kinds of driving methods are considered as the driving method of changing the voltage of the selected common electrode based on the driving signal. That is, a driving method of selectively supplying a high level voltage and a low level voltage to the selected common electrode through a switch by providing the switch for each common electrode and controlling the switch provided at the selected common electrode by the driving signal, (hereinafter, also referred to as a DC driving) and a driving method of changing the voltage of the selected common electrode by applying the driving signal to the selected common electrode and directly charging and discharging the selected common electrode using the voltage of the driving signal (hereinafter, also referred to as an AC driving) are considered. FIGS. 16A and 17A illustrate an example of the DC driving, and FIGS. 16B and 17B illustrate an example of the AC driving. Next, the DC driving and the AC driving will be described with reference to FIGS. 16A to 17B. In the case of the DC driving, the voltage of the selected common electrode is changed by selectively turning on/off the switch by the driving signal. Therefore, in the following description, in the DC driving, the driving signal that turns on/off the switch is also referred to as a selection signal.

FIG. 16A illustrates a state in which the common electrode TL(1) is designated as the selected common electrode and the remaining common electrodes TL(0) and TL(2) to TL(11) are designated as the unselected common electrodes. In addition, FIG. 17A illustrates a state in which the common electrode TL(6) is designated as the selected common electrodes and the remaining common electrodes TL(0) to TL(5) and TL(7) are designated as the unselected common electrodes.

In FIG. 16(A), Ln-TPH represents a voltage line through which a high level voltage TPH is supplied, and Ln-VCOMDC1 and Ln-VCOMDC2 represent voltage lines through which a low level voltage VCOMDC is supplied. Switches SE respectively corresponding to the common electrodes TL(0) to TL(11) are connected between the voltage lines Ln-TPH and Ln-VCOMDC1. In FIG. 16(A), among the switches SE respectively corresponding to the common electrodes TL(0) to TL(11), the configuration of only the switch SE corresponding to the common electrode TL(1) is explicitly illustrated and described, and the configurations of the switches SE corresponding to the common electrodes TL(0) and TL(2) to TL(11) are merely described, but not explicitly illustrated. When describing the explicitly illustrated switch SE as an example, in the switch SE, one terminal of a switch SE11 is connected to one terminal of a switch SE12', the other terminal of the switch SE11 is connected to the voltage line Ln-TPH, and the other terminal of the switch SE12' is connected to the voltage line Ln-VCOMDC1. A connection portion of the switch SE11 and the switch SE12' is connected to the corresponding common electrode TL(1). The switch SE11 and the switch SE12' are controlled by the driving signal (selection signal) Tx(1) so as to be complementarily turned on/off. Therefore, the selected common electrode TL(1) is connected to the voltage line Ln-TPH or the voltage line Ln-VCOMDC1 through the switch SE11 or SE12'. As a result, the common electrode TL(1) serving as the selected common electrode is charged or discharged by the voltage TPH of the voltage line Ln-TPH or the voltage VCOMDC of the voltage line Ln-VCOMDC1 according to a change in the voltage of the driving signal Tx(1), and accordingly, the voltage of the common electrode TL(1) is changed.

On the other hand, in the touch detection period, in the common electrodes TL(0) and TL(2) to TL(11) designated as the unselected common electrodes, the switches SE12 respectively corresponding thereto are controlled to be in an ON state. In this case, the switch SE12 corresponding to the common electrode TL(1) is turned off. Therefore, each of the common electrodes TL(0) and TL(2) to TL(11) serving as the unselected common electrodes is connected to the voltage line Ln-VCOMDC2.

Even in the vertical COM arrangement illustrated in FIG. 17A similar to FIG. 16A, the common electrode TL(6) serving as the selected common electrode is connected to the voltage line Ln-TPH or Ln-VCOMDC1 through the corresponding switch SE and is charged or discharged from the voltage line Ln-TPH or Ln-VCOMDC1. In addition, the unselected common electrodes TL(0) to TL(5) and TL(7) are connected to the voltage line Ln-VCOMDC2.

Next, the AC driving will be described with reference to FIGS. 16B and 17B. In the AC driving, the driving signal Tx is directly supplied to the selected common electrode (the common electrode TL(1) in FIG. 16B). In this case, the common electrodes TL(0) and TL(2) to TL(11) serving as the unselected common electrodes are connected to the voltage line VCOM through the switches SE13. In this case, the selected common electrode (common electrode TL(1)) is charged or discharged by the driving signal Tx, and accordingly, the voltage thereof is changed. The same applies to the vertical COM arrangement illustrated in FIG. 17B.

In FIGS. 16A and 16B, the change in the voltage of the selected common electrode based on the driving signal Tx(1) and the driving signal Tx and the change in the voltage of the unselected common electrode occurring due to the change in the voltage of the selected common electrode are schematically illustrated in each of the common electrodes.

A parasitic capacitance exists between the respective common electrodes TL(0) to TL(11) or TL(0) to TL(7). In addition, a parasitic capacitance also exists between the common electrodes TL(0) to TL(11) or TL(0) to TL(7) and the detection electrodes RL(0) to RL(3). Therefore, when the voltage of the selected common electrode (the common electrode TL(1) or TL(6)) is changed, the voltage change is transferred to the unselected common electrode through the parasitic capacitance and the voltage of the unselected common electrode is also changed. Since the unselected common electrode is connected to the voltage line Ln-VCOMDC2 or VCOM through the switch SE12 or SE13, the voltage rises or falls by the parasitic capacitance and is then changed toward the low level voltage VCOMDC.

Rise Time and Fall Time of Common Electrode and Detection Electrode

Figure 18A:
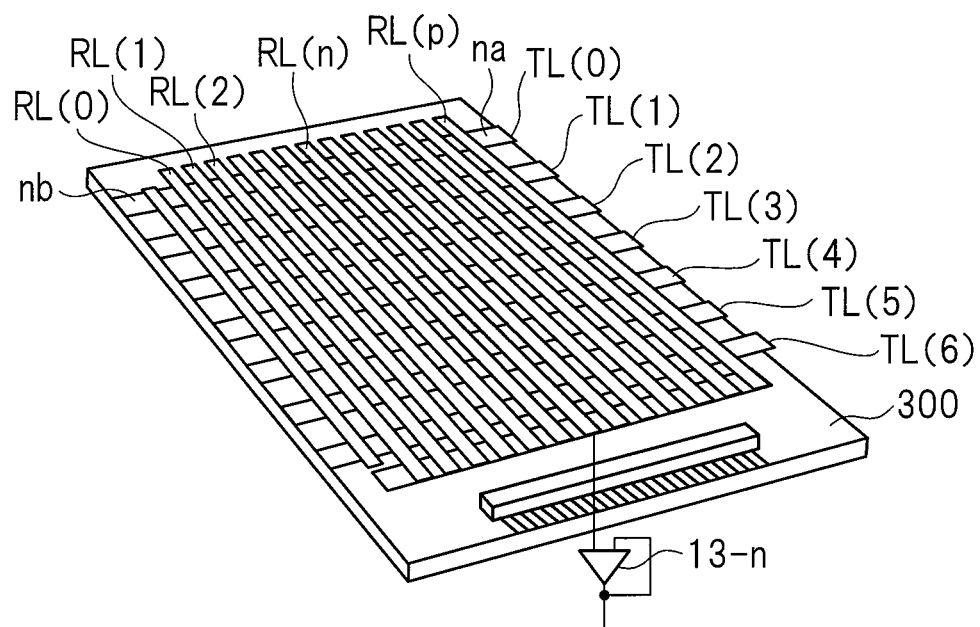
FIGS. 18A and 18B are explanatory diagrams for describing an examination from the inventors of the present invention.

The inventors of the present invention changed the voltages of the common electrodes in the liquid crystal panel of the horizontal COM arrangement illustrated in FIGS. 16A and 16B and the liquid crystal panel of the vertical COM arrangement illustrated in FIGS. 17A and 17B and examined the time until the voltage of the common electrode reached a predetermined voltage and the time until the voltage of the detection electrode reached a predetermined voltage. Here, the results of the liquid crystal panels of the horizontal COM arrangements illustrated in FIGS. 16A and 16B are shown. FIG. 18A illustrates a configuration of a module mounted with a liquid crystal panel of a horizontal COM arrangement. In FIG. 18A, 300 represents a TFT substrate, TL(0) to TL(6) represent common electrodes, RL(0) to RL(p) represent detection electrodes, and 13-n represents a unit amplification unit connected to the detection electrode RL(n).

Figure 19A:
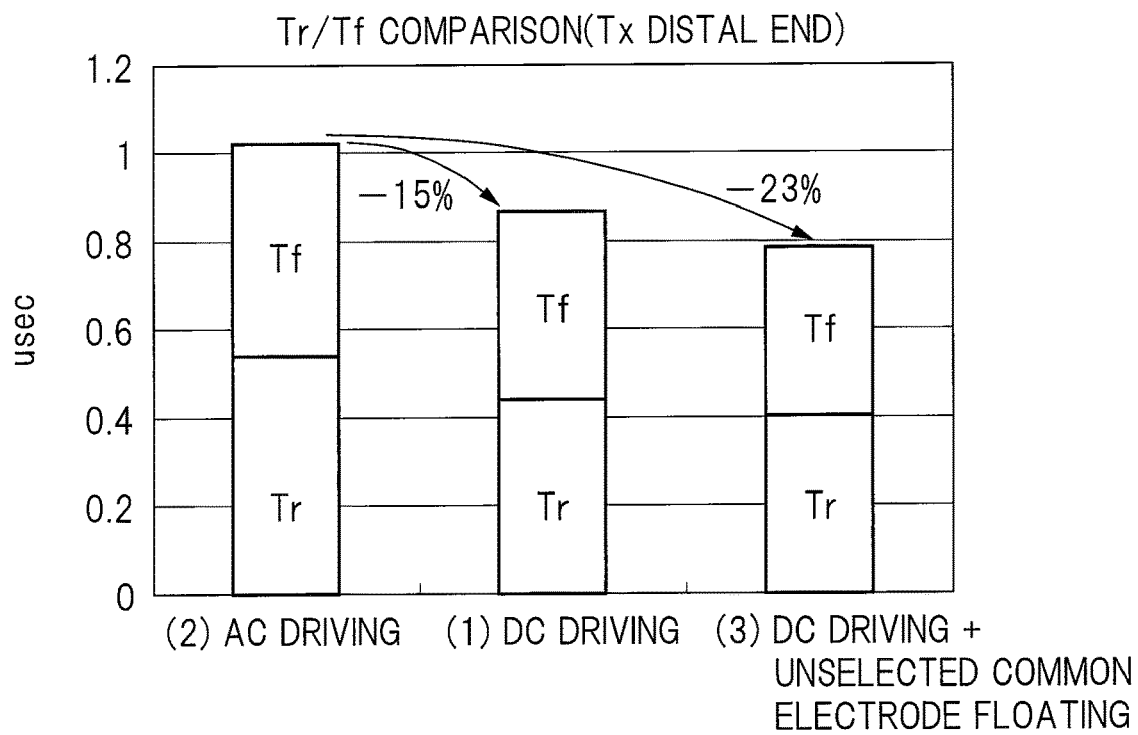
FIGS. 19A and 19B are explanatory diagrams for describing an examination from the inventors of the present invention.
Figure 19B:
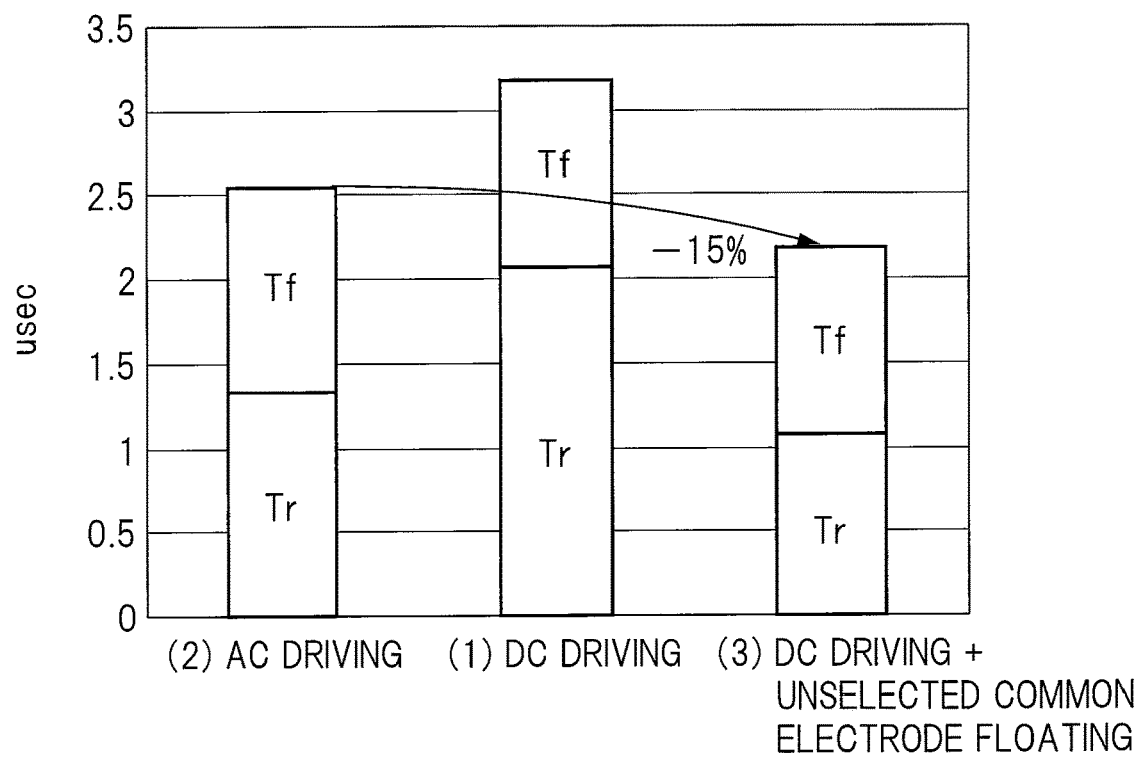

FIGS. 19A and 19B are diagrams illustrating the time of the change in the voltage of the selected common electrode and the time of the change in the voltage of the detection electrode in the module illustrated in FIG. 18A in a case where the common electrode, for example, the common electrode TL(0) is set as the selected common electrode and the voltage of one end (na) thereof is changed by (1) DC driving, (2) AC driving, and (3) DC driving+unselected common electrode floating. Here, in (1) DC driving, the voltage lines Ln-VCOMDC1 and Ln-VCOMDC2 are configured by the common lines Ln-VCOMDC (not illustrated) in the DC driving described above with reference to FIGS. 16A and 17A. (2) AC driving is the DC driving and the AC driving described above with reference to FIGS. 16A to 17B. In addition, (3) DC driving+unselected common electrode floating means that the voltage lines Ln-VCOMDC1 and Ln-VCOMDC2 are configured by the common DC lines Ln-VCOMDC (not illustrated) in the DC driving described above with reference to FIGS. 16A and 17A, and the unselected common electrodes (FIG. 16A) are electrically insulated (floating) by turning off the switches SE12 corresponding to the common electrodes TL(0) and TL(2) to TL(11). That is, the unselected common electrodes are in a floating state, and the selected common electrode is in a state of being connected to the voltage line Ln-TPH or the voltage line Ln-VCOMDC.

In FIG. 19A, a vertical axis represents a time and a horizontal axis represents a common electrode driving method. That is, in the horizontal axis, (2) represents a case where the common electrode is driven by the AC driving described above with reference to FIG. 16B, and (1) represents a case where the common electrode is driven by the DC driving described above with reference to FIG. 16A. In addition, in the horizontal axis, (3) represents a case where the selected common electrode is DC-driven in a state in which the unselected common electrodes are floating. When the voltage of one end (na) of the selected common electrode (common electrode TL(0)) rises by the driving methods (1) to (3), the time until the voltage of the other end (nb) farthest from one end (na) rises to a predetermined voltage is represented by time Tr in FIG. 19A. Similarly, when the voltage of one end (na) falls, the time until the voltage of the farthest other end (nb) falls to a predetermined voltage is represented by time Tf. It can be seen from FIG. 19A that the time to change until a predetermined voltage value is faster in the order of (3) DC driving+unselected common electrode floating, (1) DC driving, and (2) AC driving.

In FIG. 19B, a vertical axis and a horizontal axis are the same as those in FIG. 19A. However, FIG. 19B illustrates the time until the voltage of the detection electrode at the position farthest from the selected common electrode TL(0) reaches a predetermined voltage value after the voltage of one end (na) of the selected common electrode TL(0) is changed by the driving methods (1) to (3). In FIG. 18A, since the common electrode TL(0) is the selected common electrode, the time until the output of the unit amplification unit 13-$n$ connected to the end of the detection electrode RL(n) reaches a predetermined voltage is measured. In FIG. 19B, when the voltage of one end (na) of the selected electrode TL(0) rises, the time until the output of the unit amplification unit 13-$n$ rises to a predetermined voltage value is represented by Tr, and when the voltage of one end (na) falls, the time until the output of the unit amplification unit 13-$n$ reaches a predetermined voltage value is represented by Tf.

In the case of FIG. 19B, at the time of (1) DC driving, the time until the voltage of the detection electrode reaches a predetermined value is longer when (1) DC driving rises. In addition, it can be seen that the time until the voltage of the detection electrode reaches a predetermined voltage value is faster in the order of (3) DC driving+unselected common electrode floating and (2) AC driving.

Figure 18B:
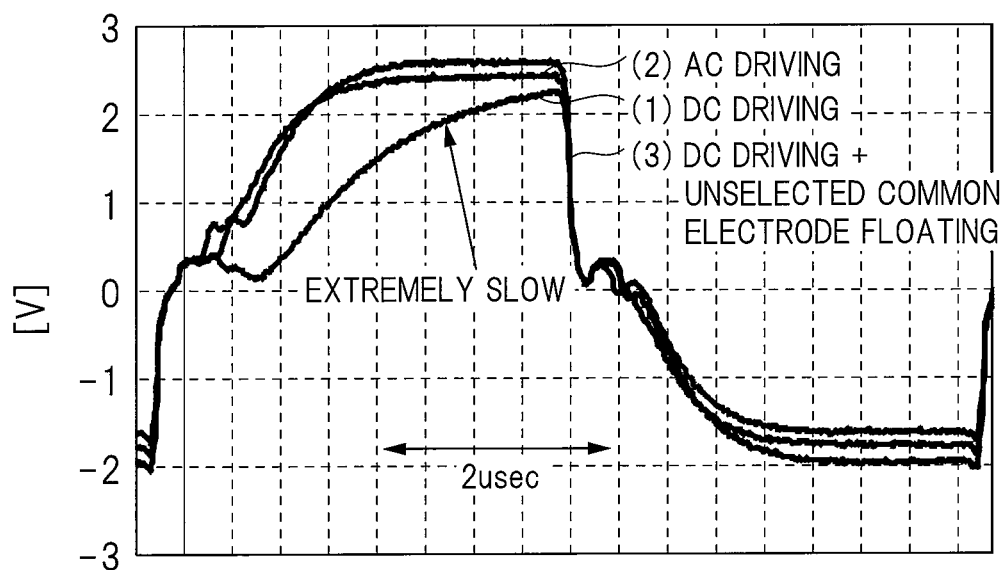

FIG. 18B is a diagram illustrating a change in a voltage of a measurement electrode that is arranged on the common electrode TL(0) illustrated in FIG. 18A. In this case, the measurement electrode is electrically separated from the common electrode and the detection electrode, and a predetermined bias voltage is applied to the measurement electrode. FIG. 18B illustrates a change in the voltage of the measurement electrode when the common electrode TL(0) is the selected common electrode and the voltage of the common electrode TL(0) is changed by the driving methods (1) to (3). In FIG. 18B, a vertical axis represents the voltage of the measurement electrode and a horizontal axis represents the time. In the same drawing, (1) represents a voltage change when the common electrodes TL(0) to TL(6) are driven by the DC driving, (2) represents a voltage change when the common electrodes TL(0) to TL(6) are driven by the AC driving, and (3) represents a voltage waveform when the common electrodes TL(0) to TL(6) are driven by the DC driving+unselected common electrode floating. Since a predetermined bias voltage is applied to the measurement electrode, each voltage waveform is changed up and down, including 0 V.

It can also be seen in FIG. 18B that, in the case of (1) DC driving, the rise of the voltage waveform is slow.

Although the case of the horizontal COM arrangement has been described, the case of the vertical COM arrangement had a similar result.

The inventors of the present invention has thought that, in (1) DC driving, the reason why the rise time of the voltage of the detection electrode was increased as illustrated in FIG. 19B and the voltage rise at the time of (1) DC driving illustrated in FIG. 18B was slow was because the unselected common electrode and the selected common electrode were connected to the same voltage line Ln-VCOMDC. That is, when describing FIG. 16A as an example, in (1) DC driving, the switches SE11, SE12, and SE12' illustrated in FIG. 16A are configured by, for example, field-effect transistors (hereinafter, referred to as MOSFETs). Since a parasitic capacitance exists between the common electrodes, when the voltage of the selected common electrode rises, the voltage of the unselected common electrode also rises due to the parasitic capacitance. Since a current flows from the unselected common electrode to the voltage line Ln-VCOMDC so as to reduce the voltage rise of the unselected common electrode, the voltage of the voltage line Ln-VCOMDC is changed. Due to the change in the voltage of the voltage line Ln-VCOMDC, a potential difference between a gate and a source of a MOSFET constituting the switch SE11 is reduced. Therefore, it is thought that a drain current flowing through the MOSFET is reduced and a rise of the selected common electrode is slow.

In addition, in (1) DC driving, since the voltage line Ln-VCOMDC connected to the unselected common electrode and the voltage line Ln-VCOMDC connected to the selected common electrode are the same voltage line, the parasitic capacitance of the unselected common electrode is also connected to the voltage line Ln-VCOMDC in the touch detection period. Therefore, the speed of turning on the switch SE12 constituting the switch SE and changing the voltage of the common electrode TL(1) serving as the selected common electrode toward the low level voltage VCOMDC becomes slow. In other words, it takes a long time to charge the selected common electrode (TL(1)) toward the low level voltage VCOMDC through the switch SE12, and the change in the voltage of the selected common electrode becomes slow.

The inventors of the present invention made a further examination so as to clarify a difference between a case where the unselected common electrode was connected to the voltage line Ln-VCOMDC and a case where the unselected common electrode was in a floating state in the touch detection period.

Comparison Between Floating and Fixing of Unselected Common Electrode

Figure 20A:
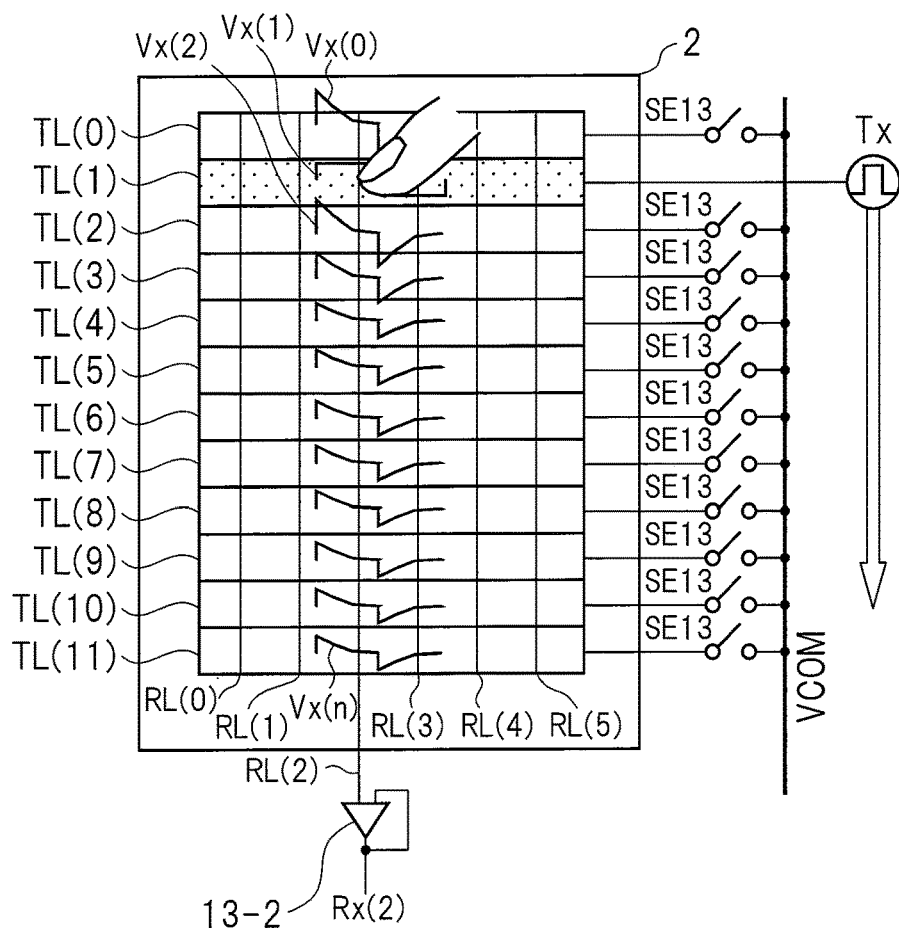
FIGS. 20A and 20B are explanatory diagrams for describing an examination from the inventors of the present invention.
Figure 21A:
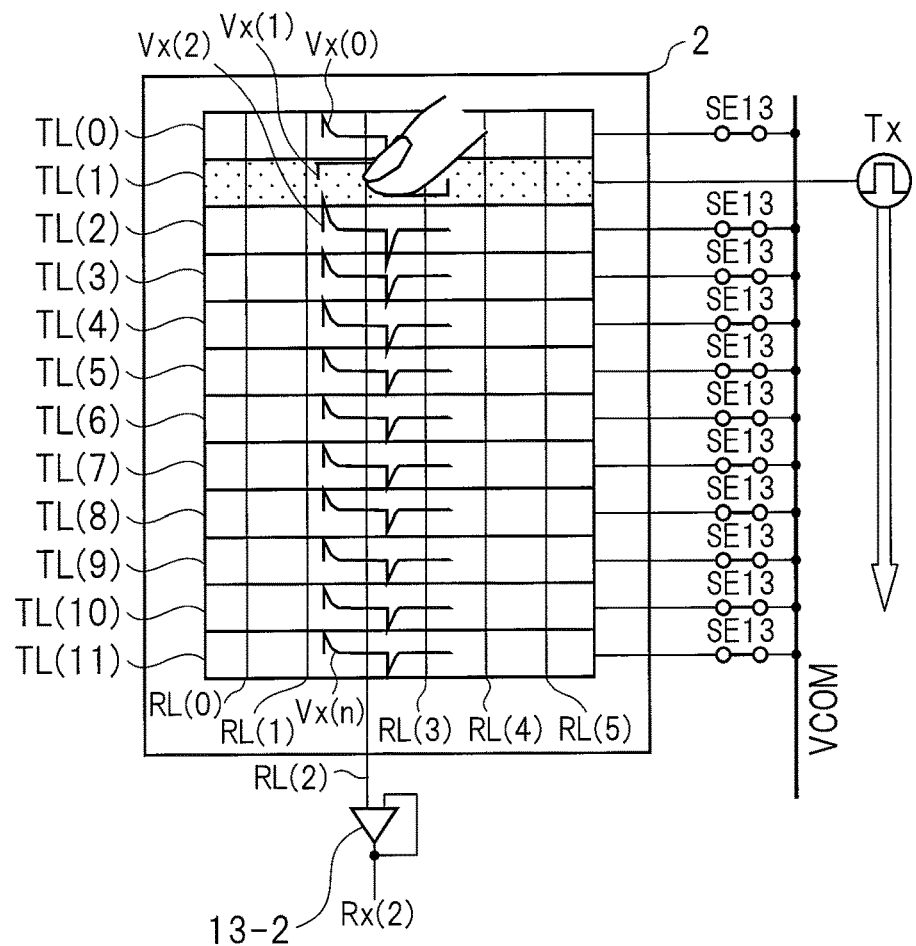
FIGS. 21A and 21B are explanatory diagrams for describing an examination from the inventors of the present invention.

FIGS. 20A and 21A are diagrams schematically illustrating a configuration of a liquid crystal panel 2 examined for comparing a case where an unselected common electrode was floating and a case where an unselected common electrode was fixed to a low level voltage VCOMDC, in a touch detection period by AC driving. The configuration of the examined liquid crystal panel 2 is similar to the liquid crystal panel 2 of the horizontal COM arrangement illustrated in FIG. 16B. Here, for describing the examination, the case of using the AC driving in the horizontal COM arrangement is described, but the same applies to the vertical COM and the DC driving. In FIGS. 20A and 21A, the common electrode TL(1) is designated as the selected common electrode and the common electrodes TL(0) and TL(2) to TL(11) are designated as the unselected common electrodes.

FIG. 20A illustrates a case where the unselected common electrodes are in a floating state. That is, the switches SE13 respectively corresponding to the common electrodes TL(0) and TL(2) to TL(11) are turned off, and the driving signal Tx is supplied to the common electrode TL(1). The voltage of the common electrode TL(1) rises due to the voltage rise of the driving signal Tx and falls due to the voltage fall of the driving signal Tx. In FIG. 20A, the voltage waveform of the common electrode TL(1) is represented as Vx(1) in a part of the common electrode TL(1). As described above, the change in the voltage of the common electrode TL(1) is transferred to other common electrodes TL(0) and TL(2) to TL(11) through the parasitic capacitance. In FIG. 20A, in the common electrodes TL(0) and TL(2) to TL(11), the voltage changes thereof are represented as the voltage waveforms.

For example, the voltage waveforms of the common electrodes TL(0) and TL(2) arranged adjacent to the common electrode TL(1) serving as the selected common electrode are represented as Vx(0) and Vx(2). In addition, in the common electrode TL(11) arranged spaced apart from the common electrode TL(1), the voltage change thereof is represented as the voltage waveform Vx(11). Since the common electrodes TL(0) and TL(2) to TL(11) serving as the unselected common electrodes are in the floating state, the common electrodes TL(0) and TL(2) to TL(11) have no path for charging or discharging current. Therefore, as illustrated in the voltage waveforms Vx(0), Vx(1), and Vx(11), the risen voltage or the fallen voltage slowly falls or rises due to a leakage current or the like. That is, the voltage of the unselected common electrode is slowly returned after the voltage falls or rises.

As the unselected common electrode is arranged farther apart from the selected common electrode, the voltage change transferred through the parasitic capacitance becomes smaller. Therefore, as illustrated in FIG. 20A, a peak voltage of the voltage waveform Vx(11) is lower than those of the voltage waveforms Vx(0) and Vx(2).

Figure 20B:
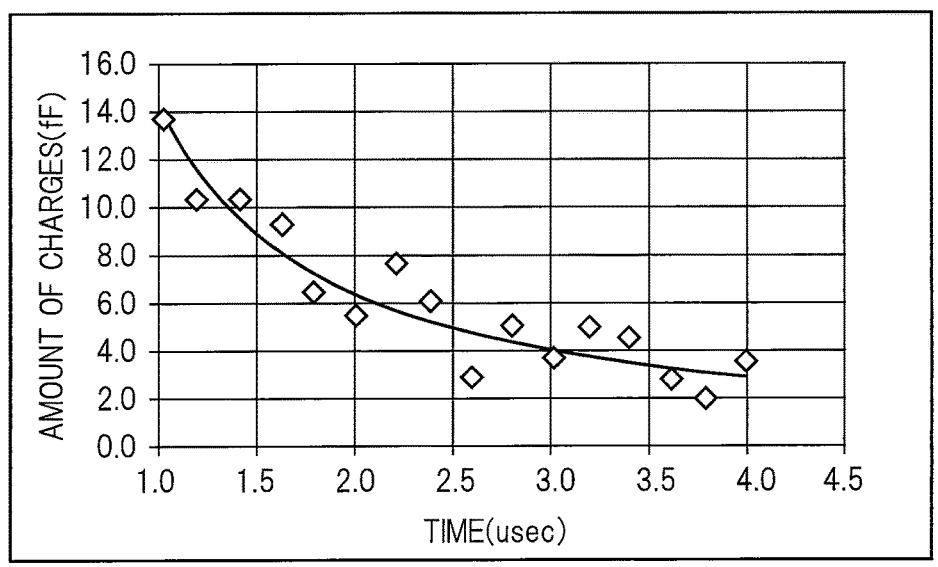

FIG. 20B is a diagram illustrating a change of the detection signal Rx(2) according to the time. In the same drawing, a horizontal axis represents the time and a vertical axis represents the change of the detection signal Rx(2) as an amount of charges (fF). FIG. 20A illustrates a case where the vicinity of the common electrode TL(1) is touched by the finger and the common electrode TL(1) is designated as the selected common electrode, but FIG. 20B illustrates a state prior to the case of FIG. 20A. That is, FIG. 20B illustrates a case where the common electrode TL(0) is designated as the selected common electrode and the voltage of the common electrode TL(0) is changed by the driving signal Tx in a manner similar to the voltage waveform Vx(1) of FIG. 20A. Even in this case, the change in the voltage of the selected common electrode TL(0) is transferred through the parasitic capacitance, and the voltages of the unselected common electrodes TL(1) to TL(11) are changed. In addition, since the unselected common electrodes TL(1) to TL(11) are in the floating state, the return after the rise or fall is slow as described above.

In FIG. 20B, ◇ points indicate the amount of charges, which corresponds to the value of the detection signal Rx(2), at the time represented in the horizontal axis. With the elapse of the time, the amount of charges is reduced, but the return of each of the voltages of the unselected common electrodes TL(1) to TL(11) is slow. Therefore, the reduction in the amount of charges is also gradually lowered. The determination as to whether the finger is touched is performed by, for example, the amount of charges at the time of 1.2 to 2.0 (usec). For example, the presence or absence of the touch is determined according to whether or not the amount of charges exceeds a predetermined reference value at this time. In FIG. 20B, since the amount of charges is still large at this time, the determination as to whether or not it is touched is inappropriate, and there is a possibility of erroneous detection. Therefore, for example, it is necessary to delay the determination time. As a result, the time to designate a next common electrode TL(1) as the selected common electrode and supply the driving signal slows down, and the detection is delayed.

FIG. 21A illustrates a case where the unselected common electrodes are set to a fixed voltage in the touch detection period. That is, as illustrated in FIG. 21A, the unselected common electrodes TL(1) to TL(11) are respectively connected to the voltage line VCOM through the switches SE13.

Figure 21B:
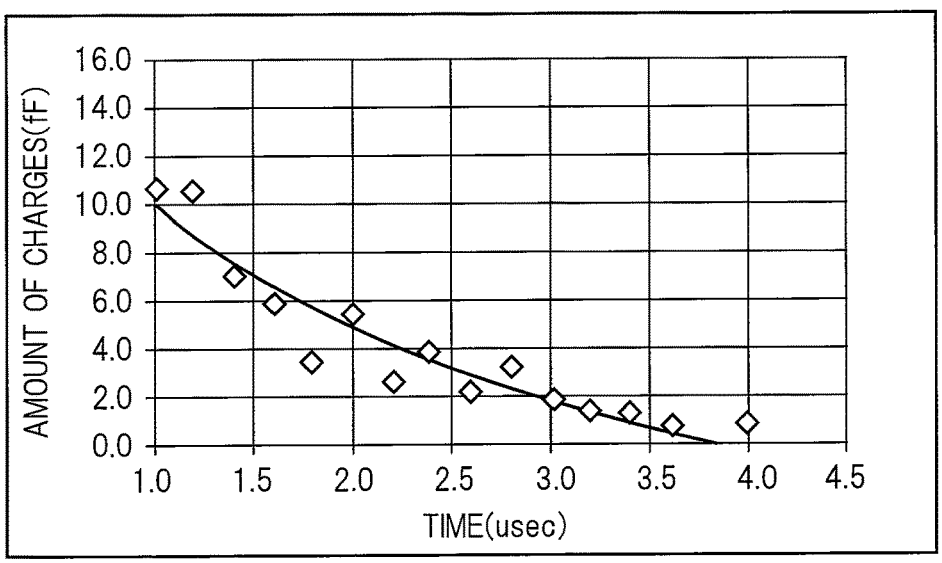

In this case, even when the change in the voltage of the selected common electrode TL(1) is transferred to the unselected common electrodes TL(1) to TL(11) through the parasitic capacitance, the respective unselected common electrodes TL(1) to TL(11) are discharged through the switches SE13. Therefore, the voltages of the respective unselected common electrodes TL(1) to TL(11) quickly return to the original voltages. As a result, as illustrated in FIG. 21B, the amount of charges of the detection signal Rx(2) is quickly reduced. Accordingly, the occurrence of the erroneous detection can be prevented. In other words, it is possible to speed up the time to select a next common electrode.

In addition, in the (2) AC driving described above, the selected common electrode is directly charged or discharged by the driving signal. Therefore, it is necessary to increase the driving capability of the driving signal as compared with the (1) DC driving and/or the (3) DC driving+unselected common electrode floating. Since the signal line for transferring the driving signal with an increased driving capability extends to a periphery of the liquid crystal panel 2, it is feared that the driving signal will leak out to the detection electrode and/or the common electrode through the parasitic capacitance and the erroneous detection will occur. In addition, as illustrated in FIGS. 19A and 19B, in the (2) AC driving, the time until the voltage of the selected common electrode and the detection electrode reaches a predetermined voltage value is also long.

As described above, according to the examination of the inventors of the present invention, it was found that there was a problem in each of the (1) DC driving (the line Ln-VCOMDC is common), the (2) AC driving, and the (3) DC driving+unselected common electrode floating (the line Ln-VCOMDC is common). That is, in the (1) DC driving (the line Ln-VCOMDC is common), as illustrated in FIGS. 18B and 19B, the voltage rise of the selected common electrode and the detection electrode is slow. In addition, as described above in association with FIGS. 18 to 19, the voltage fall of the selected common electrode is also slow. In the (2) AC driving, the erroneous detection is feared. Furthermore, in the (3) DC driving+unselected common electrode floating (the line Ln-VCOMDC is common), as described above with reference to FIGS. 20A and 20B, it is likely that the erroneous detection will occur or the detection will slow down.

The inventors of the present invention have invented a liquid crystal display device using a driving method different from the three kinds of the driving methods. Hereinafter, a plurality of embodiments will be described. In the plurality of embodiments to be described below, the following description will be given of an example in which a touch detection device is an in-cell type liquid crystal display device having a touch detection function which is integrated with a display device. Specifically, the driving electrode included in the touch detection device and the driving electrode for driving the liquid crystal display element are the same driving electrode (common electrode).

First Embodiment (Entire Configuration)

First, an entire configuration of a liquid crystal display device 1 having a touch detection function will be described with reference to FIG. 1. FIG. 1 is a block diagram illustrating the configuration of the liquid crystal display device 1 having the touch detection function. The liquid crystal display device 1 having the touch detection function includes a liquid crystal panel (display panel) 2, a display control device 5, a signal line selector 6, a touch control device 7, and a gate driver 8. In FIG. 1, the liquid crystal panel 2 is schematically drawn so as to make the drawing easy to see, and includes a liquid crystal panel unit (display panel unit) 3 and a touch detection panel unit 4. The configuration of the liquid crystal panel 2 will be described below with reference to FIGS. 3 and 4.

The liquid crystal panel unit 3 and the touch detection panel unit 4 share the driving electrodes with each other. In the liquid crystal panel unit 3, scan signals Vs0 to Vsp are supplied from the gate driver 8, image signals SLd(0) to SLd(p) are further supplied from the display control device 5 through the signal line selector 6, and an image is displayed according to the image signals SLd(0) to SLd(p). The touch detection panel unit 4 receives the driving signals Tx(0) to Tx(p) from the display control device 5 and outputs the detection signals Rx(0) to Rx(p) to the touch control device 7.

The display control device 5 includes a control unit 9 and a driving circuit 10. The driving circuit 10 includes a signal line driver 11 that forms and outputs an image signal, and a driving electrode driver 12 that outputs the driving signals Tx(0) to Tx(p). The control unit 9 receives a timing signal and a control signal supplied to a control terminal Tt and an image signal supplied to an image terminal Td, and supplies the signal line driver 11 with an image signal Sn corresponding to the image signal supplied to the image terminal Td. Although not particularly limited, the signal line driver 11 temporally multiplexes the image signal Sn supplied from the control unit 9 and outputs the temporally multiplexed image signal Sn to the signal line selector 6. That is, when looking at one output terminal of the signal line driver 11, two image signals are output from one terminal while being temporally shifted.

In addition, the control unit 9 supplies the signal line selector 6 with selection signals SEL1 and SEL2 for distributing the temporally multiplexed image signals to different signal lines in the signal line selector 6. The signal line selector 6 distributes the supplied multiplexed image signals to different signal lines by the selection signals SEL1 and SEL2 and supplies the multiplexed image signals to the liquid crystal panel unit 3 as image signals SLd(0) to SLd(p). The signal line selector 6 is arranged in the vicinity of the liquid crystal panel unit 3. Accordingly, by temporally multiplexing the image signal, it is possible to reduce the number of lines that electrically connect the display control device 5 and the liquid crystal panel unit 3. In other words, by widening a line width of a line connecting the display control device 5 and the liquid crystal panel unit 3, the delay of the image signal can be reduced.

The control unit 9 supplies the gate driver 8 with the timing signal, based on the timing signal and the control signal supplied to the control terminal Tt. The gate driver 8 generates the scan signals Vs0 to Vsp based on the supplied timing signal, and supplies the scan signals Vs0 to Vsp to the liquid crystal panel unit 3. The scan signals Vs0 to Vsp generated by the gate driver 8 are, for example, pulse signals that sequentially become a high level from the scan signal Vs0 toward the scan signal Vsp.

The driving electrode driver 12 in the driving circuit 10 receives the selection signals TP(0) to TP(p) supplied from the touch control device 7, and supplies the selection signals TP(0) to TP(p) as the driving signals Tx(0) to Tx(p) to the plurality of common electrodes TL(0) to TL(p) included in the liquid crystal panel 2. Although not particularly limited, in the first embodiment, the driving signals Tx(0) to Tx(p) correspond to the selection signals TP(0) to TP(p), respectively. In addition, the selection signal TP(i) corresponding to the driving signal Tx(i) is a clock signal, such that the voltage of the driving signal Tx(i) is periodically changed, the driving signal Tx(i) being supplied to the common electrode (for example, the common electrode TL(i)) serving as the selected common electrode among the plurality of common electrodes TL(0) to TL(p). In other words, by setting a desired selection signal (TP(i)) as a clock signal among the selection signals TP(0) to TP(p), a desired common electrode TL(i) can be set as the selected common electrode, and a touch at an optional position can be detected.

However, in the touch control device 7, there is no limitation in forming the selection signals TP(0) to TP(p). For example, the touch control device 7 may generate a common clock signal, and an identification signal for identifying a desired common electrode from the common electrodes TL(0) to TL(p). In this case, for example, the driving electrode driver 12 obtains the selected common electrode based on the identification signal, and changes voltage of the obtained selected common electrode in synchronization with the common clock signal.

The liquid crystal display device 1 having the touch detection function according to the first embodiment is an in-cell type, and the driving electrode TL(i) is used for both the driving of the touch detection and the driving of the liquid crystals. That is, at the time of image display, the driving electrode TL(i) functions to form an electric field for driving the liquid crystals between the driving electrode TL(i) and the image electrode to be described below, and at the time of touch detection, the driving electrode TL(i) functions to transfer the driving signal for the touch detection. The image display of the liquid crystals in the liquid crystal panel unit 3 and the touch detection in the touch detection panel unit 4 are performed in time division so as not to temporally overlap each other. That is, they are the display period for displaying the image, and the touch detection period for performing the touch detection.

In the display period for performing the image display, the driving electrode driver 12 supplies the common electrode TL(i) of the liquid crystal panel 2 with the driving signal Tx(i) for driving the liquid crystals. In the touch detection period for performing the touch detection, the driving electrode driver 12 supplies the common electrode TL(i) of the liquid crystal panel 2 with the driving signal Tx(i) for the touch detection. It is obvious that a driving electrode driver for the touch detection and a driving electrode driver for driving the liquid crystals may be separately provided in the driving circuit 10. In addition, the control unit 9 outputs a touch/display synchronization signal TSHD for identifying the display period and the touch detection period.

The touch control device 7 includes a detection signal processing unit TS that processes the detection signals Rx(0) to Rx(p) from the touch detection panel unit 4, a driving signal forming unit 17 that forms the selection signals TP(0) to TP(p) and a plurality of control signals ctrsig supplied to the driving electrode driver 12, and a control unit 18 that controls the detection signal processing unit TS and the driving signal forming unit 17. Here, the detection signal processing unit TS performs a process of detecting whether or not the touch detection panel unit 4 is touched and, when touched, obtaining coordinates of the touched position. In addition, the driving signal forming unit 17 performs a designation and a control of a region detecting the touch in the touch detection panel unit 4.

First, the detection signal processing unit TS is described. The detection signal processing unit TS includes a touch detection signal amplification unit 13 that receives the detection signals Rx(0) to Rx(p) from the touch detection panel unit 4 and amplifies the received detection signals Rx(0) to Rx(p), and an A/D conversion unit 14 that converts the analog detection signals amplified by the touch detection signal amplification unit 13 into digital signals. Here, the touch detection signal amplification unit 13 removes high-frequency components (noise components) from the received detection signals Rx(0) to Rx(p) and performs an amplification operation. In addition, as described above with reference to FIGS. 2A to 2C, the detection signals Rx(0) to Rx(p) are generated in response to the driving signal Tx(i) supplied to the common electrode TL(i). Therefore, in the first embodiment, the A/D conversion unit 14 is controlled by the control unit 18 such that the A/D conversion unit 14 samples the amplification signal from the touch detection signal amplification unit 13 in synchronization with the driving signal Tx(i) and converts the sampled amplification signal into a digital signal.

The detection signal processing unit TS further includes a signal processing unit 15 that receives the digital signal obtained by the conversion operation of the A/D conversion unit 14 and performs signal processing on the digital signal, and a coordinate extraction unit 16 that extracts the coordinates of the touched position from the signal obtained by the processing of the signal processing unit 15. The signal processing performed by the signal processing unit 15 includes processing of removing the noise component having a frequency higher than a frequency of the sampling performed by the A/D conversion unit 14 and detecting the presence or absence of the touch of the touch detection panel unit 4. The coordinates of the touched position, which are extracted by the coordinate extraction unit 16, are output from an output terminal Tout as coordinate information.

The driving signal forming unit 17 forms the selection signals TP(0) to TP(p) and the plurality of control signals ctrsig based on the control signals from the control unit 18, and supplies the selection signals TP(0) to TP(p) and the plurality of control signals ctrsig to the driving electrode driver 12. As described above, the driving signal forming unit 17 sets the selection signal corresponding to the common electrode serving as the selected common electrode as the clock signal, such that the driving signal whose voltage periodically changes is supplied to the common electrode serving as the selected common electrode among the common electrodes TL(0) to TL(p). Therefore, an optional common electrode can be set as the selected common electrode, and a touch of an optional position can be detected in the touch detection period.

The control unit 18 receives the touch/display synchronization signal TSHD output from the control unit 9 of the display control device 5, and performs control such that the driving signal forming unit 17 forms the selection signals TP(0) to TP(p) and the control signals ctrsig when the touch/display synchronization signal TSHD represents the touch detection period. In addition, in the touch detection period, the A/D conversion unit 14, the signal processing unit 15, and the coordinate extraction unit 16 are controlled such that the detection signals Rx(0) to Rx(p) received by the touch detection signal amplification unit 13 are converted and the touched coordinates are extracted.

Module

Figure 3A:
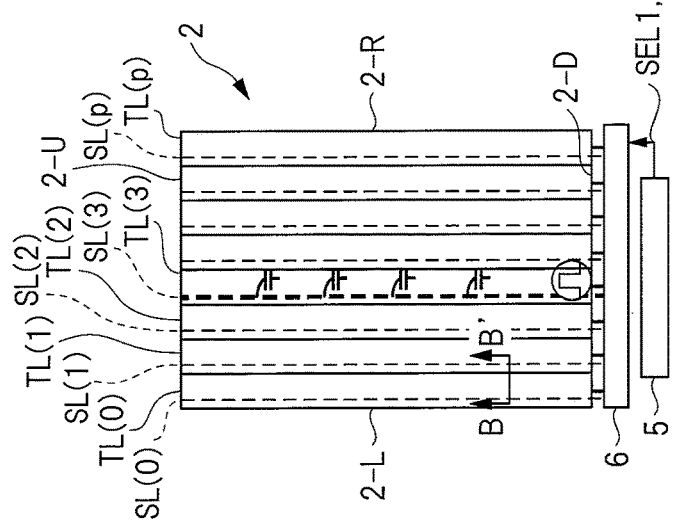
FIGS. 3A and 3B are respectively a plan view and a cross-sectional view schematically illustrating a module mounted with the liquid crystal display device having the touch detection function according to the first embodiment.
Figure 3B:
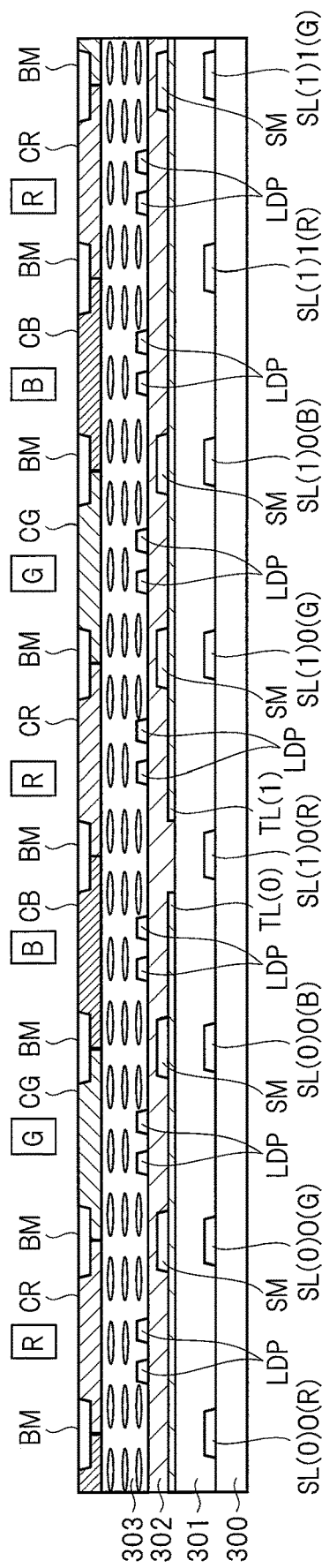

FIG. 3A is a plan view schematically illustrating a module mounted with the liquid crystal display device 1 having the touch detection function according to the first embodiment. In addition, FIG. 3B is a cross-sectional view taken along a line B-B' of FIG. 3A.

The liquid crystal panel 2 includes signal lines SL(0) to SL(p) extending in the vertical direction in the same drawing and arranged in parallel in the horizontal direction, and a plurality of common electrodes TL(0) to TL(p) extending in the same direction as the extending direction of the signal lines SL(0) to SL(p). That is, the common electrodes TL(0) to TL(p) also extend in the vertical direction in the same drawing and are arranged in parallel in the horizontal direction. In the same drawing, the scan lines to which the scan signals Vs0 to Vsp are supplied and the detection electrodes RL(0) to RL(p) for transferring the detection signals Rx(0) to Rx(p) extend in the horizontal direction and are arranged in parallel in the vertical direction, but the scan lines and the detection electrodes RL(0) to RL(p) are omitted in FIG. 3A.

The display control device 5 and the signal line selector 6, which have been described above with reference to FIG. 1, are arranged on a short side of the liquid crystal panel 2. That is, the display control device 5 and the signal line selector 6 extend in a direction perpendicular to or intersecting with the signal lines SL(0) to SL(p) and the common electrodes TL(0) to TL(p). Although described below with reference to FIG. 5, the signal line selector 6 is formed on the same substrate as the liquid crystal panel 2, the signal lines SL(0) to SL(p) are connected to the signal line selector 6, and the image signals output from the display control device 5 are supplied to the signal lines SL(0) to SL(p) of the liquid crystal panel 2 through the signal line selector 6. Here, the signals supplied from the display control device 5 to the signal line selector 6 are the image signals and the selection signals. In order for the liquid crystal panel 2 to perform color display, the image signals supplied from the display control device 5 to the signal line selector 6 are R (red), G (green), and B (blue) image signals corresponding to three primary colors, which are represented as R/G/B in the same drawing. Alternatively, the image signals are signals in which a fourth color such as W (white) or Y (yellow) is added to R (red), G (green), and B (blue) corresponding to three primary colors. In addition, in the same drawing, the selection signals are represented as SEL1 and SEL2.

Each of the signal lines SL(0) to SL(p) is formed on one principal surface of a TFT substrate 300 that is a glass substrate. In the module illustrated in FIGS. 3A and 3B, a plurality of signal lines (for example, signal lines SL(0)0 and SL(0)1) are provided with respect to one common electrode (for example, the common electrode TL(0)), and each of the signal lines SL(0)0 and SL(0)1 includes three signal lines corresponding to the image signals R, G, and B. FIG. 3B illustrates signal lines SL(0)0(R), SL(0)0(G), and SL(0)0(B) corresponding to the image signals R, G, and B, which are included in the signal line SL(0)0, and signal lines SL(1)0(R), SL(1)0(G), and SL(1)0(B) corresponding to the image signals R, G, and B, which are included in the signal line SL(1).

Here, the notation method of the signal lines used in the present specification will be described. The signal line SL(0)0(R) and the signal line SL(1)0(R) will be described as an example. First, the number in parentheses represents the number of the corresponding common electrode, the next number represents the number of a pixel of the corresponding common electrode, and the alphabetical character in parentheses represents the three primary colors (R, G, B) of the pixel. That is, the signal line SL(0)0(R) represents a signal line that corresponds to the common electrode TL(0) and that transfers the image signal corresponding to the red of the three primary colors at the zeroth pixel. Similarly, the signal line SL(1)0(R) represents a signal line that corresponds to the common electrode TL(1) arranged adjacent to the common electrode TL(0) and that transfers the image signal corresponding to the red of the three primary colors at the zeroth pixel. Therefore, SL(1)1(R) and SL(1)1(G) illustrated in FIG. 3B represents signal lines that correspond to the common electrode TL(1) and that transfer the image signals corresponding to the red and the green of the three primary colors at the first pixel.

As illustrated in FIG. 3B, an insulating layer 301 is further formed on one principal surface of the signal lines SL(0)0(R), SL(0)0(G), and SL(0)0(B) corresponding to the image signals R, G, and B and one principal surface of the TFT substrate 300, and the common electrodes TL(0) to TL(p) are formed on the insulating layer 301. Auxiliary electrodes SM are respectively formed in the common electrodes TL(0) to TL(p), and the auxiliary electrodes SM are electrically connected to the common electrodes to reduce electrical resistances of the common electrodes. An insulating layer 302 is formed on the top surfaces of the common electrodes TL(0) to TL(p) and the auxiliary electrodes SM, and pixel electrodes LDP are formed on the top surface of the insulating layer 302. In FIG. 3B, CR, CB, and CG are color filters, and a liquid crystal layer 303 is interposed between the color filters CR (red), CG (green), and CB (blue) and the insulating layer 302. Here, the pixel electrodes LDP are provided at intersection points of the scan lines and the signal lines, and the color filter CR, CG, or CB corresponding to each pixel electrode LDP is provided above each pixel electrode LDP. A black matrix BM is provided between the respective color filters CR, CG, and CB.

Figure 4A:
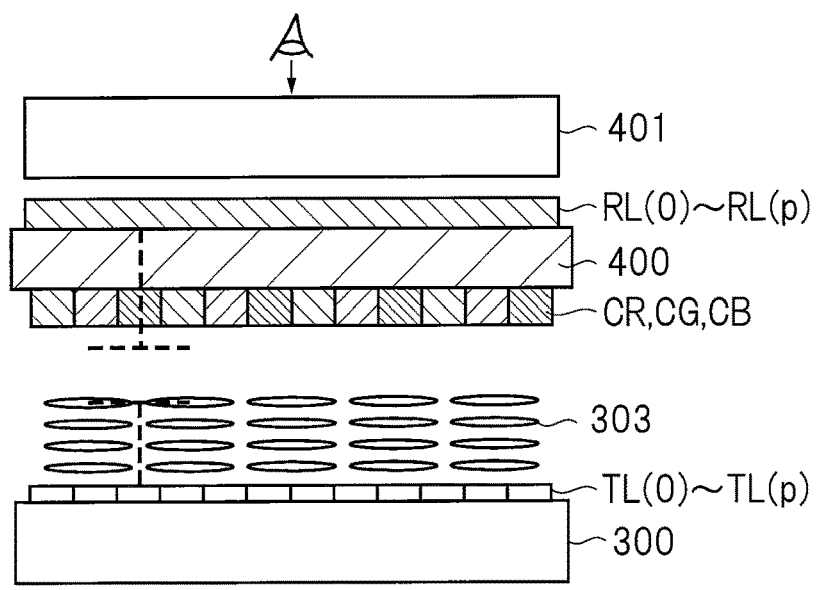
FIGS. 4A to 4C are respectively a plan view and a cross-sectional view schematically illustrating a module mounted with the liquid crystal display device having the touch detection function according to the first embodiment.
Figure 4B:
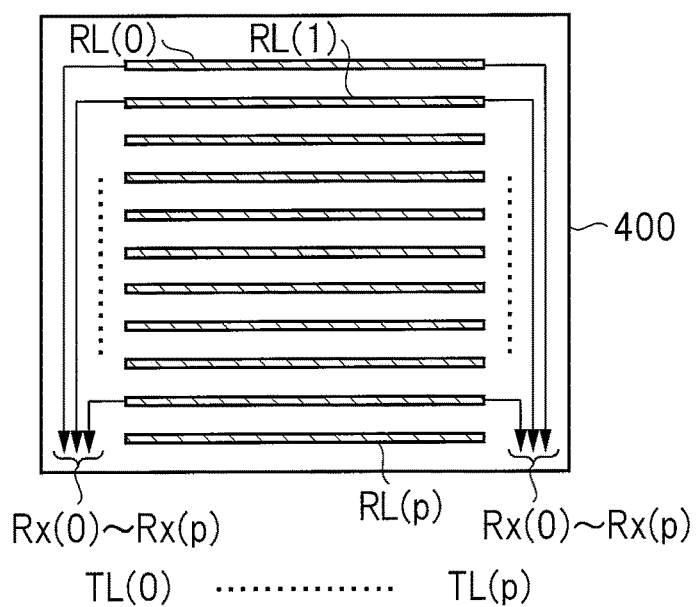
Figure 4C:
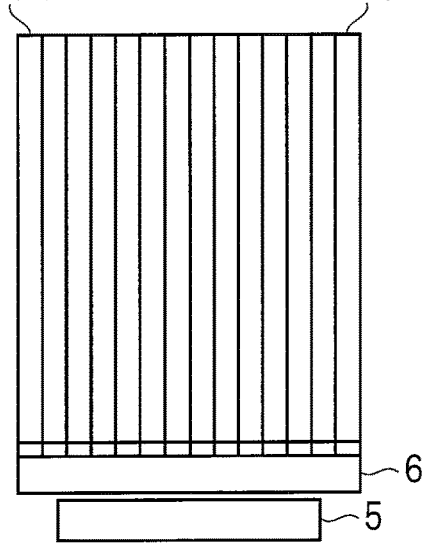

FIG. 4A to 4C are schematic diagrams illustrating a relationship between the detection electrodes RL(0) to RL(p) and the common electrodes TL(0) to TL(p). As illustrated in FIG. 4A, a CF glass substrate 400 being a glass substrate is provided on upper surfaces of the color filters CR, CG, and CB, and the detection electrodes RL(0) to RL(p) are formed on the upper surface of the CF glass substrate 400. Further, a polarizing plate 401 is formed above the detection electrodes RL(0) to RL(p). Here, as illustrated in FIG. 4A, since a case when viewed from above in the same drawing is described as an example, it is described as the upper surface but it goes without saying that the upper surface is a lower surface or a side surface when the direction of the visual observation is changed. In addition, in FIG. 4A, electrodes of capacitive elements formed between the detection electrodes RL(0) to RL(p) and the common electrodes TL(0) to TL(p) are drawn by a broken line. Furthermore, the common electrodes TL(0) to TL(p) may be formed at the liquid crystal layer side rather than the detection electrodes RL(0) to RL(p) on the CF glass substrate 400 according to a liquid crystal mode.

As illustrated in FIGS. 3A and 4C, each of the signal lines SL(0) to SL(p) and the common electrodes TL(0) to TL(p) extends in a vertical direction, that is, in a long-side direction and is arranged in parallel in a horizontal direction, that is, a short-side direction. In this regard, as illustrated in FIG. 4B, the detection electrodes RL(0) to RL(p) are provided in the CF glass substrate 400 and are arranged to intersect with the common electrodes TL(0) to TL(p). That is, in FIG. 4B, the detection electrodes RL(0) to RL(p) extend in the horizontal (short-side) direction and are arranged in parallel in the vertical (long-side) direction. The detection signals Rx(0) to Rx(p) from the detection electrodes RL(0) to RL(p) are supplied to the touch control device 7.

When seen in a plan view, as illustrated in FIG. 3A, the signal lines SL(0) to SL(p) and the common electrodes TL(0) to TL(p) can be regarded as extending in parallel. The term "parallel" refers to the extension without mutual crossing from one end to the other end. Although all or part of one line is provided in a state of being inclined with respect to another line, this state is referred to as "parallel" unless these lines cross each other from one end to the other end. As understood from FIG. 3A, in this embodiment, the vertical COM arrangement is adopted. However, the embodiment is not limited thereto, and the horizontal COM arrangement may also be adopted.

In addition, in a case where the signal line selector 6 and the display control device 5 are set as base points and the arrangement of the common electrodes TL(0) to TL(p) is captured, each of the common electrodes TL(0) to TL(p) can be regarded as extending in a direction away from the signal line selector 6 and the display control device 5 serving as the base points. In this case, the signal lines SL(0) to SL(p) can also be regarded as extending in a direction away from the signal line selector 6 and the display control device 5 serving as the base points.

In FIG. 4A, the signal lines and the pixel electrodes LDP illustrated in FIG. 3B are omitted.

Entire Configuration of Module

Figure 5:
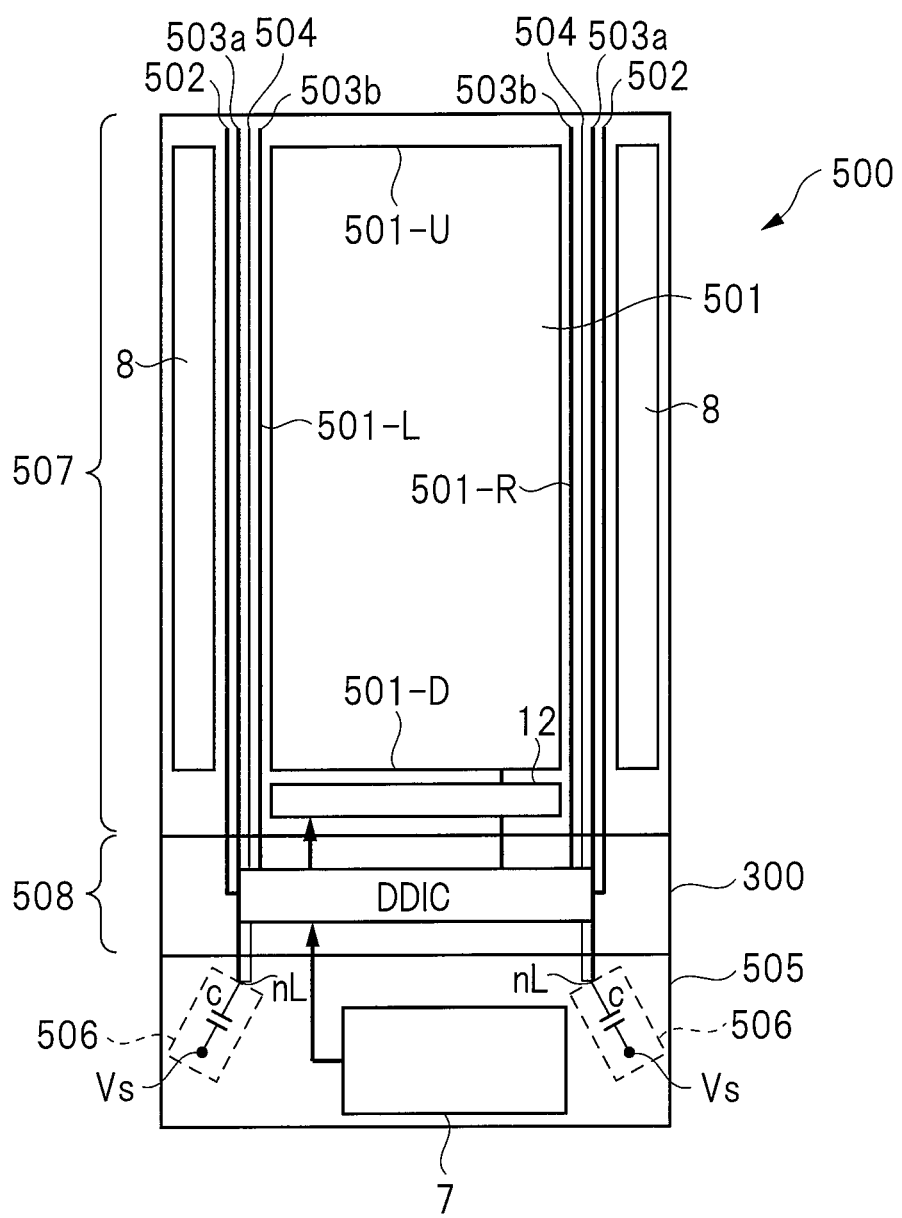
FIG. 5 is a plan view illustrating a configuration of a module mounted with the liquid crystal display device having the touch detection function according to the first embodiment.

FIG. 5 is a plan view schematically illustrating an entire configuration of a module according to a first embodiment and illustrates an entire configuration of a module 500 mounted with the liquid crystal display device 1 having the touch detection function. Although schematic, FIG. 5 is drawn to match an actual arrangement. In the same drawing, 508 represents a region of the TFT substrate 300 described above with reference to FIGS. 3A and 3B, and 507 represents a region having the TFT substrate 300 and the CF glass substrate 400 described above with reference to FIGS. 4A to 4C. In the region 507 and the region 508, for example, the TFT substrate 300 is arranged over the region 507 and the region 508, and the CF glass substrate 400 corresponds to the region 507. The signals from the detection electrodes RL(0) to RL(p) on the CF glass substrate 400 may be supplied to a flexible substrate 505 through the lines on the region 508 of the TFT substrate 300, or may be supplied to the flexible substrate 505 that connects a separate flexible substrate (not illustrated) to the CF glass substrate 400 and the flexible substrate 505. In addition, as illustrated in FIGS. 4A to 4C, the CF glass substrate 400, the detection electrodes RL(0) to RL(p), and the polarizing plate 401 are further formed on the TFT substrate 300.

In the region 507, the gate driver 8 illustrated in FIG. 1 is formed along the long-side direction of the module 500. In this embodiment, the gate drivers 8 are formed along two long-side directions of the module 500 in a state in which the plurality of common electrodes TL(0) to TL(p) are interposed therebetween. In this case, the scan lines described above with reference to FIG. 1 extend along the short-side direction of the module, are arranged in parallel in the long-side direction, and are connected to the gate drivers 8. In addition, although omitted in the same drawing, the signal line selector 6 described above is mounted in the region 507. In the first embodiment, the signal line selector 6 is mounted to extend along the short side of the module 500.

On the other hand, the display control device 5 is formed in the region 508. In the first embodiment, the display control device 5 is configured by a semiconductor integrated circuit device (hereinafter, referred to as a semiconductor device) and a plurality of electronic components. Examples of the electronic components include a MOSFET such as a thin film transistor (TFT). A plurality of MOSFETs are formed in the TFT substrate 300. In the first embodiment, the plurality of MOSFETs are formed in the region of the TFT substrate 300 which is covered by the semiconductor device constituting the display control device 5. Although not particularly limited, the driving electrode driver 12 (FIG. 1) is formed on the TFT substrate 300 by the plurality of MOSFETs, and a frame region of the display device can be reduced by arranging the semiconductor device having the control unit 9 or the like on the top surface thereof so as to cover the plurality of MOSFETs. In addition, the signal line driver 11 (FIG. 1) may also be configured by the MOSFETs on the TFT substrate 300 covered by the semiconductor device. It is obvious that the driving electrode driver 12 (FIG. 1) may be formed inside the semiconductor device.

In FIG. 5, the semiconductor device is represented as a DDIC. In FIG. 5, in order to specify the mounting of the driving electrode driver 12 and the semiconductor device DDIC on the module 500, the driving electrode driver 12 and the semiconductor device DDIC are separately drawn, but as described above, the driving electrode driver 12 is covered by the semiconductor device DDIC and is hidden by the semiconductor device DDIC when seen in a plan view. Since the semiconductor device DDIC drives the signal lines SL(0) to SL(p), the semiconductor device DDIC is hereinafter referred to as a driver semiconductor device. In the first embodiment, although not particularly limited, the driver semiconductor device DDIC is single (one). The display control device 5 illustrated in FIG. 1 includes the single driver semiconductor device DDIC, and the driving electrode driver 12 configured by the MOSFETs interposed between the driver semiconductor device DDIC and the TFT substrate 300. However, the driver semiconductor device DDIC may include only the signal line driver 11 illustrated in FIG. 1, and a separate semiconductor device may include the control unit 9 illustrated in FIG. 1.

In FIG. 5, the region 501 represents the display region of the liquid crystal panel 2, and the region in which the common electrodes TL(0) to TL(p), the signal lines SL(0) to SL(p), the detection electrodes RL(0) to RL(p), and the scan lines, which have been described above with reference to FIGS. 1, 3A to 4C, are formed. Here, if the correspondence of the liquid crystal panel 2 and the region 501 is described with reference to FIGS. 3 and 5, one pair of short sides 2-U and 2-D of the liquid crystal panel 2 illustrated in FIG. 3 correspond to one pair of short sides 501-U and 501-D of the region 501 illustrated in FIG. 5, and one pair of long sides 2-R and 2-L of the liquid crystal panel 2 illustrated in FIG. 3 correspond to one pair of long sides 501-R and 501-L of the region 501. Therefore, inside the region 501, the display of the image can be performed and the touch can be detected.

In addition, in FIG. 5, 502 represents a first voltage line for supplying a first voltage TPH, 503a represents a second voltage line for supplying a second voltage VCOMDC1a, 504 represents a third voltage line for supplying a third voltage VCOMDC2, and 503b represents a fourth voltage line for supplying a fourth voltage VCOMDC1b. Although not particularly limited, the first voltage line 502, the second voltage line 503a, the third voltage line 504, and the fourth voltage line 503b are arranged to extend in a region between each long side of the region 501 including the common electrodes TL(0) to TL(p) and each long side of the module 500.

Although the first voltage line 502, the second voltage line 503a, the third voltage line 504, and the fourth voltage line 503b will be described below in detail, the line width of the third voltage line 504 is narrower than the line widths of the first voltage line 502, the second voltage line 503a, and the fourth voltage line 503b. In addition, the first to fourth voltage lines 502, 503a, 504, and 503b are made of the same material and have the same thickness. In this case, the line width of each of the first, second, and fourth voltage lines 502, 503a, and 503b is, for example, two to ten times the line width of the third voltage line 504. The line width between the first voltage line 502, the second voltage line 503a, and the fourth voltage line 503b may be different from each other. Even in this case, for example, the line width of the second voltage line 503a is two to ten times the line width of the third voltage line 504. The first to fourth voltage lines 502, 503a, 504, and 503b are connected to the driving electrode driver 12 and supply the driving electrode driver 12 with the first to fourth voltages TPH, VCOMDC1a, VCOMDC1b, and VCOMDC2. In addition, although not particularly limited, the first to fourth voltage lines 502, 503a, 504, and 503b are connected to the driver semiconductor device DDIC and the first to fourth voltages TPH, VCOMDC1a, VCOMDC1b, and VCOMDC2 are supplied to the driver semiconductor device DDIC.

Although not particularly limited, each of the first voltage line 502, the second voltage line 503a, the fourth voltage line 503b, and the third voltage line 504 is connected to a predetermined voltage terminal provided in the module 500, receives the first to fourth voltages TPH, VCOMDC1a, VCOMDC1b, and VCOMDC2 through the voltage terminal, and supplies the driving electrode driver 12 with the first to fourth voltages TPH, VCOMDC1a, VCOMDC1b, and VCOMDC2. It is obvious that a power supply circuit that forms the first to fourth voltages TPH, VCOMDC1a, VCOMDC1b, and VCOMDC2 may be provided in the module 500, and the power supply circuit may supply the voltages to the first to fourth voltage lines. In the first embodiment, the voltage values of the second voltage VCOMDC1a, the fourth voltage VCOMDC1b, and the third voltage VCOMDC2 are substantially equal to one another. For example, the voltage value of each of the second voltage VCOMDC1a, the fourth voltage VCOMDC1b, and the third voltage VCOMDC2 is a ground voltage Vs such as 0 V, and the first voltage TPH is a voltage value higher than the second to fourth voltages VCOMDC1a, VCOMDC1b, and VCOMDC2, for example, a voltage greater than 0 V and equal to or less than 5.5 V.

In FIG. 5, although not illustrated, a terminal group is provided in the region 508, and the lines inside the flexible substrate 505 are electrically connected to the terminal group. The touch control device 7 is mounted on the flexible substrate 505. In the first embodiment, although not particularly limited, the touch control device 7 illustrated in FIG. 1 is configured by a single semiconductor device. In order to distinguish from the driver semiconductor device DDIC, the semiconductor device constituting the touch control device 7 is referred to as a touch semiconductor device 7 in the present specification. A terminal (not illustrated) of the touch semiconductor device 7 is connected to the line inside the flexible substrate 505. Therefore, the signal transmission and reception are performed between the touch semiconductor device 7 and the driver semiconductor device DDIC and between the touch semiconductor device 7 and the driving electrode driver 12. In FIG. 5, for the purpose of illustration, a signal from the touch semiconductor device 7 to the driving electrode driver 12 is illustrated. In addition, in FIG. 5, signals supplied from the touch semiconductor device DDIC to the signal lines SL(0) to SL(p) in the region 501 are illustrated.

Since the second voltage VCOMDC1a and the third voltage VCOMDC2 are substantially the same voltage value, the second voltage line 503a and the third voltage line 504 are electrically connected in the flexible substrate 505. In this case, a low-pass filter 506 is connected to a node nL that connects the second voltage line 503a and the third voltage line 504. In FIG. 5, the low-pass filter 506 is configured by a capacitive element C connected between the ground voltage Vs and the node nL that connects the second voltage line 503a and the third voltage line 504.

When viewed from the viewpoint that the voltages of the second voltage line 503a and the third voltage line 504 are changed, the low-pass filter 506 can be regarded as being connected between the second voltage line 503a and the third voltage line 504. In this case, by the low-pass filter 506, a rapid change in the voltage of the third voltage line 504 or a rapid change in the voltage of the second voltage line 503a is prevented from being transferred to the second voltage line 503a or the third voltage line 504. In addition, in a case where the second voltage line 503a and the third voltage line 504 are integrally formed, it can be regarded as the second voltage line 503a and the third voltage line 504, with the node nL connected to the low-pass filter 506 as a boundary.

Liquid Crystal Element Array

Figure 6:
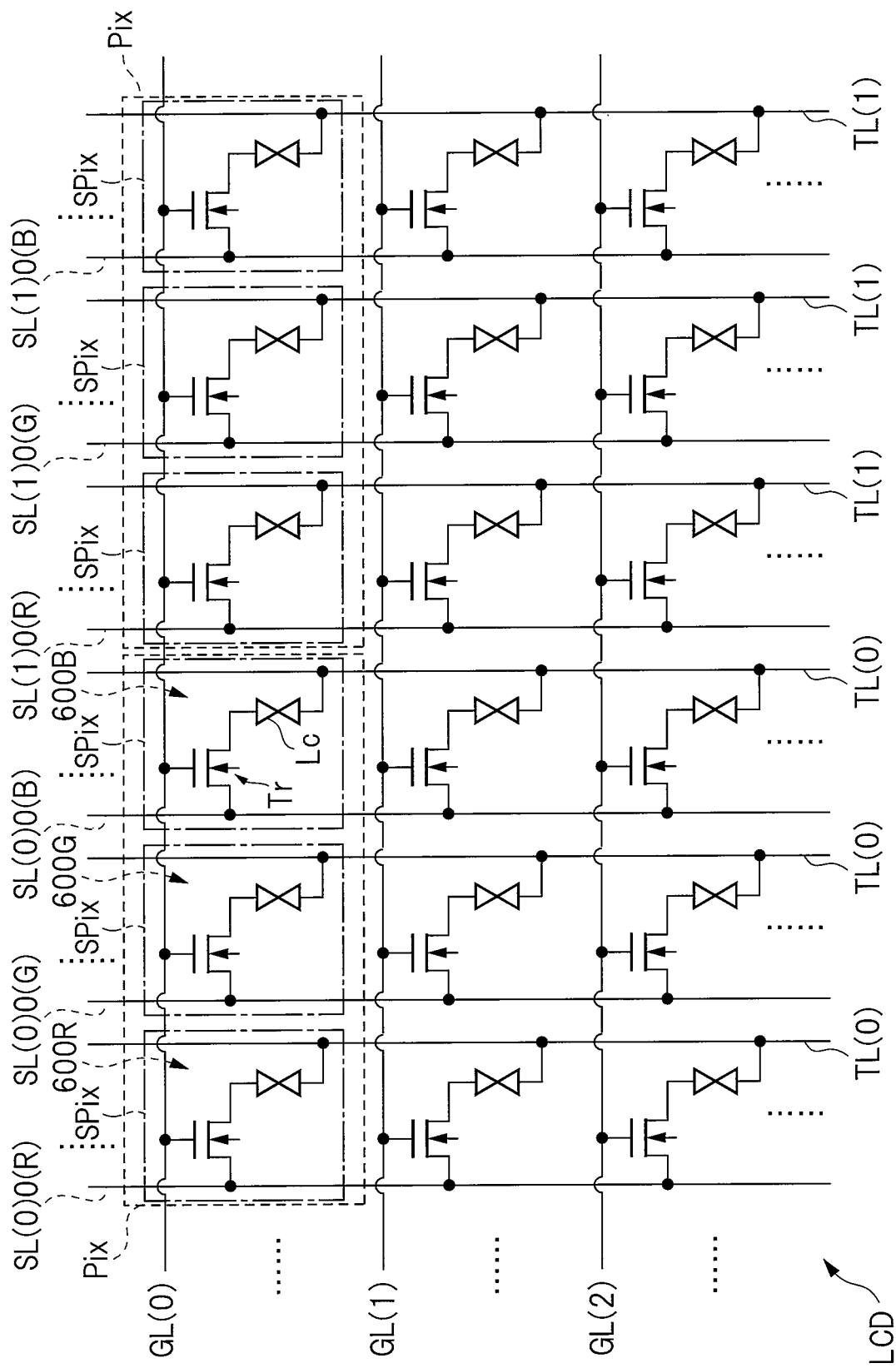
FIG. 6 is a circuit diagram illustrating a configuration of a liquid crystal element array according to the first embodiment.

Next, a circuit configuration of the liquid crystal panel 2 will be described. FIG. 6 is a circuit diagram illustrating the circuit configuration of the liquid crystal panel 2. In FIG. 6, each of a plurality of SPixs indicated by a dotted-dashed line represents one liquid crystal display element. In the liquid crystal panel 2, the liquid crystal display elements SPix are arranged in a matrix form and constitutes a liquid crystal element array LCD. The liquid crystal element array LCD includes a plurality of scan lines GL(0) to GL(p) arranged in each row and extending in a row direction, and signal lines SL(0)0(R), SL(0)0(G), SL(0)0(B) to SL(p)p(R), SL(p)p(G), and SL(p)p(B) arranged in each column and extending in a column direction. In addition, the liquid crystal element array LCD includes common electrodes TL(0) to TL(p) arranged in each column and extending in the column direction. FIG. 6 illustrates a part of the liquid crystal element array related to the scan lines GL(0) to GL(2), the signal lines SL(0)0(R), SL(0)0(G), SL(0)0(B) to SL(1)0(R), SL(1)0(G), and SL(1)0(B), and the common electrodes TL(0) and TL(1).

For ease of description, the common electrodes TL(0) and TL(1) are illustrated in FIG. 6 as being arranged in each column thereof, but as described above with reference to FIGS. 3A and 3B, it is understood that one common electrode is arranged with respect to a plurality of signal lines. It is obvious that the common electrodes may be arranged in the columns of the liquid crystal element array LCD as illustrated in FIG. 6. In any case, the common electrodes TL(0) to TL(p) are arranged in the columns of the liquid crystal element array LCD so as to be parallel to the signal lines.

Each of the liquid crystal display elements SPix arranged at the intersection points of the rows and the columns of the liquid crystal element array LCD includes a thin film transistor Tr formed in the TFT substrate 300 and a liquid crystal element LC, one end of which is connected to a source of the thin film transistor Tr. In the liquid crystal element array LCD, gates of the thin film transistors Tr of the plurality of liquid crystal display elements SPix arranged in the same row are connected to the scan lines arranged in the same row, and drains of the thin film transistors Tr of the plurality of liquid crystal display elements SPix arranged in the same column are connected to the signal lines arranged in the same column. In other words, the plurality of liquid crystal display elements SPix are arranged in a matrix form, the scan lines are arranged in each row, and the plurality of liquid crystal display elements SPix arranged in the corresponding row are connected to the scan lines. In addition, the signal lines are arranged in each column, and the liquid crystal display elements SPix arranged in the corresponding column are connected to the signal lines. In addition, the other ends of the liquid crystal elements LC of the plurality of liquid crystal display elements SPix arranged in the same column are connected to the common electrodes arranged in the column.

An example illustrated in FIG. 6 will be described. In the same drawing, the gates of the thin film transistors Tr of the plurality of liquid crystal display elements SPix arranged in the uppermost row are connected to the scan line GL(0) arranged in the uppermost row. In addition, in the same drawing, the drains of the thin film transistors Tr of the plurality of liquid crystal display elements SPix arranged in the leftmost column are connected to the signal line SL(0)0(R) arranged in the leftmost column. In addition, in FIG. 6, the other ends of the liquid crystal elements of the plurality of liquid crystal display elements SPix arranged in the leftmost column are connected to the common electrode TL(0) arranged in the leftmost side. As described above, one common electrode corresponds to the plurality of signal lines. Therefore, in the example illustrated in FIG. 6, the common electrode TL(0) can be regarded as the common electrodes that are common to three columns.

One liquid crystal display element SPix corresponds to one subpixel described above. Therefore, the subpixel of three colors of R, G, and B is configured by three liquid crystal display elements SPix. In FIG. 6, one pixel Pix is formed by three liquid crystal display elements SPix continuously arranged in the same row, and a color is represented in the pixel Pix. That is, in FIG. 6, the liquid crystal display element SPix represented as 600R is an R (red) subpixel SPix(R), the liquid crystal display element SPix represented as 600G is a G (green) subpixel SPix(G), and the liquid crystal display element SPix represented as 600B is a B (blue) subpixel SPix(B). To this end, a red color filter CR is provided as a color filter in the subpixel SPix(R) represented as 600R, a blue color filter CB is provided as a color filter in the subpixel SPix(B) represented as 600B, and a green color filter CG is provided as a color filter in the subpixel SPix(G) represented as 600G.

In addition, of the signals representing one pixel, an image signal corresponding to R is supplied from the signal line selector 6 to the signal line SL(0)0(R), an image signal corresponding to G is supplied from the signal line selector 6 to the signal line SL(0)0(G), and an image signal corresponding to B is supplied from the signal line selector 6 to the signal line SL(0)0(B).

Although not particularly limited, the thin film transistor Tr of each liquid crystal display element SPix is an N-channel type MOSFET. For example, the pulse-shaped scan signals Vs0 to Vsp (FIG. 1) that sequentially become a high level in this order are supplied from the gate driver 8 to the scan lines GL(0) to GL(p). That is, in the liquid crystal element array LCD, the voltages of the scan lines sequentially become a high level from the scan line GL(0) arranged in the upper row toward the scan line GL(p) arranged in the lower row. Therefore, in the liquid crystal element array LCD, the thin film transistors Tr of the liquid crystal display elements SPix sequentially become a conducting state from the liquid crystal display element SPix arranged in the upper row toward the liquid crystal display element SPix arranged in the lower row.

Since the thin film transistors Tr become the conducting state, the image signal supplied to the signal line at that time is supplied to the liquid crystal element LC through the thin film transistor of the conducting state. An electric field in the liquid crystal element LC is changed according to the value of the image signal supplied to the liquid crystal element LC, and the modulation of light passing through the liquid crystal element LC is changed. Therefore, the color images corresponding to the image signals supplied to the signal lines SL(0)0(R), SL(0)0(G), SL(0)0(B) to SL(p)p(R), SL(p)p(G), and SL(p)p(B) are displayed on the liquid crystal panel 2 in synchronization with the scan signals Vs0 to Vsp supplied to the scan lines GL(0) to GL(p).

Here, the correspondence of the arrangement of the module 500 illustrated in FIG. 5 and the circuit diagram illustrated in FIG. 6 will be described below.

The liquid crystal element array LCD includes one pair of sides substantially parallel to the row of the array and one pair of sides substantially parallel to the column of the array. One pair of sides parallel to the row of the liquid crystal element array LCD correspond to the short sides 501-U and 501-D of the region 501 illustrated in FIG. 5, and one pair of sides parallel to the column of the liquid crystal element array LCD correspond to the long sides 501-R and 501-L of the region 501.

In the liquid crystal element array LCD, as illustrated in FIGS. 3A, 4C, and 5, the signal line selector 6, the driver semiconductor device DDIC, and the driving electrode driver 12 are arranged along one side of one pair of sides parallel to the row, that is, one side 501-D of the region 501. In the liquid crystal element array LCD, in one side (the short side 501-D of the region 501), the image signal from the signal line driver 11 of the driver semiconductor device DDIC is supplied to the signal lines SL(0)0(R), SL(0)0(G), SL(0)0(B) to SL(p)p(R), SL(p)p(G), and SL(p)p(B) through the signal line selector 6. In one side (the short side 501-D of the region 501), the driving signal Tx(i) from the driving electrode driver 12 is supplied to one ends of the common electrodes TL(0) to TL(p).

In addition, in the liquid crystal element array LCD, in which the gate driver 8 is arranged along one pair of sides parallel to the row, that is, one pair of long sides 501-L and 501-R of the region 501, the scan signals Vs0 to Vsp from the gate driver 8 are supplied to the scan lines GL(0) to GL(p) in one pair of sides (the long sides 501-L and 501-R of the region 501).

Since the liquid crystal display device according to the present embodiment is an in-cell type, the common electrode TL(i) is one electrode of the liquid crystal display element SPix. In the display period, a predetermined voltage is supplied to the common electrode TL(i), and in the touch detection period, a voltage from the driving electrode driver 12 is supplied to the common electrode TL(i). When the drain of the thin film transistor Tr is viewed as the other electrode of the liquid crystal display element SPix, the other electrode of the liquid crystal display element SPix is the signal line and is supplied with the image signal in the display period.

The case where the number of the subpixels constituting one pixel is three has been described, but the present invention is not limited thereto. For example, one pixel may include subpixels to which white (W) or yellow (Y), or one or more colors of complementary colors of RGB (cyan (C), magenta (M), and yellow (Y)) is/are added in addition to the RGB.

Configuration of Liquid Crystal Display Device 1

Figure 7:
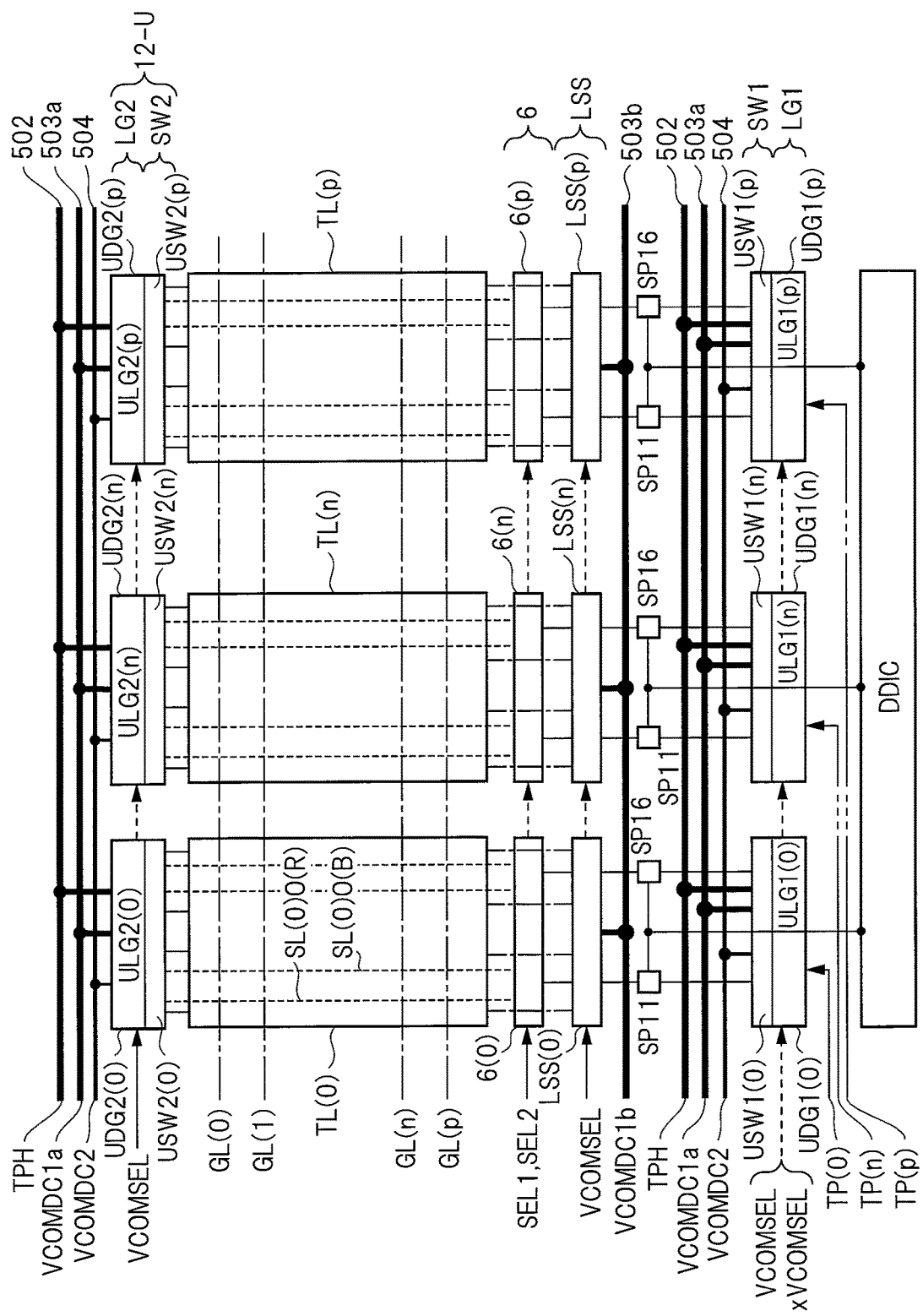
FIG. 7 is a block diagram illustrating a configuration of the liquid crystal display device having the touch detection function according to the first embodiment.

FIG. 7 is a block diagram illustrating a configuration of a liquid crystal display device 1. In the same drawing, TL(0) to TL(p) are common electrodes. In FIG. 7, the common electrodes TL(0), TL(n), and TL(p) are representatively illustrated. In addition, in FIG. 7, a broken line drawn on the common electrodes TL(0), TL(n), and TL(p) represents signal lines, and a dotted-dashed line represents scan lines GL(0) to GL(p).

In FIG. 7, SP11 to SP16 represent terminals formed in a TFT substrate 300, and a terminal group (SP11 to SP16) corresponding to one common electrode is configured by the terminals SP11 to SP16. In FIG. 7, since three common electrodes TL(0), TL(n), and TL(p) are illustrated, three terminal groups (SP11 to SP16) are illustrated. The terminals SP11 to SP16 are connected to terminals indicated by a circle mark of a driver semiconductor device DDIC, and supplied with an image signal from the terminals (circle mark) of the driver semiconductor device DDIC in a display period. In addition, the driver semiconductor device DDIC sets the terminal of the circle mark to a high impedance state in a touch detection period.

The signal line selector 6 (FIG. 1) is configured by a plurality of unit signal line selectors 6(0) to 6(p). The unit signal line selectors 6(0) to 6(p) have the same configuration. Each of the unit signal line selectors 6(0) to 6(p) connects the terminals SP11 to SP16 to the signal lines arranged on the common electrodes corresponding to the terminals SP11 to SP16 according to voltages of the selection signals SEL1 and SEL2. In FIG. 7, when the unit signal line selector 6(0) drawn on the leftmost side is described as an example, the unit signal line selector 6(0) connects the terminal SP11 to the signal line SL(0)0(R) or SL(0)0(B) according to the voltages of the selection signals SEL1 and SEL2. For example, when the voltage of the selection signal SEL1 or SEL2 is at a high level, the terminal SP11 is connected to the signal line SL(0)0(R) or SL(0)0(B).

Therefore, in the display period, the image signal supplied from the driver semiconductor device DDIC to the terminal SP11 can be supplied to the signal line SL(0)0(R) or SL(0)0(B) by selectively setting the selection signals SEL1 and SEL2 to a high level. The same applies to the remaining terminals SP12 to SP16. In the display period, the driver semiconductor device DDIC supplies the image signal to each of the terminals SP11 to SP16 in a time division manner and selectively sets the voltages of the selection signals SEL1 and SEL2 to a high level. In this manner, it is possible to supply the image signal to an appropriate signal line.

On the other hand, in the touch detection period, each of the selection signals SEL1 and SEL2 is set to a high level. Therefore, the unit signal line selector 6(0) connects the terminal SP11 to the signal lines SL(0)0(R) and SL(0)0(B). Similarly, for each of the remaining terminals SP12 to SP16, the unit signal line selector 6(0) connects two signal lines to one terminal.

The unit signal line selector 6(0) has been described as an example, the same applies to the remaining unit signal line selectors 6(1) to 6(p).

The liquid crystal display device 1 according to the first embodiment includes a common electrode switch LSS provided between the common electrodes TL(0) to TL(p) and the terminal group (SP11 to SP16) corresponding to the respective common electrodes. The common electrode switch LSS connects the common electrodes TL(0) to TL(p) to the corresponding terminal group (SP11 to SP16) or a fourth voltage line 503b according to the voltage of a control signal VCOMSEL. The control signal VCOMSEL is a control signal formed in a touch semiconductor device 7 and is included in the control signal ctrsig illustrated in FIG. 1. The touch semiconductor device 7 sets the voltage of the control signal VCOMSEL to a high level in the touch detection period and sets the voltage of the control signal VCOMSEL to a low level in the display period. In addition, the fourth voltage line 503b for supplying a potential to a plurality of unit common electrode switches LSS(0) to LSS(p) is formed on the TFT substrate separately from a second voltage line 503a for supplying a potential to a plurality of first unit switch circuits USW1(0) to USW1(p), but may share a line with the second voltage line 503a.

The common electrode switch LSS is also configured by a plurality of unit common electrode switches LSS(0) to LSS(p) respectively corresponding to the common electrodes TL(0) to TL(p). The unit common electrode switches LSS(0) to LSS(p) have the same configuration. The unit common electrode switch LSS(0) is described as an example. When the voltage of the control signal VCOMSEL is at a high level, that is, in the touch detection period, the unit common electrode switch LSS(0) electrically connects the corresponding common electrode TL(0) to each terminal of the corresponding terminal group (SP11 to SP16). On the other hand, when the voltage of the control signal VCOMSEL is at a low level, that is, in the display period, the unit common electrode switch LSS(0) electrically connects the corresponding common electrode TL(0) to the fourth voltage line 503b. The same applies to the remaining unit common electrode switches LSS(1) to LSS(p).

Since the common electrodes TL(0) to TL(p) are connected to the fourth voltage line 503b in the display period by the common electrode switch LSS, a second voltage VCOMDC1b supplied to the fourth voltage line 503b is supplied to the common electrodes TL(0) to TL(p) as a display driving voltage.

In the first embodiment, the driving electrode driver 12 is configured by a first logic circuit LG1 and a first switch circuit SW1. The first logic circuit LG1 is configured by a plurality of first unit logic circuits ULG1(0) to ULG1(p) respectively corresponding to the common electrodes TL(0) to TL(p). The first unit logic circuits ULG1(0) to ULG1(p) have the same configuration. The first switch circuit SW1 also is configured by a plurality of first unit switch circuits USW1(0) to USW1(p) respectively corresponding to the common electrodes TL(0) to TL(p). The first unit switch circuits USW1(0) to USW1(p) have the same configuration.

The first unit logic circuit ULG1(0) to ULG1(p) respectively receive the selection signals TP(0) to TP(p), the control signal VCOMSEL, and a control signal xVCOMSEL, which is obtained by inverting a phase of the control signal VCOMSEL, from the touch semiconductor device 7. Here, the control signals VCOMSEL and xVCOMSEL are commonly supplied to the first unit logic circuits ULG1(0) to ULG1(p). On the other hand, regarding the selection signals TP(0) to TP(p), the selection signal corresponding to the corresponding common electrode is supplied to the first unit logic circuit. For example, the selection signal TP(0) corresponding to the common electrode TL(0) is supplied to the first unit logic circuit ULG1(0) corresponding to the common electrode TL(0), and the selection signal TP(n) corresponding to the common electrode TL(n) is supplied to the first unit logic circuit ULG1(n) corresponding to the common electrode TL(n). Similarly, the selection signal TP(p) corresponding to the common electrode TL(p) is supplied to the first unit logic circuit ULG1(p) corresponding to the common electrode TL(p).

The first unit logic circuits ULG1(0) to ULG1(p) respectively determine whether the corresponding common electrodes TL(0) to TL(p) are designated as the selected common electrodes, based on the selection signals TP(0) to TP(p), and control the corresponding first unit switch circuits USW1(0) to USW1(p).

The first unit switch circuits USW1(0) to USW1(p) are connected to the terminal group (SP11 to SP16) corresponding to the corresponding common electrodes TL(0) to TL(p), and the first to third voltage lines 502, 503a, and 504. The first unit switch circuits USW1(0) to USW1(p) perform control such that the corresponding terminal group (SP11 to SP16) is electrically connected to any one of the first to third voltage lines 502, 503a, and 504 in the touch detection period by the corresponding first unit logic circuits ULG1(0) to ULG1(p).

As described above, in the touch detection period, the common electrode switch LSS connects the terminal group (SP11 to SP16) to the corresponding common electrodes TL(0) to TL(p). Therefore, in the touch detection period, the common electrodes TL(0) to TL(p) are connected to one of the first to third voltage lines 502, 503a, and 504.

Since the first unit switch circuits USW1(0) to USW1(p) are controlled by the corresponding first unit logic circuits ULG1(0) to ULG1(p), it can be considered that one first unit driving electrode driver UDG1(i) is configured by the first unit switch circuits and the first unit logic circuit corresponding thereto. In this case, it can be considered that the driving electrode driver 12 is configured by a plurality of first unit driving electrode drivers UDG1(0) to UDG1(p) having the same configuration, and it can be considered that the plurality of first unit driving electrode drivers UDG1(0) to UDG1(p) respectively correspond to the common electrodes TL(0) to TL(p).

In FIG. 7, 12-U represents the driving electrode driver. In order to distinguish from the above-described driving electrode driver 12, the driving electrode driver 12 is hereinafter also referred to as a first driving electrode driver 12 (first driving circuit), and the driving electrode driver 12-U is hereinafter also referred to as a second driving electrode driver 12-U (second driving circuit). Since the second driving electrode driver 12-U will be described below in second and third embodiments, only the configuration and overview thereof are described herein. As illustrated in FIG. 7, the second driving electrode driver 12-U is arranged such that the common electrodes TL(0) to TL(p) are interposed with the first driving electrode driver 12. With reference to FIG. 5, the first driving electrode driver 12 is arranged between the short side of the module 500 and the short side 501-D along the short side 501-D (one side) of the region 501, and the second driving electrode driver 12-U is arranged between the short side of the module 500 and the short side 501-U along the short side 501-U (the other side) of the region 501.

Similar to the first driving electrode driver 12, the second driving electrode driver 12-U is also configured by a second logic circuit US2 and a second switch circuit SW2. In addition, the second logic circuit US2 is configured by a plurality of second unit logic circuits ULG2(0) to ULG2(p) respectively corresponding to the common electrodes TL(0) to TL(p), and the second switch circuit SW2 is also configured by a plurality of second unit switch circuits USW2(0) to USW2(p) respectively corresponding to the common electrodes TL(0) to TL(p). The second unit logic circuits ULG2(0) to ULG2(p) have the same configuration, and the second unit switch circuits USW2(0) to USW2(p) also have the same configuration.

The second unit switch circuits USW2(0) to USW2(p) are controlled by the second unit logic circuits ULG2(0) to ULG2(p) corresponding to the same common electrode. Therefore, it can be considered that a second unit driving electrode driver is configured by the second unit logic circuit and the second unit switch circuit corresponding to the same common electrode. In such a case, second unit driving electrode drivers UDG2(0) to UDG2(p) are configured by the second unit logic circuits ULG2(0) to ULG2(p) and the second unit switch circuits USW2(0) to USW2(p), and the second driving electrode driver 12-U is configured by the second unit driving electrode drivers UDG2(0) to UDG2(p). In addition, in this case, the second unit driving electrode drivers UDG2(0) to UDG2(p) respectively correspond to the common electrodes TL(0) to TL(p). For example, the second unit driving electrode driver UDG2(0) corresponds to the common electrode TL(0), the second unit driving electrode driver UDG2(n) corresponds to the common electrode TL(n), and the second unit driving electrode driver UDG2(p) corresponds to the common electrode TL(p).

The second unit switch circuits USW2(0) to USW2(p) are connected to the first to third voltage lines 502, 503a, and 504 and the corresponding common electrodes TL(0) to TL(p), and connect the corresponding common electrodes TL(0) to TL(p) to the first or second voltage line 502 or 503a in the touch detection period by the control of the corresponding second unit logic circuits ULG2(0) to ULG2(p).

In the touch detection period, the second unit logic circuits ULG2(0) to ULG2(p) of the second unit driving electrode drivers UDG2(0) to UDG2(p) receive the driving signals as the selection signals from the first unit driving electrode drivers UDG1(0) to UDG1(p) corresponding to the same common electrode, and control the corresponding second unit switch circuits USW2(0) to Usw2(p). In this case, the driving signals are supplied as the selection signals from the first unit driving electrode drivers UDG1(0) to UDG1(p) to the second unit logic circuits ULG2(0) to ULG2(p) through the signal lines arranged on the corresponding common electrodes (for example, SL(0) to (R) and SL(0) to (B)). The signal lines are signal lines for transferring the image signals in the display period.

As illustrated in FIG. 5, the first to third voltage lines 502, 503a, and 504 connected to the second unit switch circuits USW2(0) to USW2(p) of the second driving electrode driver 12-U are electrically connected to the first to third voltage lines 502, 503a, and 504 connected to the first unit switch circuits USW1(0) to USW1(p) by the voltage lines extending the region between the long sides 501-L and 501-R of the region 501 and the long sides of the module 500.

Configuration of First Driving Electrode Driver 12

Figure 8:
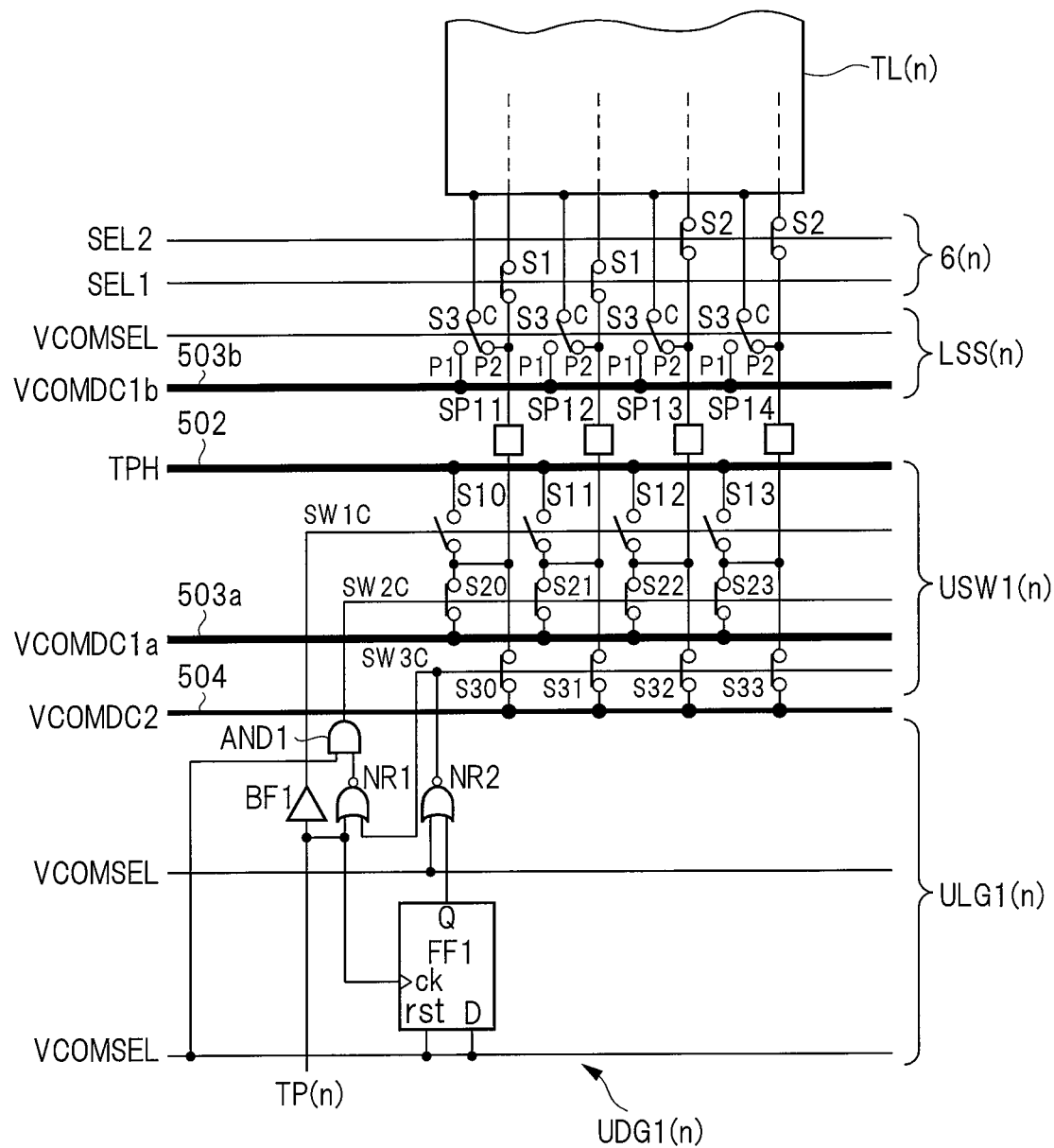
FIG. 8 is a circuit diagram illustrating a configuration of a driving electrode driver according to the first embodiment.
Figure 9:
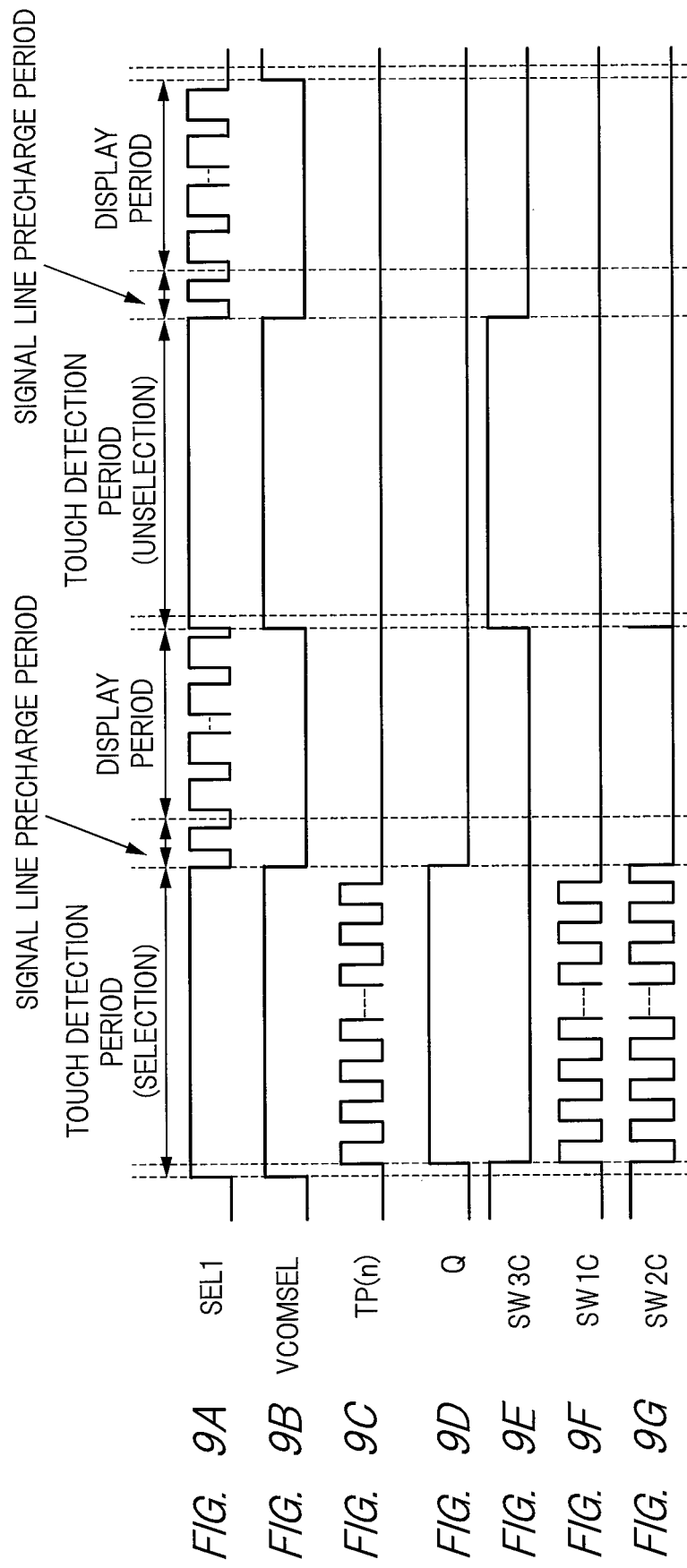
FIGS. 9A to 9G are waveform diagrams of the liquid crystal display device according to the first embodiment.

FIG. 8 is a circuit diagram illustrating the configuration of the first driving electrode driver 12 (first driving circuit) according to the present embodiment. As described above, the driving electrode driver 12 is configured by the plurality of first unit driving electrode drivers UDG1(0) to UDG1(p) having the same configuration. Therefore, in FIG. 8, only the configuration of the first unit driving electrode driver UDG1(n) is illustrated. In addition, in FIG. 8, a signal line SL (broken line), a unit signal line selector 6(n), and a unit driving electrode switch LSS(n) are also illustrated. Before describing the configuration of the first unit driving electrode driver UDG1(n), the configurations of the unit signal line selector 6(n) and the unit driving electrode switch LSS(n) will be described.

In FIG. 8, for avoiding the drawing from becoming complicated, the terminals SP11 to SP14 of the terminal group (SP11 to SP16) corresponding to the common electrode TL(n) are illustrated. Therefore, in the unit driving electrode switch LSS(n), only the configuration related to the terminals SP11 to SP14 is illustrated. In addition, in the unit signal line selector 6(n), only the configuration related to the terminals SP11 to SP14 is illustrated.

Furthermore, for ease of description, in the unit signal line selector 6(n), one signal line SL(i) is indicated by a broken line with respect to each of the terminals SP11 to SP14, and only switches S1 and S2 provided between the signal line SL(i) indicated by the broken line and the terminals SP11 to SP14 are illustrated. The switches S1 and S2 are controlled by the selection signals SEL1 and SEL2. The switches S1 and S2 are complementarily turned on by the selection signals SEL1 and SEL2 in the display period. When the switch S1 or S2 is turned on by the selection signals SEL1 and SEL2, the image signal from the driver semiconductor device DDIC is transferred to the signal line SL(i) and is then displayed. On the other hand, although not particularly limited, in the touch detection period, the switches S1 and S2 are controlled by the selection signals SEL1 and SEL2 such that both the switches S1 and S2 are turned on.

The unit driving electrode switch LSS(n) includes a plurality of switches S3 each of which has one common terminal C and two terminals P1 and P2 and is controlled by the control signal VCOMSEL. The number of the switches S3 is equal to the number of the terminals of the terminal group (SP11 to SP16). In FIG. 8, since four terminals SP11 to SP14 of the terminal group (SP11 to SP16) are illustrated, the unit driving electrode switch LSS(n) is configured by the four switches S3. The respective common terminals C of the switches S3 are connected to the corresponding common electrodes TL(n), the respective terminals P1 of the switches S3 are connected to the fourth voltage line 503b, and the terminals P2 are connected to the terminals SP11 to SP14. The control signal VCOMSEL is at a high level in the touch detection period. Due to the high level, the switches S3 connect the respective common terminals C to the terminals P2. Therefore, in the touch detection period, the corresponding common electrodes TL(n) are electrically connected to the terminals SP11 to SP14 through the switches S3. On the other hand, in the display period, the control signal VCOMSEL is at a low level. As a result, the common terminals C of the switches S3 are connected to the terminals P1. Therefore, the corresponding common electrodes TL(n) are electrically connected to the fourth voltage line 503b through the switches S3.

Next, the configuration of the first unit driving electrode driver UDG1(n) will be described. As described above, the first unit driving electrode driver UDG1(n) is configured by the first unit switch circuit USW1(n) and the first unit logic circuit ULG1(n). The first unit switch circuit USW1(n) includes a plurality of first switches connected between the corresponding terminals of the terminal group (SP11 to SP16) and the first voltage line 502, a plurality of second switches connected between the corresponding terminals of the terminal group (SP11 to SP16) and the second voltage line 503a, and a plurality of third switches connected between the corresponding terminals of the terminal group (SP11 to SP16) and the third voltage line 504.

In FIG. 8, among the plurality of first switches, first switches S10 to S13 connected between the terminals SP11 to SP14 and the first voltage line 502 are illustrated. The first switches S10 to S13 are controlled by a first switch control signal SW1C from the first unit logic circuit ULG1(n). In addition, in FIG. 8, among the plurality of second switches, second switches S20 to S23 connected between the terminals SP11 to SP14 and the second voltage line 503a are illustrated. The second switches S20 to S23 are controlled by a second switch control signal SW2C from the first unit logic circuit ULG1(n). Similarly, in FIG. 8, among the plurality of third switches, third switches S30 to S33 connected between the terminals SP11 to SP14 and the third voltage line 504 are illustrated. The third switches S30 to S33 are controlled by a third switch control signal SW3C from the first unit logic circuit ULG1(n).

Although not particularly limited, the first switches S10 to S13, the second switches S20 to S23, and the third switches S30 to S33 are turned on (conduction state) when the first switch control signal SW1C, the second switch control signal SW2C, and the third switch control signal SW3C are at a high level (logic value "1") and are turned off (non-conduction state) when the first switch control signal SW1C, the second switch control signal SW2C, and the third switch control signal SW3C are at a low level (logic value "0").

When the terminal SP11 of the terminal group (SP11 to SP16) is taken as an example, the first switch S10 controlled by the first switch control signal SW1C is connected between the terminal SP11 and the first voltage line 502, the second switch S20 controlled by the second switch control signal SW2C is connected between the terminal SP11 and the second voltage line 503a, and the third switch S30 controlled by the third switch control signal SW3C is connected between the terminal SP11 and the third voltage line 504. Similarly, regarding the remaining terminals SP12 to SP16, the terminals SP are connected to the first voltage line 502 through the first switch, are connected to the second voltage line 503a through the second switch, and are connected to the third voltage line 504 through the third switch.

The first unit logic circuit ULG1(n) includes a buffer circuit BF1, 2-input NOR circuits NR1 and NR2, a 2-input AND circuit AND1, and a flip-flop circuit FF1 having a reset terminal. Here, the flip-flop circuit FF1 is a D-type flip-flop circuit having a reset terminal and includes a reset terminal rst, a clock terminal ck, a data input terminal D, and data output terminals Q and /Q. The data output terminal /Q means an output terminal that outputs an output signal obtained by inverting a phase of an output signal that is output from the data output terminal Q.

The D-type flip-flop circuit FF1 having the reset terminal rst is reset by supplying a low level signal to the reset terminal rst, outputs a low level from the data output terminal Q, and outputs a high level from the data output terminal /Q. On the other hand, when a high level signal is supplied to the reset terminal rst, a voltage of a clock signal ck rises, an input signal supplied to the data input terminal D is fetched, and a signal having the same logic value as a logic value of an input signal supplied to the data input terminal D is output from the data output terminal Q as an output signal. At this time, a signal having a logic value inverted with respect to a logic value of the output signal output from the data output terminal Q is output from the data output terminal /Q as an output signal. When the voltage value of the clock signal ck is maintained and falls down, the D-type flip-flop circuit FF1 having the reset terminal rst holds the fetched input signal and continues to output the output signal corresponding to the fetched input signal from the data output terminals Q and /Q.

All of flip-flop circuits that are used in a plurality of embodiments to be described below are the D-type flip-flops having a reset terminal rst. In this embodiment, since the data output terminal /Q of the flip-flop circuit FF is not used, it is not illustrated.

In the first unit logic circuit ULG1(n), in the touch detection period, the selection signal TP(n) corresponding to the common electrode TL(n) is supplied from the touch semiconductor device 7. The selection signal TP(n) is supplied to the buffer circuit BF1, and the buffer circuit BF1 supplies the selection signal TP(n) to the first unit switch circuit USW1(n) as the first switch control signal SW1C. In addition, the selection signal TP(n) is supplied to one input of the 2-input NOR circuit NR1 and the clock terminal ck of the flip-flop circuit FF1. The control signal VCOMSEL is supplied to the reset terminal rst and the data input terminal D of the flip-flop circuit FF1, and the control signal xVCOMSEL obtained by inverting the phase of the control signal VCOMSEL is supplied to one input of the 2-input NOR circuit NR2. The data output terminal Q of the flip-flop circuit FF1 is connected to the other input of the 2-input NOR circuit NR2.

In addition, the output of the 2-input NOR circuit NR2 is supplied to the first unit switch circuit USW1(n) as the third switch control signal SW3C. Furthermore, the output of the 2-input NOR circuit NR2 is supplied to the other input of the 2-input NOR circuit NR1. The output of the 2-input NOR circuit NR1 and the control signal VCOMSEL are input to the 2-input AND circuit AND1. The output of the 2-input AND circuit AND1 is supplied to the first unit switch circuit USW1(n) as the second switch control signal SW2C.

The control signal VCOMSEL is at a low level in the display period and is at a high level in the display period. Since the control signal VCOMSEL is supplied to the reset terminal rst of the flip-flop circuit FF1, the flip-flop circuit FF1 is reset in the display period and a signal of a low level (logic value "0") is output from the data output terminal Q. On the other hand, since the control signal xVCOMSEL is a signal obtained by inverting the phase of the control signal VCOMSEL, the control signal xVCOMSEL is at a high level (logic value "1") in the display period and is at a low level (logic value "0") in the touch detection period. Therefore, in the display period, the third switch control signal SW3C output from the 2-input NOR circuit NR2 is at a low level.

In addition, in the display period, the selection signal TP(n) is at a low level (logic value "0"), and in the touch detection period, when the common electrode TL(n) corresponding to the selection signal TP(n) is designated as the selected common electrode, the voltage is periodically changed between the high level and the low level, and when the corresponding common electrode TL(n) is designated as the unselected common electrode, the selection signal TP(n) is at a low level.

First, in the display period, since the selection signal TP(n) is at a low level, the buffer circuit BF1 outputs the first switch control signal SW1C of a low level. In addition, in the display period, the third switch control signal SW3C is also at a low level as described above. Therefore, the 2-input NOR circuit NR1 outputs a high level because a low level is supplied to both inputs in the display period. However, in the display period, since the control signal VCOMSEL is at a low level, the second switch control signal SW2C serving as the output signal of the 2-input AND circuit AND1 is at a low level. Accordingly, in the display period, the first to third switch control signals SW1C to SW3C each having a low level are supplied from the first unit logic circuit ULG1($n$) to the corresponding first unit switch circuit USW1($n$).

Therefore, in the display period, the first switches (S10 to S13 in FIG. 8), the second switches (S20 to S23 in FIG. 8), and the third switches (S30 to S33 in FIG. 8) in the corresponding first unit switch circuit USW1($n$) are turned off. As a result, in the display period, each terminal of the terminal group (SP11 to SP16) is electrically isolated from the first to third voltage lines 502, 503a, and 504. In the display period, the image signal from the driver semiconductor device DDIC is supplied to the terminal group (SP11 to SP16) and is transferred to an appropriate signal line as indicated by a broken line by the unit signal line selector 6($n$). In the display period, the common terminals C of the plurality of switches S3 in the unit driving electrode switch LSS(n) are connected to the terminals P1. Therefore, in the display period, the corresponding common electrode TL(n) is connected to the fourth voltage line 503b. Therefore, in the display period, the display driving voltage, that is, the fourth voltage VCOMDC1b, is supplied to the liquid crystal display element by using the common electrode.

In the touch detection period, the voltage of the control signal VCOMSEL is changed from a low level to a high level. Therefore, since the voltage of the reset terminal rst of the flip-flop circuit FF1 is at a high level, the reset of the flip-flop circuit FF1 is released. In the touch detection period, the selection signal corresponding to the selected common electrode is a signal whose voltage is periodically changed, and the selection signal corresponding to the unselected common electrode is at a low level.

In a case where the common electrode TL(n) illustrated in FIG. 8 is set as the selected common electrode, the touch semiconductor device 7 periodically changes the voltage of the selection signal TP(n) corresponding to the common electrode TL(n) in the touch detection period. After the reset is released, since the voltage of the selection signal TP(n) rises, the flip-flop circuit FF1 fetches a logic value corresponding to the voltage of the control signal VCOMSEL. Since the voltage of the control signal VCOMSEL at this time is at a high level, the logic value "1" corresponding to the high level is fetched and held, and a high level signal corresponding to the logic value "1" is output from the data output terminal Q. Therefore, the voltage of the third switch control signal SW3C output from the 2-input NOR circuit NR2 is at a low level. In addition, the buffer circuit BF1 outputs a signal having the same phase as the selection signal TP(n) as the first switch control signal SW1C.

On the other hand, when the third switch control signal SW3C is at a low level, the 2-input NOR circuit NR1 functions as an inverter circuit that inverts the phase of the selection signal TP(n). Therefore, the signal obtained by inverting the phase of the selection signal TP(n) is output from the 2-input NOR circuit NR2. Since the control signal VCOMSEL is at a high level, the 2-input NOR circuit AND1 outputs the output signal of the 2-input NOR circuit NR2 as the second switch control signal SW2C. In the touch detection period, since the common terminal C of the switch S3 constituting the unit driving electrode switch LSS(n) is connected to the terminal P2 by the control signal VCOMSEL of the high level, the terminal group (SP11 to SP16) is electrically connected to the corresponding common electrode TL(n).

The first unit logic circuit ULG1($n$) outputs the first switch control signal SW1C synchronized with the selection signal TP(n) and the second switch control signal SW2C obtained by inverting the phase of the selection signal TP(n). Therefore, the first unit switch circuit USW1($n$) corresponding to the first unit logic circuit ULG1($n$) alternately turns on the first switches S10 to S13 and the second switches S20 to S23 according to the first switch control signal SW1C and the second switch control signal SW2C. As a result, in the touch detection period, the common electrode TL(n) is alternately electrically connected to the first voltage line 502 and the second voltage line 503a. That is, in the touch detection period, the voltage of the common electrode TL(n) designated as the selected common electrode is periodically changed between the first voltage TPH of the first voltage line 502 and the second voltage VCOMDC1a of the second voltage line 503a.

On the other hand, in a case where the selection signal TP(n) designates the common electrode TL(n) as the unselected common electrode in the touch detection period, the selection signal TP(n) maintains at a low level in the touch detection period. Therefore, the flip-flop circuit FF1 maintains a state of when the reset is released, and the flip-flop circuit FF1 outputs a low level signal from the data output terminal Q. In the touch detection period, since the control signal xVCOMSEL is at a low level, the 2-input NOR circuit NR2 outputs the third switch control signal SW3C of a high level. Due to the third switch control signal SW3C of the high level, the 2-input NOR circuit NR1 outputs a low level, and the second switch control signal SW2C output from the 2-input AND circuit AND is also at a low level. In addition, the buffer circuit BF1 outputs the first switch control signal SW1C of the low level in response to the selection signal TP(n) of the low level.

As a result, in the touch detection period, in a case where the selection signal TP(n) setting the corresponding common electrode TL(n) as the unselected common electrode is received, the first unit logic circuit ULG1($n$) performs control such that the third switches S30 to S33 of the corresponding first unit switch circuit USW1($n$) are turned on, performs control such that the first switches S10 to S13 are turned off, and performs control such that the second switches S20 to S23 are also turned off. Therefore, the common electrode TL(n) designated as the unselected common electrode is electrically connected to the third voltage line 504 through the third switches S30 to S33.

The other first unit driving electrode drivers UDG1(0) to UDG(n−1) and UDG(n+1) to UDG(p), which are not illustrated in FIG. 8, are operated in the similar manner. Therefore, in the touch detection period, the driving electrode driver 12 alternately electrically connects the common electrode designated as the selected common electrode to the first voltage line 502 and the second voltage line 503a, and electrically connects the common electrode designated as the unselected common electrode to the third voltage line 504 instead of the second voltage line 503a. That is, in the touch detection period, the voltage line to which the selected common electrode is connected and the voltage line to which the unselected common electrode are separated from each other.

In the first embodiment, since the low-pass filter 506 (FIG. 5) is connected to the connection node nL of the second voltage line 503a and the third voltage line 504, the second voltage line 503a and the third voltage line 504 have the same voltage value in terms of voltage, but the rapid change in the voltage of the third voltage line 504 and the second voltage line 503a is attenuated and transferred to the second voltage line 503a or the third voltage line 504. Therefore, the change in the voltage of the third voltage line 504 due to the unselected common electrode, which occurs when the voltage of the selected common electrode rises as described above with reference to FIGS. 18 and 19, is attenuated and transferred to the second voltage line 503a, and it is possible to reduce the slow voltage rise of the selected common electrode and the detection electrode. In addition, even when the voltage of the selected common electrode falls, it is possible to reduce an amount that charges the third voltage line 504, to which the unselected common electrode is connected, to the third voltage (second voltage). As a result, it is possible to suppress an increase in the fall time of the voltage of the selected common electrode.

Furthermore, in the touch detection period, since the unselected common electrode is connected to the third voltage line 504, as described above with reference to FIGS. 21A and 21B, it is possible to reduce the occurrence of the erroneous detection or speed up the detection. In addition, since the third voltage line 504 has only to fix the voltage of the unselected common electrode, the line width thereof can be further narrowed than the first and second voltage lines 502 and 503a as in the first embodiment, thereby suppressing the increase of the frame.

Operation of Liquid Crystal Display Device

FIGS. 9A to 9G are waveform diagrams illustrating the operation of the liquid crystal display device 1 according to the present embodiment. In FIGS. 9A to 9G, a horizontal axis represents a time and a vertical axis represents a voltage. In addition, for ease of description, only the waveform related to the common electrode TL(n) in the touch detection period is illustrated in FIGS. 9A to 9G. In FIGS. 9A to 9G, the touch detection period (selection) represents the waveform of when the common electrode TL(n) is designated as the selected common electrode, and the touch detection period (unselection) represents the waveform of when the selected common electrode TL(n) is designated as the unselected common electrode. In addition, the signal line precharge period refers to a period in which the signal lines SL(0) to SL(p) are precharged after the touch detection period and an operation of preparing for a next display period is performed. The display period refers to a period in which the display is performed by supplying the image signals to the signal lines SL(0) to SL(p) and sequentially supplying the scan voltages to the scan lines GL(0) to GL(p).

FIG. 9A illustrates a voltage waveform of the selection signal SEL1 The selection signal SEL2 is not illustrated in FIGS. 9A to 9G, but in the display period, the selection signals SEL1 and SEL2 are alternately at a high level. Therefore, in the display period, the image signal from the driver semiconductor device DDIC is supplied to an appropriate signal line. On the other hand, in the touch detection period, both the selection signals SEL1 and SEL2 are at a high level.

In FIG. 9B, a waveform of the control signal VCOMSEL is illustrated. The control signal VCOMSEL is at a low level in the display period and is at a high level in the touch detection period. Although not particularly limited, the control signal VCOMSEL is formed by the driving signal forming unit 17 illustrated in FIG. 1. In addition, although not particularly limited, the driving signal forming unit 17 forms the selection signals TP(0) to TP(p). In FIG. 9C, a waveform of the selection signal TP(n) formed by the driving signal forming unit 17 is illustrated.

The driving signal forming unit 17 periodically changes the selection signal corresponding to the common electrode designated as the selected common electrode, based on the control from the control unit 18, and sets, to a low level, the selection signal corresponding to the common electrode designated as the unselected common electrode. Here, since the common electrode TL(n) is taken as an example, the driving signal forming unit 17 periodically changes the selection signal TP(n) corresponding to the driving electrode TL(n) in the touch detection period (selection). In addition, in the touch detection period (unselection), the selection signal TP(n) is set to a low level.

Since the control signal xVCOMSEL is a signal obtained by inverting the phase of the control signal VCOMSEL, the control signal xVCOMSEL is at a high level in the display period and is at a low level in the touch detection period.

First, the operation in the touch detection period (selection) will be described. Both the selection signals SEL1 and SEL2 are at a high level, and the control signal VCOMSEL is also at a high level. Therefore, the switches S1 and S2 illustrated in FIG. 8 are turned on, and the common terminal C of the switch S3 is connected to the terminal P2. As a result, the terminal group (SP11 to SP14: FIG. 8) is electrically connected to the common electrode TL(n).

When the control signal VCOMSEL is changed from a low level to a high level in the touch detection period (selection), the reset of the flip-flop circuit FF1 (FIG. 8) is released. After the reset is released, when the selection signal TP(n) is changed from a low level to a high level, the flip-flop circuit FF1 fetches and holds a logic value "1" corresponding to the high level of the control signal VCOMSEL. Therefore, as illustrated in FIG. 9D, the voltage of the data output terminal Q of the flip-flop circuit FF1 is at a high level corresponding to the fetched logic value "1".

Since the voltage of the data output terminal Q of the flip-flop circuit FF1 is at a high level, as described above with reference to FIG. 8, the first unit logic circuit ULG1(n) outputs the third switch control signal SW3C of a low level (FIG. 9E). In addition, the first unit logic circuit ULG1(n) outputs the first switch control signal SW1C having the same phase as the selection signal TP(n) and the second switch control signal SW2C obtained by inverting the phase of the selection signal TP(n), based on the selection signal TP(n) (FIGS. 9F and 9G). Therefore, the first unit switch circuit USW1(n) alternately electrically connects the common electrode TL(n) designated as the selected common electrode to the first voltage line 502 and the second voltage line 503a. That is, the first unit driving electrode driver UDG1(n) alternately electrically connects the common electrode TL(n) corresponding thereto to the first voltage line 502 and the second voltage line 503a.

At this time, the driving signal forming unit 17 supplies, for example, the selection signals TP(0) to TP(n−1) and TP(n+1) to TP(p), which designate the unselected common electrodes, to the other first unit driving electrode drivers UDG1(0) to UDG1(n−1) and UDG(n+1) to UDG1(p). Therefore, in the first unit logic circuits ULG1(0) to ULG1(n−1) and ULG(n+1) to ULG1(p) of the other first unit driving electrode drivers UDG1(0) to UDG1(n−1) and UDG(n+1) to UDG1(p), since the voltage of the clock terminal ck of the flip-flop circuit FF1 is not changed, the voltage of the data output terminal Q of the flip-flop circuit FF1 is maintained at the voltage of when the reset is released. That is, in the first unit logic circuits ULG1(0) to ULG1(n−1) and ULG(n+1) to ULG(p), the voltage of the data output terminal Q of the flip-flop circuit FF1 is at a low level.

Therefore, the first unit logic circuits ULG1(0) to ULG1(n−1) and ULG(n+1) to ULG(p) output the third switch control signal SW3C of a high level, which turn on the third switches S30 to S33, and the first switch control signal SW1C of a low level and the second switch control signal SW2C of a low level, which turn off the first switches S10 to S13 and the second switches S20 to S23, to the corresponding first unit switch circuits USW1(0) to USW1(n−1) and USW1(n+1) to USW1(p). Therefore, the first unit switch circuits USW1(0) to USW1(n−1) and USW1(n+1) to USW1(p) electrically connect the corresponding common electrodes TL(0) to TL(n−1) and TL(n+1) to TL(p) to the third voltage line 504, respectively.

That is, in the touch detection period, the driving electrode driver 12 alternately electrically connects the common electrode TL(n) designated as the selected common electrode to the first voltage line 502 and the second voltage line 503a, and electrically connects the common electrodes TL(0) to TL(n−1) and TL(n+1) to TL(p) designated as the unselected common electrode to the third voltage line 504. Therefore, in the touch detection period (selection), the first voltage TPH and the second voltage VCOMDC1a are alternately supplied to the common electrode TL(n) designated as the selected common electrode, and the third voltage VCOMDC2 is supplied to each of the common electrodes TL(0) to TL(n−1) and TL(n+1) to TL(p) designated as the unselected common electrodes. In this state, it is possible to detect whether or not the vicinity of the selected common electrode TL(n) is touched by determining the signals of the detection electrodes RL(0) to RL(p).

In FIGS. 9A to 9G, in the touch detection period (unselection), the driving signal forming unit 17 designates the common electrode TL(n) as the unselected common electrode and designates another common electrode as the selected common electrode. That is, in the touch detection period (unselection), the driving signal forming unit 17 supplies the selection signal TP(n) of a low level, as illustrated in FIG. 9C, to the first unit driving electrode driver UDG1(n) corresponding to the common electrode TL(n), and supplies the selection signal (for example, the selection signal TP(i)), whose voltage value is periodically changed, to any one of the first unit driving electrode drivers UDG1(0) to UDG1(n−1) and UDG(n+1) to UDG1(p).

In the flip-flop circuit FF1 (FIG. 8) of the first unit driving electrode driver UDG1(n), since the voltage of the clock terminal ck is not changed, the voltage of the low level when the reset is released is continuously output from the data output terminal Q (FIG. 9D). As a result, as illustrated in FIGS. 9E and 9G, the first unit logic circuit ULG1(n) of the first unit driving electrode driver UDG1(n) sets the third switch control signal SW3C to a high level and sets each of the first switch control signal SW1C and the second switch control signal SW2C to a low level. On the other hand, in the first unit driving electrode driver UDG1(i) to which the selection signal TP(i) whose voltage is periodically changed is supplied, in a similar manner to that described in the touch detection period (selection), the data output terminal Q of the flip-flop circuit FF1 of the first unit driving electrode driver UDG1(i) is at a high level, the third switch control signal SW3C is at a low level, and each of the first switch control signal SW1C and the second switch control signal SW2C is changed according to the change in the voltage of the selection signal TP(i).

In the touch detection period, the flip-flop circuit FF1 determines whether or not the corresponding common electrode is designated as the selected common electrode, according to whether the voltage of the supplied selection signal TP(n) rises. That is, the flip-flop circuit FF1 can be regarded as a determination circuit that determines whether or not the corresponding common electrode is the selected common electrode, based on the selection signal TP(n).

In the first embodiment, in the touch detection period, the voltage of the selected common electrode is supplied from the first or second voltage line 502 or 503a by the first unit switch circuits USW1(0) to USW1(p). That is, it is the (1) DC driving described above. Therefore, in the case where the voltage of the selected common electrode is periodically changed, for example, between 0 V and 5.5 V, a voltage amplitude of the selection signal that designates the selected common electrode may be, for example, between 0 V and 1.8 V, and the driving capability may also be low. As a result, it is possible to improve the degree of freedom of the arrangement of the signal lines for supplying the selection signals, while suppressing the erroneous detection, thereby making it possible to reduce the size of the liquid crystal display device. In addition, one third voltage line 504 may be provided with respect to all the common electrodes arranged in the liquid crystal element array LCD, but a plurality of third voltage lines 504 may be provided. For example, the third voltage lines 504 may be provided to twenty to forty common electrodes one by one.

It is expected that the number of the common electrodes designated as the unselected common electrodes is large as compared with the number of the common electrodes designated as the selected common electrodes in the touch detection period. According to the present embodiment, since the selected common electrode is not connected to the same voltage lines as the many unselected common electrodes, it is possible to prevent the voltage rise of the selected common electrode or the detection electrode from being slow. In addition, it is possible to prevent the voltage fall of the selected common electrode from being slow.

Second Embodiment

In the second embodiment, two driving electrode drivers are provided with respect to each common electrode. The following description will be given with reference to the module illustrated in FIG. 5. The liquid crystal display device according to the second embodiment includes the first driving electrode driver 12 arranged along one short side 501-D of the region (liquid crystal panel) 501, and the second driving electrode driver 12-U arranged along the other short side 501-U of the region 501. That is, the first and second driving electrode drivers 12 and 12-U are arranged such that the region (liquid crystal panel) 501 is interposed in the extending direction of the common electrodes TL(0) to TL(p).

The overview of the second driving electrode driver 12-U has been described above with reference to FIG. 7, but the second driving electrode driver 12-U is configured by the second logic circuit US2 and the second switch circuit SW2. In addition, the second logic circuit US2 is configured by a plurality of second unit logic circuits ULG2(0) to ULG2(p) respectively corresponding to the common electrodes TL(0) to TL(p), and the second switch circuit SW2 is also configured by a plurality of second unit switch circuits USW2(0) to USW2(p) respectively corresponding to the common electrodes TL(0) to TL(p). Here, the first driving electrode driver 12 is the same as the driving electrode driver 12 described above in the first embodiment.

Figure 10:
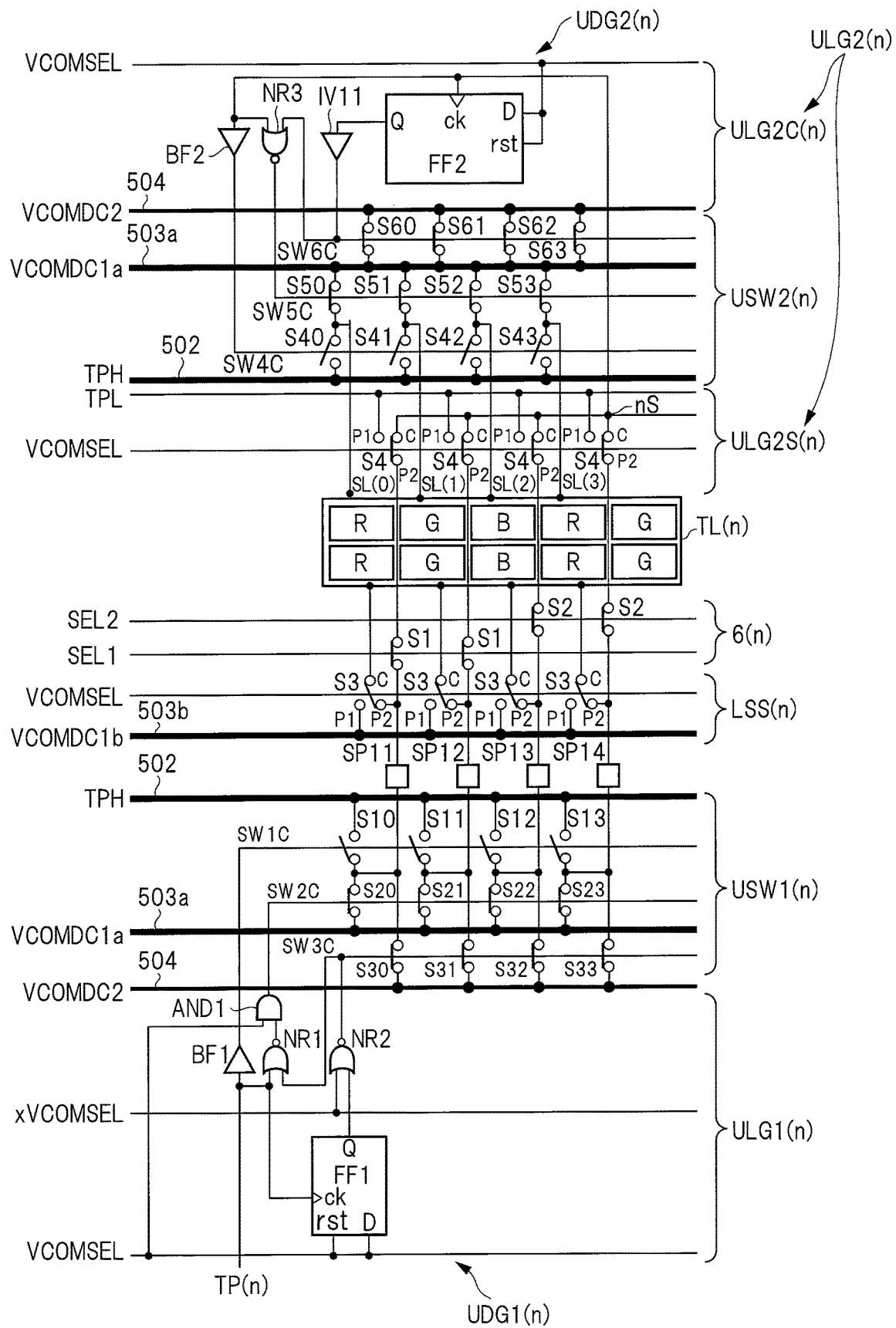
FIG. 10 is a circuit diagram illustrating a configuration of a liquid crystal display device according to a second embodiment.

Configuration of First Driving Electrode Driver 12 and Second Driving Electrode Driver 12-U FIG. 10 is a circuit diagram illustrating the configuration of the liquid crystal display device according to the second embodiment. The second unit logic circuits ULG2(0) to ULG2(p) have the same configuration, and the second unit switch circuits USW2(0) to USW2(p) also have the same configuration. Therefore, in the same drawing, only the configurations of the second unit logic circuit ULG2(n) and the second unit switch circuit USW2(n) in the liquid crystal display device illustrated in FIG. 7 are representatively illustrated. In addition, in the same drawing, the configurations of the common electrode TL(n) corresponding to the second unit driving electrode driver UDG2(n), which is configured by the second unit logic circuit ULG2(n) and the second unit switch circuit USW2(n), and the first unit driving electrode driver UDG1(n) corresponding to the common electrode TL(n) are illustrated.

In FIG. 10, since the configuration and operation of the first unit driving electrode driver UDG1(n) are the same as the configuration and operation described above with reference to FIGS. 8 and 9, a detailed description thereof will be omitted. For ease of description, the signals corresponding to the common electrode TL(n) are represented as SL(0) to SL(3) in the same drawing. In addition, each of "R", "G", and "B" illustrated in FIG. 10 represents a subpixel SPix. In the display period, the image signals are supplied to the signal lines SL(0) to SL(3), and the fourth voltage VCOMDC1b is supplied to the common electrode TL(n) corresponding to the signal lines SL(0) to SL(3). By sequentially supplying the voltages to the scan lines that are not illustrated in the same drawing, the voltages of the image signals of the signal lines SL(0) to SL(3) and the fourth voltage VCOMDC1b of the common electrode TL(n) are applied to the liquid crystal display elements, and the display is performed according to the image signals.

The second unit switch circuit USW2(n) includes fourth switches S40 to S43 connected in parallel between the first voltage line 502 and the corresponding common electrode TL(n), fifth switches S50 to S53 connected in parallel between the second voltage line 503a and the corresponding common electrode TL(n), and sixth switches S60 to S63 connected in parallel between the second voltage line 503a and the third voltage line 504. Here, the fourth switches S40 to S43 are controlled according to a voltage of a fourth switch control signal SW4C from the corresponding second unit logic circuit ULG2(n), and the fifth switches S50 to S53 are controlled according to a voltage of a fifth switch control signal SW5C from the corresponding second unit logic circuit ULG2(n). Similarly, the sixth switches S60 to S63 are controlled according to a voltage of a sixth switch control signal SW6C from the corresponding second unit logic circuit ULG2(n).

In this embodiment, when the fourth switch control signal SW4C is at a high level, the fourth switches S40 to S43 are turned on, and when the fourth switch control signal SW4C is at a low level, the fourth switches S40 to S43 are turned off. In addition, when the fifth switch control signal SW5C is at a high level, the fifth switches S50 to S53 are turned on, and when the fifth switch control signal SW5C is at a low level, the fifth switches S50 to S53 are turned off. Similarly, when the sixth switch control signal SW6C is at a high level, the sixth switches S60 to S63 are turned on, and when the sixth switch control signal SW6C is at a low level, the sixth switches S60 to S63 are turned off.

Although not particularly limited, the second unit logic circuit ULG2(n) includes a switch circuit ULG2S(n) and a logic circuit ULG2C(n). The logic circuit ULG2C(n) receives the selection signal from the corresponding first unit driving electrode driver UDG1(n) through the switch circuit ULG2S(n) and the signal lines SL(0) to SL(3), forms the fourth to sixth switch control signals SW4C to SW6C, and supplies the fourth to sixth switch control signals SW4C to SW6C to the second unit switch circuit USW2(n).

The switch circuit ULG2S(n) includes a plurality of seventh switches S4 connected in parallel between the corresponding signal lines SL(0) to SL(3) and a node nS. Each of the seventh switches S4 includes a common terminal C and one pair of terminals P1 and P2, and is controlled such that the common terminal C is connected to the terminal P1 or P2 according to the voltage of the control signal VCOMSEL. The common terminal C of the plurality of seventh switches S4 is connected to the node nS, a predetermined voltage TPL is supplied to the terminal P1, and the terminal P2 is connected to the corresponding signal lines SL(0) to SL(3). In this embodiment, when the control signal VCOMSEL is at a high level, each of the seventh switches S4 connects the common terminal C to the terminal P2. On the other hand, when the control signal VCOMSEL is at a low level, each of the seventh switches S4 connects the common terminal C to the terminal P1. Here, for example, a voltage value of the voltage TPL supplied to the terminal P1 of the seventh switch S4 is set to a value lower than the first voltage TPH.

Therefore, the seventh switches S4 connect the node nS to the signal lines SL(0) to SL(3) when the control signal VCOMSEL is at a high level, and connects the node nS to a predetermined potential TPL when the control signal VCOMSEL is at a low level. As described above, the control signal VCOMSEL is at a high level in the touch detection period and is at a low level in the display period. Therefore, in the touch detection period, the switch circuit ULG2S(n) transfers the voltages of the corresponding signal lines SL(0) to SL(3) to the node nS. On the other hand, in the display period, the voltage of the node nS is fixed to the predetermined voltage TPL.

In the touch detection period, as described above in the first embodiment, the switches S1 and S2 of the corresponding unit signal line selector 6(n) are turned on by the selection signals SEL1 and SEL2. Therefore, in the touch detection period, the voltages of the signal lines SL(0) to SL(3) are equal to the voltage of the corresponding common electrode TL(n). When the common electrode TL(n) is designated as the selected common electrode, the voltage of the common electrode TL(n) is changed in synchronization with the voltage of the selection signal TP(n). In addition, when the common electrode TL(n) is designated as the unselected common electrode, the voltages of the signal lines SL(0) to SL(3) are at the same low level as the voltage of the common electrode TL(n). Therefore, in the touch detection period, the signals of the signal lines SL(0) to SL(3) can be regarded as the selection signals synchronized with the selection signal TP(n). When regarded as above, in the touch detection period, the selection signal corresponding to the selection signal TP(n) is transferred to the node nS. On the other hand, in the display period, since the common terminal C of the seventh switches S4 is connected to the terminal P1, the signal lines SL(0) to SL(3) are electrically isolated from the node nS. In addition, in the display period, since the voltage of the node nS is fixed to the predetermined voltage TPL, it is possible to prevent the voltage of the node nS from being undesirably changed by a noise or the like.

The logic circuit ULG2C(n) includes a flip-flop circuit FF2 having a reset terminal rst, a buffer circuit BF2, an inverter circuit IV11, and a 2-input NOR circuit NR3.

Similar to the flip-flop circuit FF1, the flip-flop circuit FF2 having the reset terminal rst is a D-type flip-flop circuit having a reset terminal. The control signal VCOMSEL is supplied to the reset terminal rst and a data input terminal D of the flip-flop circuit FF2, and a clock terminal ck of the flip-flop circuit FF2 is connected to the node nS. That is, the selection signal from the switch circuit ULG2S(n) is supplied to the clock terminal ck of the flip-flop circuit FF2. Therefore, when the voltages of the signal lines SL(0) to SL(3) corresponding to the common electrode TL(n) are changed in the touch detection period, the flip-flop circuit FF2 fetches and stores a logic value "1" of the control signal VCOMSEL of a high level, and the voltage of the data output terminal Q is at a high level corresponding to the fetched logic value "1".

On the other hand, when the voltages of the signal lines SL(0) to SL(3) corresponding to the common electrode TL(n) are not changed in the touch detection period, the flip-flop circuit FF2 holds a logic value "0" of when reset, and the voltage of the data output terminal Q is at a low level corresponding to the logic value "0".

In the touch detection period, the voltages of the signal lines SL(0) to SL(3) are changed in synchronization with the voltage of the corresponding common electrode TL(n). Therefore, in the touch detection period, when the corresponding common electrode TL(n) is designated as the selected common electrode, the data output terminal Q of the flip-flop circuit FF2 outputs a high level. On the other hand, in the touch detection period, when the corresponding common electrode TL(n) is designated as the unselected common electrode, the data output terminal Q outputs a low level. In addition, in the display period, since the control signal VCOMSEL is at a low level, the flip-flop circuit FF2 is reset. Since the flip-flop circuit FF2 is reset, the data output terminal Q of the flip-flop circuit FF2 outputs a low level.

The data output terminal Q of the flip-flop circuit FF2 is connected to the input of the inverter circuit IV11. Therefore, in the touch detection period, when the corresponding common electrode TL(n) is designated as the selected common electrode, a high level is input to the inverter circuit IV11. Therefore, in the touch detection period, when the corresponding common electrode TL(n) is designated as the selected common electrode, the inverter circuit IV11 outputs the sixth switch control signal SW6C of a low level. On the other hand, in the touch detection period, when the corresponding common electrode TL(n) is designated as the unselected common electrode, the low level is input to the inverter circuit IV11, and thus, the inverter circuit IV11 outputs the sixth switch control signal SW6C of a high level. In addition, in the display period, since the voltage of the data output terminal Q of the flip-flop circuit FF2 is at a low level, the inverter circuit IV11 outputs the sixth switch control signal SW6C of a high level.

In summary, the sixth switch control signal SW6C is at a high level in the display period and in the period of the touch detection period in which the corresponding common electrode TL(n) is designated as the unselected common electrode. On the other hand, in the touch detection period, the sixth switch control signal SW6C is at a low level in the period in which the corresponding common electrode TL(n) is designated as the selected common electrode. Therefore, in the display period, each of the sixth switches S60 to S63 electrically connects the second voltage line 503a and the third voltage line 504. Even in the second embodiment, as described above with reference to FIG. 5, a line width of the third voltage line 504 is narrower than line widths of the first and second voltage lines 502 and 503a, and the second voltage line 503a, the third voltage line 504, and the low-pass filter 506 are connected to one another.

In the display period, as described above in the first embodiment, the common terminal C of the switch S3 in the unit driving electrode switch LSS(n) is connected to the terminals P1. Therefore, in the display period, the common electrode TL(n) being one terminal of the liquid crystal display element is connected to the fourth voltage line 503b. In the second embodiment, in the display period, the third voltage line 504 and the second voltage line 503a are connected to each other through the sixth switches S60 to S63. Therefore, in the display period, it is possible to stabilize the voltage (second voltage VCOMDC1a and VCOMDC2) supplied to one terminal of the liquid crystal display element.

The input of the buffer circuit BF2 and one input of the 2-input NOR circuit NR3, which are included in the logic circuit ULG2C(n), are connected to the node nS, and the sixth switch control signal SW6C is supplied to the other input of the 2-input NOR circuit NR3. The buffer circuit BF2 buffers the voltage of the node nS (selection signal) in the touch detection period and supplies the buffered voltage to the fourth switches S40 to S43 as the fourth switch control signal SW4C. In addition, in the touch detection period, the output of the 2-input NOR circuit NR3 is supplied to the fifth switches S50 to S53 as the fifth switch control signal SW5C.

In the touch detection period, when the corresponding common electrode TL(n) is designated as the selected common electrode, the voltages of the signal lines SL(0) to SL(3) are periodically changed according to the change in the voltage of the selection signal TP(n) by the first unit driving electrode driver UDG1(n). Since the change in the voltages of the signal lines SL(0) to SL(3) is transferred to the node nS through the switch circuit ULG2S(n), the voltage of the fourth switch control signal SW4C is also periodically changed in the touch detection period. Therefore, the fourth switches S40 to S43 are periodically turned on, and when turned on, electrically connect the first voltage line 502 to the corresponding common electrode TL(n).

In the touch detection period, as described above, the voltage of the sixth switch control signal SW6C supplied to the other input of the 2-input NOR circuit NR3 is changed according to whether the corresponding common electrode TL(n) is designated as the selected common electrode or is designated as the unselected common electrode. That is, the voltage of the sixth switch control signal SW6 is at a low level when the corresponding common electrode TL(n) is designated as the selected common electrode, and is at a high level when the corresponding common electrode TL(n) is designated as the unselected common electrode. Therefore, in the touch detection period, when the corresponding common electrode TL(n) is designated as the selected common electrode, the 2-input NOR circuit NR3 functions as an inverter circuit that inverts the selection signal of the node nS and outputs the phase-inverted signal as the fifth switch control signal SW5C. On the other hand, when the corresponding common electrode TL(n) is designated as the unselected common electrode, the 2-input NOR circuit NR3 outputs the fifth switch control signal SW5C of a low level.

As a result, when the corresponding common electrode is designated as the unselected common electrode, the fifth switches S50 to S53 electrically isolate the second voltage line 503a from the corresponding common electrode TL(n). On the other hand, when the corresponding common electrode is designated as the selected common electrode, the fifth switches S50 to S53 periodically connect the second voltage line 503a and the corresponding common electrode TL(n) according to the voltage of the node nS. When the second voltage line 503a and the common electrode TL(n) are electrically connected to each other by the fifth switches S50 to S53, the 2-input NOR circuit NR3 that outputs the fifth switch control signal SW5C functions as an inverter circuit that inverts the voltage of the node nS, and thus, the fourth switches S40 to S43 and the fifth switches S50 to S53 are complementarily turned on.

Therefore, in the touch detection period, when the corresponding common electrode TL(n) is designated as the selected common electrode, the second unit driving electrode driver UDG2(n) alternately electrically connects the corresponding common electrode TL(n) to the first voltage line 502 and the second voltage line 503a through the signal lines SL(0) to SL(3) according to the voltage of the common electrode TL(n) that is transferred to the node nS. As a result, when the corresponding common electrode TL(n) is designated as the selected common electrode, one end of the common electrode TL(n) is alternately connected to the first voltage line 502 and the second voltage line 503a by the first unit driving electrode driver UDG1(n), and the other end is alternately connected to the first voltage line 502 and the second voltage line 503a by the second unit driving electrode driver UDG2(n). Therefore, it is possible to rapidly change the selected common electrode (common electrode TL(n)) between the first voltage TPH and the second voltage VCOMDC1a while suppressing an increase in an area occupied by the driving electrode drivers 12 and 12-U.

In addition, in the second embodiment, when the corresponding common electrode TL(n) is designated as the unselected common electrode, one end of the common electrode TL(n) is electrically connected to the third voltage line 504 by the first unit driving electrode driver UDG1(n) as described above in the first embodiment. On the other hand, the other end of the common electrode TL(n) is electrically isolated from the second voltage line 503a by the second unit driving electrode driver UDG2(n). Therefore, since the second voltage VCOMDC1a is supplied to the selected common electrode, it is possible to prevent the unselected common electrode from being connected to the second voltage line 503a to which the selected common electrode is connected. As a result, it is possible to prevent the voltage rise of the selected common electrode and the detection electrode from being slow. In addition, it is possible to prevent the voltage fall of the selected common electrode from being slow.

In FIG. 10, the first unit driving electrode driver UDG1(n) and the second unit driving electrode driver UDG2(n) have been described as an example, but the same applies to the remaining first unit driving electrode drivers UDG1(0) to UDG1(n−1), UDG1(n+1) to UDG1(p) and the second unit driving electrode drivers UDG2(0) to UDG2(n−1), UDG2(n+1) to UDG2(p).

In FIG. 10, the four signal lines SL(0) to SL(3) corresponding to the terminals SP11 to SP14 have been described as an example, but the number thereof is not limited. However, as illustrated in FIG. 10, by connecting the plurality of signal lines SL(0) to SL(3) in parallel, it is possible to shorten the signal transfer delay time from the first unit driving electrode driver UDG1(n) to the second unit driving electrode driver UDG2(n). In addition, in this embodiment, the signal lines SL(0) to SL(3) are used to transfer the image signals in the display period and are also used to transfer the voltage of the common electrode TL(n) in the touch detection period. Therefore, since it is unnecessary to provide new signal lines, it is possible to prevent the frame from being increased due to such new signal lines.

Third Embodiment

In a third embodiment, a liquid crystal display device having a plurality of touch detection methods is provided. For example, a user selects a desired touch detection method from a plurality of touch detection methods, and the selected touch detection method is used in the liquid crystal display device. Here, a liquid crystal display device having a mutual capacitance method and a self-capacitance method as the plurality of touch detection methods will be described as an example. Since the mutual capacitance method has been described above with reference to FIGS. 2A to 2C, the principle of the self-capacitance method will be described below.

Basic Principle of Capacitance Type Touch Detection (Self-Capacitance Method)

Figure 11A:
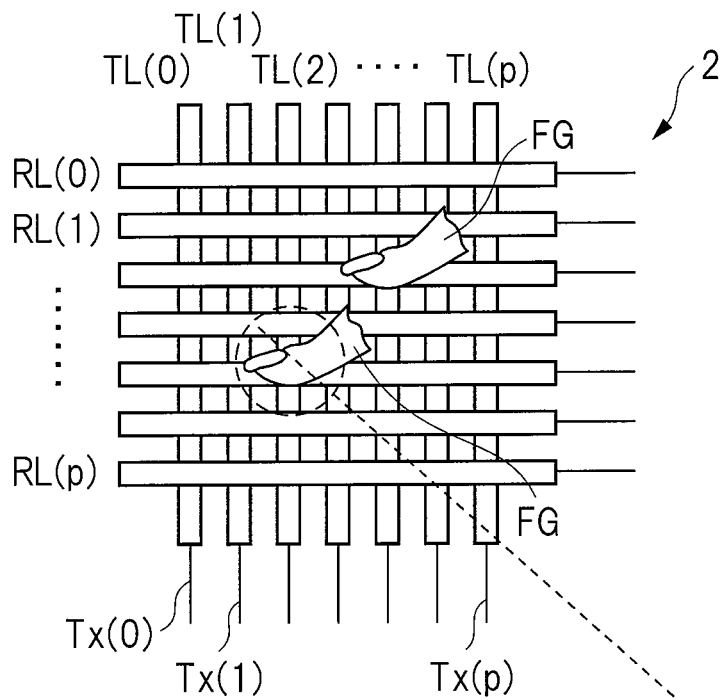
FIGS. 11A to 11C are explanatory diagrams for describing a basic principle of a capacitance type touch detection (self-capacitance method)
Figure 11B:
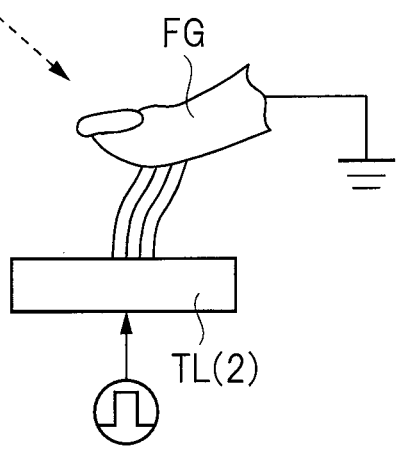
Figure 11C:
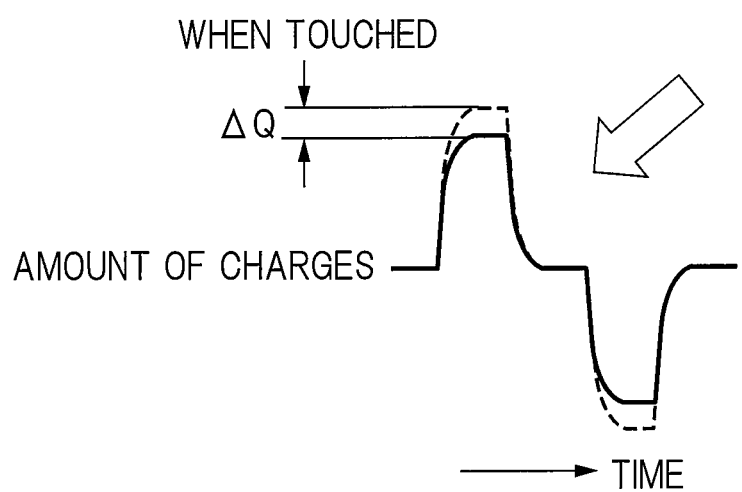

FIGS. 11A to 11C are explanatory diagrams for describing a basic principle of a self-capacitance type touch detection. In FIG. 11A, TL(0) to TL(p) are common electrodes that extend in a column direction and are arranged in parallel in a row direction, and RL(0) to RL(p) are detection electrodes that are arranged to intersect with the common electrodes TL(0) to TL(p). The detection electrodes RL(0) to RL(p) extend in the row direction and are arranged in parallel in the column direction so as to intersect with the common electrodes TL(0) to TL(p). In addition, when seen in a plan view, the common electrodes TL(0) to TL(p) and the detection electrodes RL(0) to RL(p) appear to intersect with each other, but an insulating layer is interposed between the common electrodes TL(0) to TL(p) and the detection electrodes RL(0) to RL(p) so as not to electrically contact each other.

Here, for convenience of description, although TL(0) to TL(p) are the common electrodes and RL(0) to RL(p) are the detection electrodes, but a driving signal is supplied to each of the common electrodes TL(0) to TL(p) and the detection electrodes RL(0) to RL(p), and detection signals are output from the common electrodes TL(0) to TL(p) and the detection electrodes RL(0) to RL(p). Therefore, from the viewpoint that detects a touch of an external object, the common electrodes TL(0) to TL(p) and the detection electrodes RL(0) to RL(p) can be all regarded as detection electrodes.

In the self-capacitance type touch detection, the detection principle using the common electrodes TL(0) to TL(p) is identical to the detection principle using the detection electrodes RL(0) to RL(p). Hereinafter, in the description of FIGS. 11B and 11C, the common electrodes TL(0) to TL(p)

and the detection electrodes RL(0) to RL(p) are collectively referred to as detection electrodes.

A parasitic capacitance exists between the respective detection electrodes (the common electrodes TL(0) to TL(p) and the detection electrodes RL(0) to RL(p)) and the ground voltage. When a finger FG as the external object touches the vicinity of the detection electrode, an electric field is generated between the detection electrode and the finger FG as illustrated in FIG. 11B. In other words, when the finger FG comes closer, a capacitance connected between the detection electrode and the ground voltage increases. Therefore, as encircled in FIG. 11B, when the driving signal whose voltage is changed in a pulse shape is supplied to the detection electrode, an amount of charges accumulated between the detection electrode and the ground voltage is changed according to whether or not the vicinity of the detection electrode is touched.

FIG. 11C illustrates a change in an amount of charges accumulated in the detection electrode according to whether or not the finger FG touches the vicinity of the detection electrode. When the finger FG touches the vicinity of the detection electrode, the capacitance connected to the detection electrode is increased. Therefore, when the pulse-shaped driving signal is supplied to the detection electrode, the amount of charges accumulated in the detection electrode is increased by $\Delta Q$ as compared with the case where the vicinity of the detection electrode is not touched. In FIG. 11C, a horizontal axis represents a time and a vertical axis represents an amount of charges. In addition, in FIG. 11C, a broken line represents a change in the amount of charges when the vicinity of the detection electrode is touched. When the driving signal is supplied to the detection electrode, whether or not the vicinity of the detection electrode is touched can be detected by detecting the difference $\Delta Q$ of the amount of charges accumulated in the detection electrode.

Configuration of Touch Semiconductor Device 7

Figure 12:
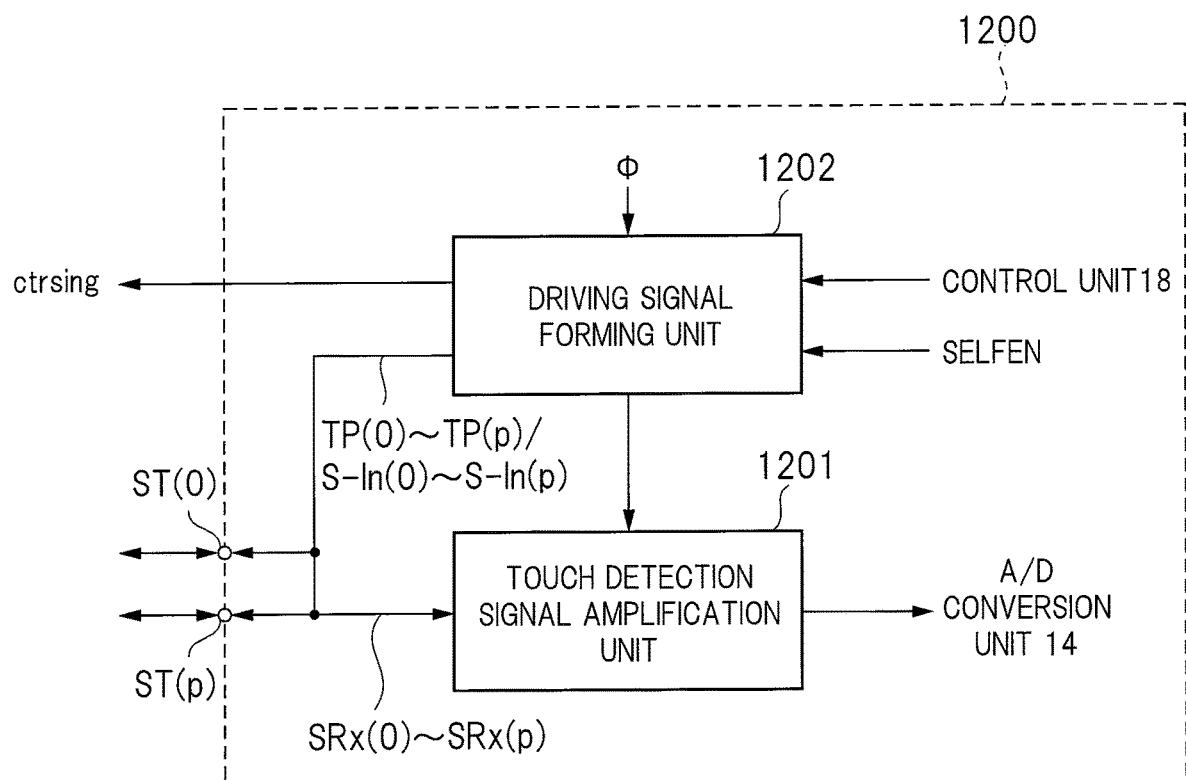
FIG. 12 is a block diagram illustrating a configuration of a semiconductor device for a touch according to a third embodiment.

FIG. 12 is a block diagram illustrating a configuration of a touch semiconductor device 1200 used in the third embodiment. In FIG. 12, only a portion different from the touch semiconductor device 7 illustrated in FIG. 1 is illustrated. In the touch semiconductor device 1200 according to the third embodiment, a touch detection signal amplification unit 1201 is provided in addition to the touch detection signal amplification unit 13 illustrated in FIG. 1. The A/D conversion unit 14, the signal processing unit 15, the coordinate extraction unit 16, and the detection timing control unit 19, which are illustrated in FIG. 1, are also provided in the touch semiconductor device 1200 of the third embodiment, and they are identical to those in the first embodiment. Therefore, they are omitted in FIG. 12.

In FIG. 12, 1202 represents a driving signal forming unit that is similar to the driving signal forming unit 17 illustrated in FIG. 1. Similar to the driving signal forming unit 17 illustrated in FIG. 1, when a detection method designation signal SELFEN designating the touch detection method designates the mutual capacitance method, the driving signal forming unit 1202 forms the selection signals TP(0) to TP(p) and the control signal ctrsig, based on the control signal from the control unit 18. Although not particularly limited, the driving signal forming unit 1202 receives a clock signal φ and forms the selection signal designating the selected common electrode, based on the clock signal φ. That is, a voltage of the selection signal (for example, the selection signal TP(n)) designating the selected common electrode is changed in synchronization with the clock signal φ.

On the other hand, when the detection method designation signal SELFEN designates the self-capacitance method described above with reference to FIGS. 11A to 11C, the driving signal forming unit 1202 forms the driving signals S-In(0) to S-In(p) synchronized with the clock signal φ and outputs the driving signals through the terminals ST(0) to ST(p).

A touch detection signal amplification unit 1201 receives the detection signals SRx(0) to SRx(p) from the common electrodes TL(0) to TL(p), amplifies a difference of an amount of charges, which occurs according to whether or not the vicinity of the common electrode is touched, as a voltage difference, and outputs the voltage difference to the A/D conversion unit 14 illustrated in FIG. 1. In the third embodiment, although not particularly limited, the terminals ST(0) to ST(p) are used as input/output common terminals. That is, the terminals ST(0) to ST(p) function as output terminals when supplying the driving signals S-In(0) to S-In(p) to the common electrodes TL(0) to TL(p), and function as input terminals when receiving the detection signals SRx(0) to SRx(p) from the common electrodes TL(0) to TL(p).

When the detection method designation signal SELFEN designates the self-capacitance method, the driving signal forming unit 1202 informs the touch detection signal amplification unit 1201 of a timing signal indicating a timing at which the driving signals S-In(0) to S-In(p) are formed. The touch detection signal amplification unit 1201 amplifies the signals of the terminals ST(0) to ST(p) as the detection signals SRx(0) to SRx(p), based on the timing signal supplied from the driving signal forming unit 1202. Therefore, the voltages of the common electrodes TL(0) to TL(p) are changed based on the driving signals S-In(0) to S-In(p), and the voltage change occurring in the common electrodes TL(0) to TL(p) by the presence or absence of the touch can be amplified by the touch detection signal amplification unit 1602.

Although not particularly limited, the detection method designation signal SELFEN is formed by the control unit 18 according to the user's setting and is supplied to the first driving electrode driver 12 and the second driving electrode driver 12-U. For example, the detection method designation signal SELFEN designates the self-capacitance method as the detection method when the voltage thereof is at a high level, and designates the mutual capacitance method as the detection method when the voltage thereof is at a low level. In addition, the detection method designation signal SELFEN is at a low level in the display period. Therefore, the detection method designation signal SELFEN can be regarded as a self-capacitance method enable signal.

Configuration of First Driving Electrode Driver 12 and Second Driving Electrode Driver 12-U In the third embodiment, in the liquid crystal display device illustrated in FIG. 7, the configurations of the plurality of first unit driving electrode drivers UDG1(0) to UDG1(p) constituting the first driving electrode driver 12 and the plurality of second unit driving electrode drivers UDG2(0) to UDG2(p) constituting the second driving electrode driver 12-U are changed. Even in the third embodiment, the first unit driving electrode drivers UDG1(0) to UDG1(p) have the same configuration, and the second unit driving electrode drivers UDG2(0) to UDG2(p) also have the same configuration. Here, the first unit driving electrode driver UDG1(n) and the second unit driving electrode driver UDG2(n) will be representatively described. Even in the third embodiment, as in the first and second embodiments, a line width of the third voltage line 504 is narrower than line widths of the first and second voltage lines 502 and 503a, and the second voltage line 503a, the third voltage line 504, and the low-pass filter 506 are connected to one another as illustrated in FIG. 5.

Figure 13:
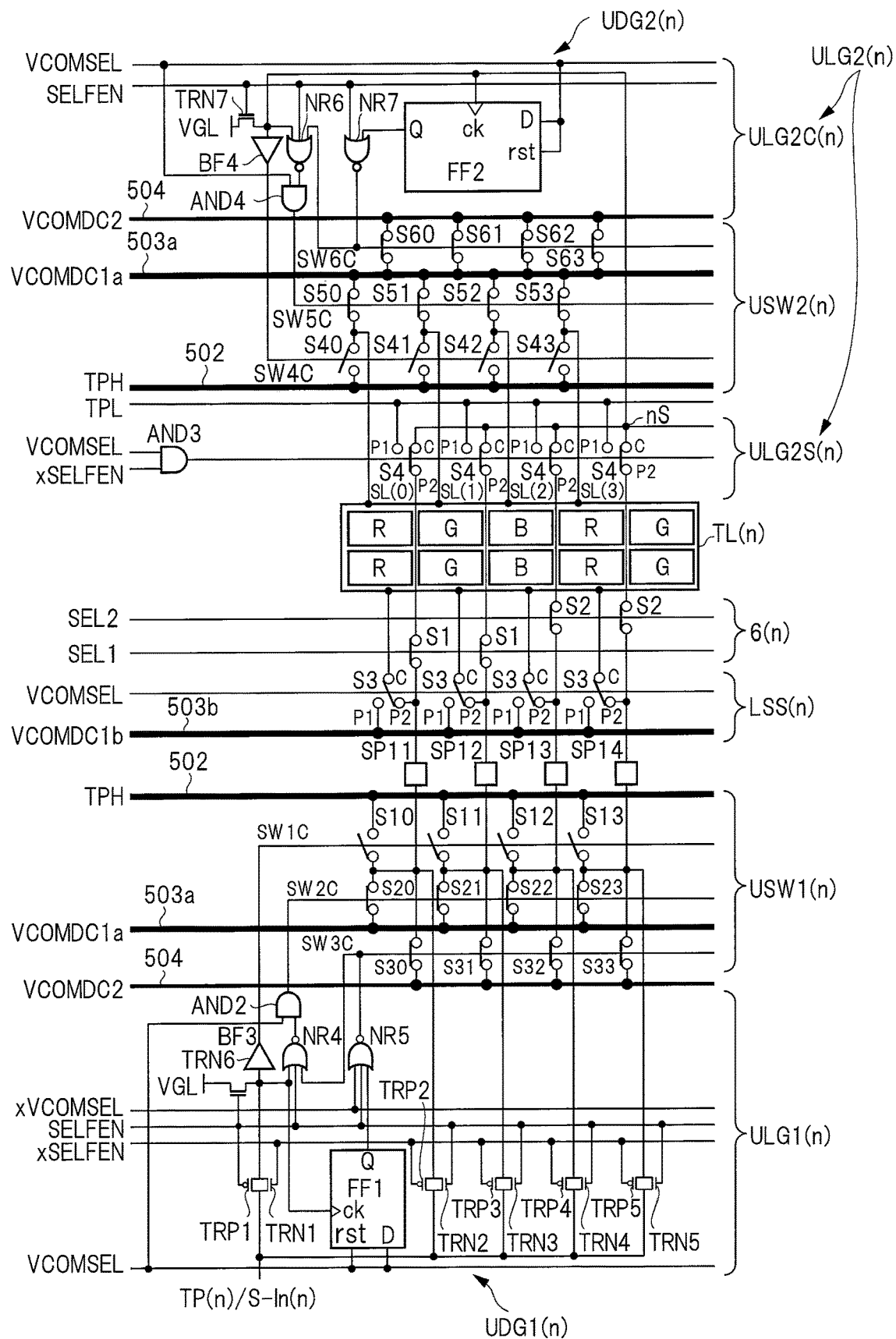
FIG. 13 is a circuit diagram illustrating a configuration of a liquid crystal display device according to the third embodiment.

FIG. 13 is a circuit diagram illustrating the configuration of the first unit driving electrode driver UDG1(n) and the second unit driving electrode driver UDG2(n) according to the third embodiment. Since the circuit illustrated in FIG. 13 is similar to the circuit illustrated in FIG. 10, differences will be mainly described herein. What the first unit driving electrode driver UDG1(n) includes the first unit switch circuit USW1(n) and the first unit logic circuit ULG1(n) corresponding to the common electrode TL(n) is identical in FIG. 10 and FIG. 13. Similarly, what the second unit driving electrode driver UDG2(n) includes the second unit switch circuit USW2(n) and the second unit logic circuit ULG2(n) corresponding to the common electrode TL(n) is also identical in FIG. 10 and FIG. 13. Furthermore, what the second unit logic circuit ULG2(n) includes the switch circuit ULG2S(n) and the logic circuit ULG2C(n) is identical in FIG. 10 and FIG. 13.

First Unit Driving Electrode Driver

In the first unit driving electrode driver UDG1(n), a difference between FIG. 10 and FIG. 13 is the configuration of the first unit logic circuit ULG1(n). In FIG. 13, the first unit logic circuit ULG1(n) includes a flip-flop circuit FF1 having a reset terminal rst, 3-input NOR circuits NR4 and NR5, a 2-input AND circuit AND2, a buffer circuit BF3, N-channel type MOSFETs (hereinafter, referred to as N-type MOSFETs) TRN1 to TRN6, and P-channel type MOSFETs (hereinafter, referred to as P-type MOSFETs) TRP1 to TRP5.

The N-type MOSFET TRN1 and the P-type MOSFET TRP1 are connected such that source/drain paths thereof are connected in parallel, and constitute a first transfer switch (hereinafter, the transfer switch is referred to as a TF switch). A detection method designation signal SELFEN is supplied to a gate of the N-type MOSFET TRN1 constituting the first TF switch, and a control signal xSELFEN obtained by inverting the phase of the detection method designation signal SELFEN is supplied to a gate of the P-type MOSFET TRP1 constituting the first TF switch. The selection signal TP(n) or the driving signal S-In(n) formed by the driving signal forming unit 1202 illustrated in FIG. 12 is supplied to an input of the first TF switch. An output of the first TF switch is connected to an input of the buffer circuit BF3, a first input of the 3-input NOR circuit NR4, a drain of the N-type MOSFET TRN6, and a clock terminal ck of the flip-flop circuit FF1. A source of the N-type MOSFET TRN6 is connected to a voltage VGL of a low level, and the detection method designation signal SELFEN is supplied to a gate of the N-type MOSFET TRN6.

In the touch detection period, when the mutual capacitance method is set as the data detection method, the detection method designation signal SELFEN is at a low level and the control signal xSELFEN is at a high level. In this state, the first TF switch is turned on. In the case of the mutual capacitance method, since the driving signal forming unit 1202 forms the selection signal TP(n), the selection signal TP(n) is supplied to the buffer circuit BF3, the first input of the 3-input NOR circuit NR4, and the clock terminal ck of the flip-flop circuit FF1 through the first TF switch. At this time, the N-type MOSFET TRN6 is turned off. In this state, since the common electrode TL(n) is designated as the selected common electrode, when the voltage of the selection signal TP(n) is periodically changed, the flip-flop circuit FF1 fetches a high level of the control signal VCOMSEL, stores a logic value "1", and outputs a high level corresponding to the logic value "1" from the data output terminal Q in response to the voltage rise of the selection signal TP(n).

Although described above, since the control signal VCOMSEL is at a high level when the touch detection period starts, the reset state of the flip-flop circuit FF1 is released in the touch detection period. Therefore, the voltage of the selection signal TP(n) supplied to the clock terminal ck rises, and the flip-flop circuit FF2 fetches a logic value corresponding to the voltage value of the control signal VCOMSEL.

The detection method designation signal SELFEN is supplied to a second input of the 3-input NOR circuit NR4, and the output of the 3-input NOR circuit NR5 is input to a third input of the 3-input NOR circuit NR4. In addition, the control signal xVCOMSEL is supplied to the first input of the 3-input NOR circuit NR5, the detection method designation signal SELFEN is supplied to the second input of the 3-input NOR circuit NR5, and the third input of the 3-input NOR circuit NR5 is connected to the data output terminal Q of the flip-flop circuit FF2.

As described above, when the mutual capacitance method is set and the voltage of the selection signal TP(n) is periodically changed, the voltage of the data output terminal Q of the flip-flop circuit FF1 is at a high level. Therefore, the output of the 3-input NOR circuit NR5, the third input of which is connected to the data output terminal Q, is at a low level. At this time, since the mutual capacitance method is set, the detection method designation signal SELFEN of a low level is supplied to the second input of the 3-input NOR circuit NR4. Therefore, the 3-input NOR circuit NR4 functions as an inverter circuit that inverts the phase of the selection signal TP(n) supplied to the first input of the 3-input NOR circuit NR4.

The output of the 3-input NOR circuit NR5 is supplied from the first unit logic circuit ULG1(n) to the corresponding first unit switch circuit USW1(n) as the third switch control signal SW3C. In addition, the output of the 2-input AND circuit AND2 receiving the output of the 3-input NOR circuit NR4 and the control signal VCOMSEL is supplied from the first unit logic circuit ULG1(n) to the corresponding first unit switch circuit USW1(n) as the second switch control signal SW2C. Furthermore, the output of the buffer circuit BF3 is supplied from the first unit logic circuit ULG1(n) to the corresponding first unit switch circuit USW1(n) as the first switch control signal SW1C.

As described above, in the touch detection period, when the mutual capacitance method is set and the voltage of the selection signal TP(n) is periodically changed, the flip-flop circuit FF1 stores a logic value "1" and outputs a high level corresponding to the logic value "1" from the data output terminal Q thereof. Therefore, the third switch control signal SW3C is at a low level, and the first switch control signal SW1C is set to a signal synchronized with the selection signal TP(n). In addition, in the touch detection period, since the control signal VCOMSEL is at a high level, the second switch control signal SW2C output from the 2-input AND circuit AND2 is set to a signal obtained by inverting the phase of the selection signal TP(n) by the 3-input NOR circuit NR4. Therefore, in the corresponding first unit switch circuit USW1(n), the third switches S30 to S33 are turned off, and the first switches S10 to S13 and the second switches S20 to S23 are alternately turned on.

On the other hand, in the touch detection period, when the selection signal TP(n) is set to a low level so as to designate the common terminal TL(n) as the unselected common electrode, the voltage of the clock terminal ck of the flip-flop circuit FF1 does not rise. Therefore, the flip-flop circuit FF1 continues a state in which the logic value "0" of when reset is stored, and outputs a low level corresponding to the logic value "0" from the data output terminal Q thereof. As a result, since a low level is supplied to each of the first to third inputs of the 3-input NOR circuit NR5, the third switch control signal SW3C is at a high level. Since the third switch control signal SW3C is at a high level, the output of the 3-input NOR circuit NR4 is at a low level, and the second switch control signal SW2C serving as the output of the 2-input AND circuit AND2 is at a low level. It is obvious that since the selection signal TP(n) serving as the input of the buffer circuit BF3 is at a low level, the buffer circuit BF3 outputs the first switch control signal SW1C of a low level. Therefore, the third switches S30 to S33 are turned on, and the first and second switches S10 to S13 and S20 to S23 are turned off. As a result, when the common electrode TL(n) is designated as the unselected common electrode, the common electrode TL(n) is electrically connected to the third voltage line 504.

In this way, similar to the first and second embodiments in the touch detection period when the mutual capacitance method is set, the first unit driving electrode driver UDG1(*n*) alternately connects the common electrode TL(n) to the first voltage line 502 and the second voltage line 503*a* when the corresponding common electrode is designated as the selected common electrode. On the other hand, when the corresponding common electrode is designated as the unselected common electrode, the first unit driving electrode driver UDG1(*n*) connects the common electrode TL(n) to the third voltage line 504.

The N-type MOSFETs TRN2 to TRN5 and the P-type MOSFETs TRP2 to TRP5 provided in the first unit logic circuit ULG1(*n*) are used when the self-capacitance method is set as the data touch method. That is, when the self-capacitance method is set, these MOSFETs constitutes a TF switch for transferring the driving signal S-In(n) formed by the driving signal forming unit 1202 illustrated in FIG. 12 to the corresponding common electrode TL(n) and transferring the detection signal SRx(n) of the common electrode TL(n) to the input/output terminal ST(n) illustrated in FIG. 12.

The N-type MOSFET TRN2 and the P-type MOSFET TRP2 are connected such that the source/drain paths thereof are connected in parallel, and constitute the second TF switch. The N-type MOSFET TRN3 and the P-type MOSFET TRP3 are connected such that the source/drain paths thereof are connected in parallel, and constitute the third TF switch. The N-type MOSFET TRN4 and the P-type MOSFET TRP4 are connected such that the source/drain paths thereof are connected in parallel, and constitute the fourth TF switch. Similarly, the N-type MOSFET TRN5 and the P-type MOSFET TRP5 are connected such that the source/drain paths thereof are connected in parallel, and constitute the fifth TF switch One input/output terminal of each of the second to fifth TF switches is connected to the input/output terminal ST(n) illustrated in FIG. 12, and the other input/output terminal of each of the second to fifth TF switches is connected to the corresponding terminals SP11 to SP14. In addition, the control signal xSELFEN is supplied to the gates of the P-type MOSFETs TRP2 to TRP5 respectively constituting the second to fifth TF switches, and the detection method designation signal SELFEN is supplied to the gates of the N-type MOSFETs TRN2 to TRN5 respectively constituting the second to fifth TF switches.

In the touch detection period, when the self-capacitance method is set as the touch detection method, the detection method designation signal SELFEN is at a high level, and thus, the second to fifth TF switches are turned on. Therefore, when the driving signal S-In(n) is supplied to the corresponding common electrode TL(n) and the voltage of the common electrode is changed as described above with reference to FIGS. 11A to 11C, the voltage change according to whether or not the vicinity of the common electrode TL(n) is touched is generated in the common electrode TL(n). The voltage change is transferred to the input/output terminal ST(n) illustrated in FIG. 12 through the second to fifth TF switches, is amplified by the touch detection signal amplification unit 1201, and is processed.

When the self-capacitance method is set, since the detection method designation signal SELFEN is at a high level, the first TF switch is turned off. In addition, since the N-type MOSFET TRN6 is turned on, a low level voltage VGL is supplied to the buffer circuit BF3 and the clock terminal ck of the flip-flop circuit FF1. Therefore, the flip-flop circuit FF1 maintains a logic value "0" of when reset, and the voltage of the data output terminal Q is at a low level. In addition, since the detection method designation signal SELFEN of a high level is supplied to the second inputs of the 3-input NOR circuits NR4 and NR5, each of the third switch control signal SW3C and the second switch control signal SW2C is at a low level. It is obvious that since the input of the buffer circuit BF3 is the low level voltage VGL, the buffer circuit BF3 outputs the first switch control signal SW1C of a low level. Therefore, the first to third switches S10 to S13, S20 to S23, and S30 to S33 of the corresponding first unit switch circuit USW1(*n*) are turned off.

Second Unit Driving Electrode Driver

In the second unit driving electrode driver UDG2(*n*), similar to the switch circuit ULG2S(n) illustrated in FIG. 10, the switch circuit ULG2S(n) constituting the second unit logic circuit ULG2(*n*) includes a plurality of seventh switches S4 provided between the corresponding second unit switch circuit USW2(*n*) and the corresponding common electrode TL(n). Unlike in FIG. 10, the seventh switches S4 of the third embodiment are controlled by the control signal output from the 2-input AND circuit AND3. The control signal VCOMSEL and the control signal xSELFEN are supplied to the 2-input AND circuit AND3. The control signal VCOMSEL is at a high level in the touch detection period, and the control signal xSELFEN is at a high level when the mutual capacitance method is set. Therefore, the 2-input AND circuit AND3 outputs the control signal of a high level when the mutual capacitance method is set as the touch detection method in the touch detection period. At this time, the seventh switches S4 connect the common terminal C to the terminal P2. In other words, when the self-capacitance method is set as the touch detection method in the display period, the seventh switch S4 connects the common terminal C to the terminal P1.

Here, the above-described 2-input AND circuit AND3 is common to the plurality of switch circuits ULG2S(0) to ULG2S(p), and the control signal output from the 2-input AND circuit AND3 is commonly supplied to the switch circuits ULG2S(0) to ULG2S(p).

The logic circuit ULG2C(n) constituting the second unit logic circuit ULG2(*n*) includes a flip-flop circuit FF2 having a reset terminal rst, a 3-input NOR circuit NR3, a 2-input NOR circuit NR7, a 2-input AND circuit AND4, a buffer circuit BF4, and an N-type MOSFET TRN7. The control signal VCOMSEL is supplied to the reset terminal rst and a data input terminal D of the flip-flop circuit FF2, and a node nS is connected to a clock terminal ck of the flip-flop circuit FF2, an input of the buffer circuit BF4, a first input of the 3-input NOR circuit NR6, and a drain of the N-type MOSFET TRN7. A source of the N-type MOSFET TRN7 is connected to a voltage VGL of a low level, and the detection method designation signal SELFEN is supplied to a gate of the N-type MOSFET TRN7. In addition, the detection method designation signal SELFEN is supplied to a second input of the 3-input NOR circuit NR6 and one input of the 2-input NOR circuit NR7. The data output terminal Q of the flip-flop circuit FF2 is connected to the other input of the 2-input NOR circuit NR7, and the output of the 2-input NOR circuit NR7 is supplied to a third input of the 3-input NOR circuit NR6. In addition, the output of the 3-input NOR circuit NR6 and the control signal VCOMSEL are input to the 2-input AND circuit AND4.

When the self-capacitance method is set as the touch detection method, since the detection method designation signal SELFEN is at a high level, the control signal xSELFEN obtained by inverting the phase of the detection method designation signal SELFEN is at a low level. Therefore, in the touch detection period in which the self-capacitance method is set, the seventh switches S4 connect the common terminal C to the terminal P1. At this time, since the N-type MOSFET TRN7 is turned on, the input of the buffer circuit BF4 and the clock terminal ck of the flip-flop circuit FF2 are at a low level. Since the voltage of the clock terminal ck of the flip-flop circuit FF2 is not changed, the data output terminal Q thereof maintains a low level that is the voltage of when reset. In addition, at this time, since the detection method designation signal SELFEN of a high level is supplied to the second input of the 3-input NOR circuit NR6 and one input of the 2-input NOR circuit NR7, the outputs of the 3-input NOR circuit NR6 and the 2-input NOR circuit NR7 are at a low level, and the output of the 2-input AND circuit AND4 is also at a low level. In addition, since the input of the buffer circuit BF4 at this time is at a low level, the output of the buffer circuit BF4 is also at a low level.

The second unit logic circuit ULG2($n$) supplies the output of the 2-input NOR circuit NR7 to the corresponding unit switch circuit USW2($n$) as the sixth switch control signal SW6C, supplies the output of the buffer circuit BF4 to the corresponding unit switch circuit USW2($n$) as the fourth switch control signal SW4C, and supplies the output of the 2-input AND circuit AND4 to the corresponding unit switch circuit USW2($n$) as the fifth switch control signal SW5C.

When the self-capacitance method is set as the touch detection method, as described above, the outputs of the buffer circuit BF4, the 2-input NOR circuit NR7, and the 2-input AND circuit AND4 are at a low level. That is, the fourth to sixth switch control signals SW4C to SW6C are at a low level. Therefore, each of the fourth to sixth switches S40 to S43, S50 to S53, and S60 to S63 of the corresponding unit switch circuit USW2($n$) is turned off. As a result, when the self-capacitance method is set, the second unit driving electrode driver UDG2($n$) electrically isolates the corresponding common electrode TL(n) from the first to third voltage lines 502, 503a, and 504.

In contrast, in the touch detection period, when the mutual capacitance method is set as the touch detection method, the common terminals C of the seventh switches S4 are connected to the terminal P2. Therefore, the voltage of the common electrode TL(n) in the terminals SP11 to SP14 is transferred to the node nS through the signal lines SL(0) to SL(3) and the seventh switches S4 as the selection signal. In the touch detection period, when the corresponding common electrode TL(n) is designated as the selected common electrode, the voltage of the node nS, that is, the selection signal, is periodically changed. On the other hand, when the corresponding common electrode TL(n) is designated as the unselected common electrode, the voltage of the node nS is the third voltage VCOMDC2.

Since the corresponding common electrode TL(n) is designated as the selected common electrode, when the voltage of the node nS rises, the flip-flop circuit FF2 fetches a logic value corresponding to the voltage supplied to the data input terminal D due to the voltage rise of the clock terminal ck. At this time, due to the touch detection period, the control signal VCOMSEL supplied to the data input terminal D is at a high level. Therefore, the flip-flop circuit FF2 fetches and stores a logic value "1" corresponding to a high level, and outputs the high level corresponding to the logic value "1" from the data output terminal Q. Since the data output terminal Q of the flip-flop circuit FF2 is at a high level, the 2-input NOR circuit NR7 outputs the sixth switch control signal SW6C of a low level.

Since the mutual capacitance method is set, the detection method designation signal SELFEN is at a low level. Therefore, in the touch detection period, the N-type MOSFET TRN7 is turned off. Therefore, the buffer circuit BF4 buffers the selection signal (voltage of the node nS) and outputs the buffered selection signal as the fourth switch control signal SW4C. At this time, since the detection method designation signal SELFEN of a low level is supplied to the second input of the 3-input NOR circuit NR6 and the fourth switch control signal SW4C of a low level is supplied to the third input of the 3-input NOR circuit NR6, the 3-input NOR circuit NR6 functions as an inverter circuit that inverts the phase of the selection signal (voltage of the node nS) supplied to the first input of the 3-input NOR circuit NR6. Since the control signal VCOMSEL is at a high level, the 2-input AND circuit AND4 outputs a signal having the same phase as the control signal whose phase is inverted by the 3-input NOR circuit NR6, as the fifth switch control signal SW5C.

That is, in the touch detection period, when the corresponding common electrode TL(n) is designated as the selected common electrode, the second unit logic circuit ULG2($n$) corresponding to the common electrode TL(n) outputs the sixth switch control signal SW6C of a low level and the fourth and fifth switch control signals SW4C and SW5C whose voltages are periodically changed, to the corresponding second unit switch circuit USW2($n$). Here, the fourth switch control signal SW4C is a signal whose voltage change of the node nS is changed in phase, and the fifth switch control signal SW5C is a signal whose phase is inverted with respect to the voltage change of the node nS. That is, with respect to the selection signal of the node nS, the fourth switch control signal SW4C is in phase, and the fifth switch control signal SW5C has a phase opposite to the selection signal.

In the second unit switch circuit USW2($n$), the sixth switches S60 to S63 are turned off by the sixth switch control signal SW6C of a low level, and the fourth switches S40 to S43 and the fifth switches S50 to S53 are alternately turned on by the fourth switch control signal SW4C and the fifth switch control signal SW5C. As a result, in the touch detection period, when the mutual capacitance method is set and the corresponding common electrode TL(n) is designated as the selected common electrode, the common electrode TL(n) is alternately connected to the first voltage line 502 and the second voltage line 503a according to the change in the voltage of the selection signal, and the first voltage TPH and the second voltage VCOMDC1a are alternately supplied to the common electrode TL(n).

In contrast, when the corresponding common electrode TL(n) is designated as the unselected common electrode, that is, when the voltage of the node nS is at a low level, the flip-flop circuit FF2 maintains the state of when reset and outputs a low level signal corresponding to a logic value "0" from the data output terminal Q because the voltage of the clock terminal ck does not rise. At this time, since the detection method designation signal SELFEN is at a low level, the 2-input NOR circuit NR7 outputs the sixth switch control signal SW6C of a high level. Since the sixth switch control signal SW6C is at a high level, the 3-input NOR circuit NR6 outputs a low level and the 2-input AND circuit AND4 outputs the fifth switch control signal SW5C of a low level. In addition, since the selection signal (voltage of the node nS) is at a low level, the buffer circuit BF4 outputs the fourth switch control signal SW4C of a low level.

In the corresponding second unit switch circuit USW2(n), due to the voltage of each of the fourth to sixth switch control signals SW4C to SW6C, the sixth switches S60 to S63 are turned on and the fourth switches S40 to S43 and the fifth switches S50 to S53 are turned off. As a result, in the touch detection period, when the mutual capacitance method is set and the corresponding common electrode TL(n) is designated as the unselected common electrode, the common electrode TL(n) is electrically isolated from the first and second voltage lines 502 and 503a and the fourth voltage line 503b, and the second voltage line 503a and the third voltage line 504 are electrically connected to each other.

In addition, in the display period, the control signal VCOMSEL is at a low level, and the detection method designation signal SELFEN is also at a low level. Since the control signal VCOMSEL is at a low level, the flip-flop circuit FF2 is reset and outputs a low level signal from the data output terminal Q. Therefore, the 2-input NOR circuit NR7 outputs the sixth switch control signal SW6C of a high level. As a result, in the corresponding second unit switch circuit USW2(n), the sixth switches S60 to S63 are turned on, and the second voltage line 503a and the third voltage line 504 are electrically connected to each other.

In the display period, as described above in the first embodiment, the common terminals C of the switches S3 in the unit driving electrode switch LSS(n) are connected to the terminals P1. Therefore, in the display period, the common electrode TL(n) being one terminal of the liquid crystal display element is connected to the fourth voltage line 503b through the switch S3, and the fourth voltage line 503b and the third voltage line 504 are connected to each other by the sixth switches S60 to S63. That is, in the display period, the common electrode TL(n) being one terminal of the liquid crystal display element is connected to the fourth voltage line 503b and the third voltage line 504. Therefore, in the display period, it is possible to stabilize the voltage supplied to one terminal of the liquid crystal display element.

The first unit driving electrode driver UDG1(n) and the second unit driving electrode driver UDG2(n) have been described as an example, but the same applies to the remaining first unit driving electrode drivers UDG1(0) to UDG1(n−1) and UDG1(n+1) to UDG1(p) and the remaining second unit driving electrode drivers UDG2(0) to UDG2(n−1) and UDG2(n+1) to UDG2(p) respectively constituting the first driving electrode driver 12 and the second driving electrode driver 12-U.

In the third embodiment, in the touch detection period, when the mutual capacitance method is set as the touch detection method, one end of the selected common electrode is alternately electrically connected to the first voltage line 502 and the second voltage line 503a by the first driving electrode driver 12, and the other end of the selected common electrode is alternately electrically connected to the first voltage line 502 and the second voltage line 503a by the second driving electrode driver 12-U. At this time, the second driving electrode driver 12-U receives the voltage, which is supplied from the first driving electrode driver 12 to the selected common electrode, as the selection signal, and connects the selected common electrode to the first voltage line 502 or the second voltage line 503a according to the selection signal. That is, the second driving electrode driver 12-U is operated in synchronization with the first driving electrode driver 12. Therefore, since the voltages are supplied to both ends of the selected common electrode, it is possible to speed up the change in the voltage of the selected common electrode while suppressing an increase in an area occupied by the first driving electrode driver 12 and/or the second driving electrode driver 12-U.

In addition, in the touch detection period, when the mutual capacitance method is set as the touch detection method, the unselected common electrode is connected to the third voltage line 504 by the first driving electrode driver 12. Since the third voltage line 504 is a line different from the second voltage line 503a to which the selected common electrode is periodically connected, it is possible to prevent the voltage rise of the selected common electrode and the detection electrode from being slow. In addition, it is possible to prevent the voltage fall of the selected common electrode from being slow. Furthermore, in the touch detection period, since the unselected common electrode is connected to the third voltage line 504 by the first driving electrode driver 12, it is possible to reduce the erroneous detection or speed up the detection, as described above with reference to FIGS. 21A and 21B. In the third embodiment, as in the second embodiment, the signal lines for transferring the image signal in the display period are also used as the signal lines for transferring the selection signal from the first driving electrode driver 12 to the second driving electrode driver 12-U. Therefore, it is unnecessary to provide new signal lines, and it is possible to suppress an increase in the size of the liquid crystal display device.

Furthermore, even in the third embodiment, since a line width of the third voltage line 504 is narrower than line widths of the first and second voltage lines 502 and 503a, it is also possible to suppress an increase in the size of the liquid crystal display device. In addition, in display period, the third voltage line 504 is connected to the second voltage line 503a by the second driving electrode driver 12-U. Therefore, in the display period, it is possible to stabilize the voltage applied to the liquid crystal display element.

In addition, when the self-capacitance method is set as the touch detection method, the driving signals S-In(0) to S-In(p) are supplied from the first driving electrode driver 12 to the corresponding common electrodes TL(0) to TL(p), and the detection signals of the common electrodes TL(0) to TL(p) are supplied from the first driving electrode driver 12 to the touch semiconductor device 1200. Therefore, the self-capacitance method can be adopted as the touch detection method. That is, the user can set the touch detection method from the plurality of touch detection methods.

Operation of Liquid Crystal Display Device

Next, the operation of the liquid crystal display device according to the third embodiment will be described. FIGS. 14A to 14H are waveform diagrams illustrating the operation of the liquid crystal display device according to this embodiment. In FIGS. 14A to 14H, a horizontal axis represents a time and a vertical axis represents a voltage. In addition, for ease of description, only the waveform related to the common electrode TL(n) in the touch detection period is illustrated in FIGS. 14A to 14H. In FIGS. 14A to 14H, the touch detection period (selection) and the touch detection period (unselection) represent the waveforms of when the mutual capacitance method is set as the touch detection method. Here, the touch detection period (selection) represents the waveform of when the common electrode TL(n) is designated as the selected common electrode, and the touch detection period (unselection) represents the waveform of when the common electrode TL(n) is designated as the unselected common electrode. In addition, in FIGS. 14A to 14H, the touch detection period (self) represents the waveforms of when the self-capacitance method is set as the touch detection method.

In FIGS. 14A to 14H, the signal line precharge period refers to a period in which the signal lines SL(0) to SL(p) are precharged after the touch detection period, and an operation of preparing for a next display period is performed. The display period refers to a period in which the display is performed by supplying the image signals to the signal lines SL(0) to SL(p) and sequentially supplying the scan voltages to the scan lines GL(0) to GL(p).

The waveform illustrated in FIGS. 14A to 14H is similar to the waveform illustrated in FIGS. 9A to 9G. When comparing FIGS. 9A to 9G with FIGS. 14A to 14H, FIG. 14A corresponds to FIG. 9A and illustrates the waveform of the selection signal SEL1, FIG. 14B corresponds to FIG. 9B and illustrates the waveform of the control signal VCOMSEL, and FIG. 14E corresponds to FIG. 9D and illustrates the waveform of the data output terminal Q of the flip-flop circuit FF1. Similarly, FIG. 14F corresponds to FIG. 9E and illustrates the waveform of the third switch control signal SW3C, FIG. 14G corresponds to FIG. 9F and illustrates the waveform of the first switch control signal SW1C, and FIG. 14H corresponds to FIG. 9G and illustrates the waveform of the second switch control signal SW2C.

Figure 14:
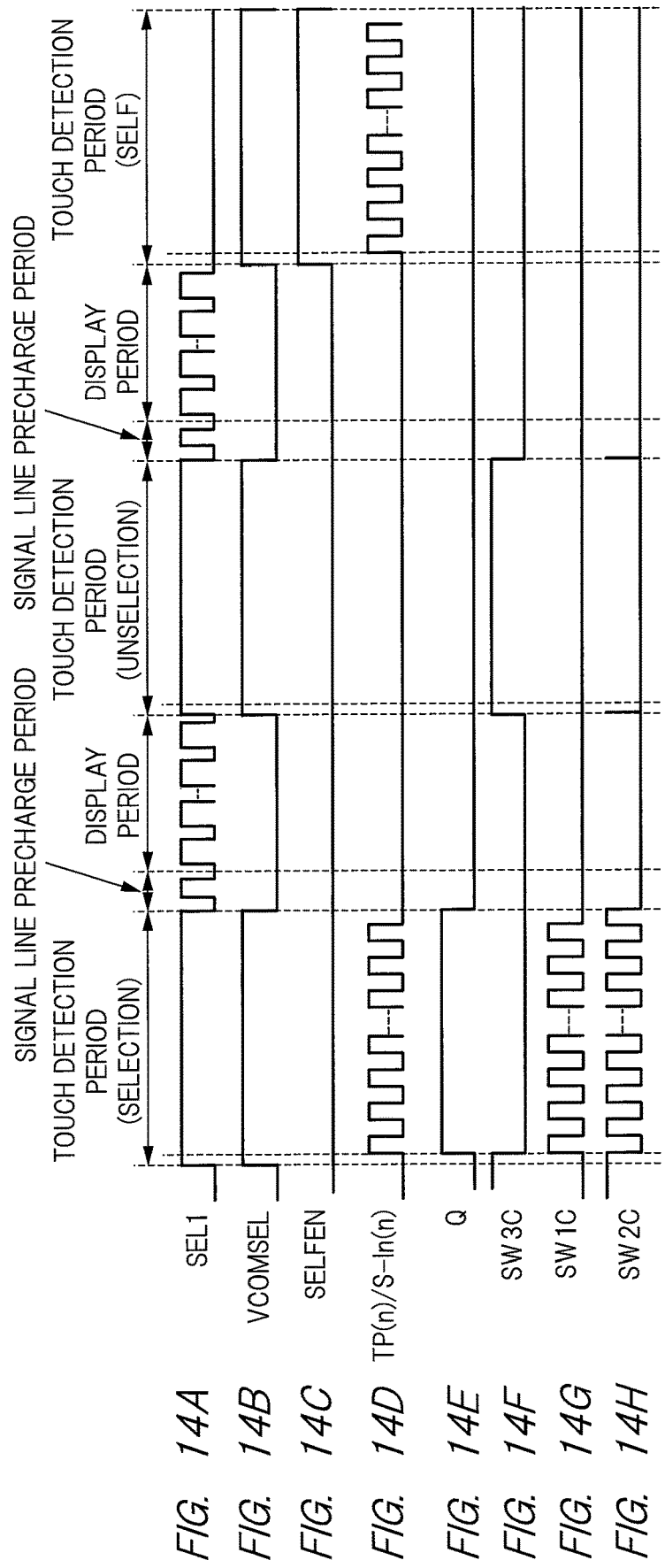
FIGS. 14A to 14H are waveform diagrams of the liquid crystal display device according to the third embodiment.

FIG. 14C illustrates the waveform of the detection method designation signal SELFEN, and FIG. 14D illustrates the waveform of the selection signal TP(n) and the driving signal S-In(n). FIG. 14D illustrates the waveform of the selection signal TP(n) in the touch detection period (selection) and the touch detection period (unselection), and illustrates the waveform of the driving signal S-In(n) in the touch detection period (self).

In FIGS. 14A to 14H, except for the waveform of the detection method designation signal SELFEN, the waveforms in the display period, the touch detection period (selection), and the touch detection period (unselection) are the same as those of FIGS. 9A to 9G. Therefore, the descriptions related to the display period, the touch detection period (selection), and the touch detection period (unselection) will be omitted. When the mutual capacitance method is set as the touch detection method, the detection method designation signal SELFEN illustrated in FIG. 14C is at a low level. On the other hand, when the self-capacitance method is set as the touch detection method, the detection method designation signal SELFEN is at a high level.

As illustrated in FIG. 14C, when the detection method designation signal SELFEN is at a high level, each of the first to third switch control signals SW1C to SW3C is at a low level as described above with reference to FIG. 13 (FIGS. 14F and 14G). On the other hand, each of the second to fifth TF switches described above with reference to FIG. 13 is turned on. At this time, the driving signal forming unit 1202 of the touch semiconductor device 1200 forms the driving signal S-In(n) instead of the selection signal TP(n), and supplies the driving signal S-In(n) to the first unit driving electrode driver UDG1(n) of the first driving electrode driver 12. In this case, as illustrated in FIG. 14D, the driving signal S-In(n) is a signal whose voltage value is periodically changed.

The driving signal S-In(n) is supplied to the corresponding common electrode TL(n) through the second to fifth FT switches illustrated in FIG. 13. At this time, the change in the voltage of the common electrode TL(n) according to whether or not the vicinity of the common electrode TL(n) is touched is transferred, as the detection signal Rx(n), from the second TF switch to the terminal ST(n) of the touch semiconductor device 7 through the fifth TF switch, is amplified by the touch detection signal amplification unit 1201, and is processed by the A/D conversion unit 14 and the signal processing unit 15 illustrated in FIG. 1, and the processing result is supplied to the coordinate extraction unit 16. In the self-capacitance method, similar to the common electrode, the driving signals are supplied to the detection electrodes RL(0) to RL(p), the change in the voltages of the detection electrodes is detected, and the processing is performed by the A/D conversion unit 14 and the signal processing unit 15. The coordinate extraction unit 16 outputs coordinate information by extracting coordinates of the touched position by using the processing result based on the change in the voltage of the common electrode and the processing result based on the change in the voltages of the detection electrodes.

Fourth Embodiment

Figure 15:
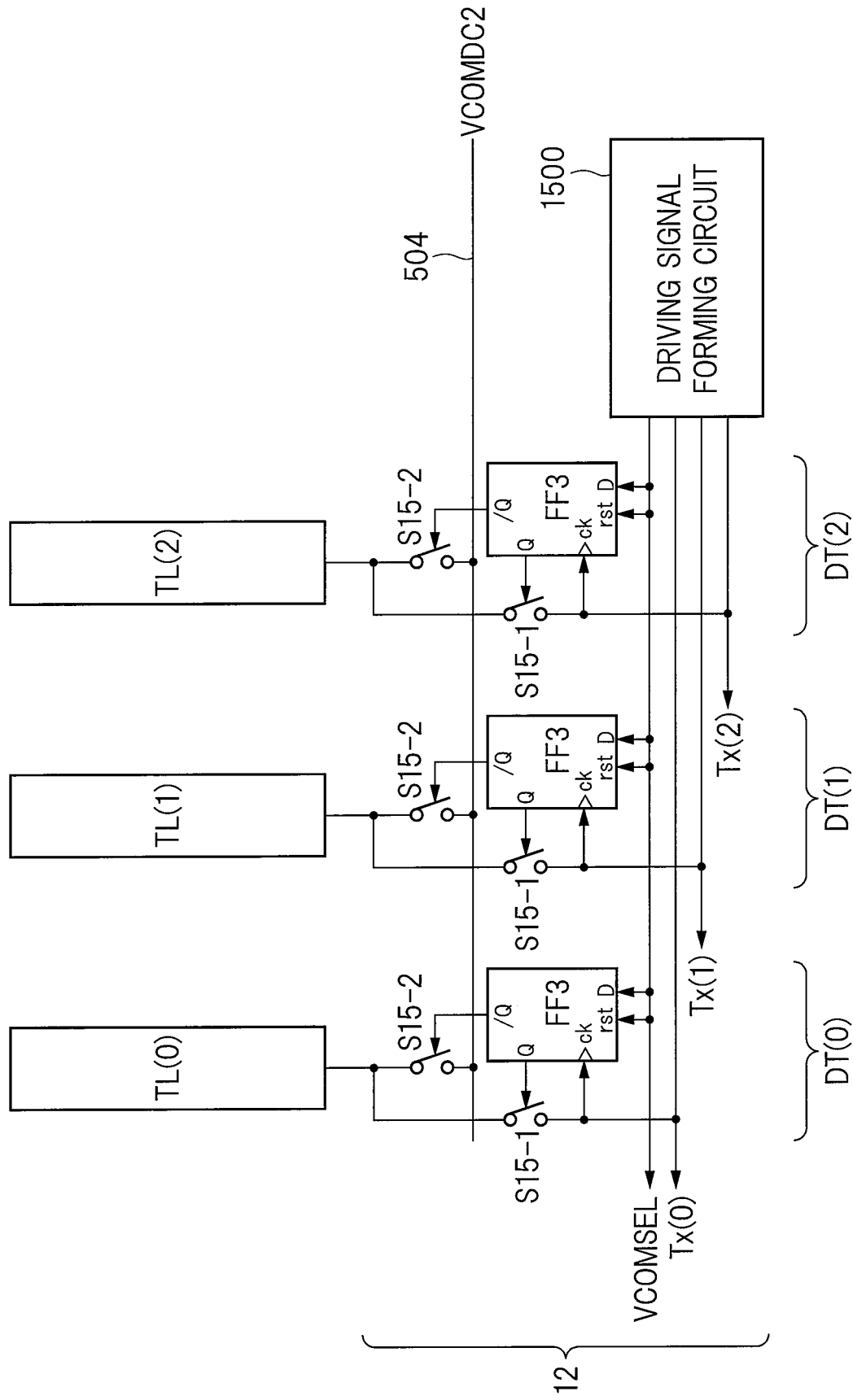
FIG. 15 is a circuit diagram illustrating a main configuration of a liquid crystal display device according to a fourth embodiment.

FIG. 15 is a circuit diagram illustrating main parts of a liquid crystal display device according to a fourth embodiment. As described above in the first to third embodiments, the flip-flop circuits FF1 and FF2 having the reset terminal rst determine whether or not a common electrode is designated as a selected common electrode according to whether or not a selection signal supplied to the reset terminal rst rises in a touch detection period. In other words, the flip-flop circuits FF1 and FF2 can be regarded as a determination circuit that determines whether it is selected or unselected. The fourth embodiment provides a liquid crystal display device to which the flip-flop circuit having the reset terminal rst is applied to the AC driving described above with reference to FIGS. 16B and 17B.

In FIG. 15, common electrodes TL(0) to TL(2), a driving electrode driver 12 for supplying driving signals Tx(0) to Tx(2) to the common electrodes TL(0) to TL(2), and a driving signal forming circuit 1500 included in the touch semiconductor device 7 are illustrated. Here, the driving signal forming circuit 1500 outputs a driving signal corresponding to the common electrode designated as the selected common electrode, as a signal whose voltage is periodically changed, and outputs a driving signal corresponding to the common electrode designated as the unselected common electrode, as a low level. For example, when the common electrode TL(1) is designated as the selected common electrode and the common electrodes TL(0) and TL(2) are designated as the unselected common electrodes, the driving signal Tx(1) corresponding to the common electrode TL(1) is set as the signal whose voltage is periodically changed, and the driving signals Tx(0) and Tx(2) corresponding to the common electrodes TL(0) and TL(2) are set to a low level.

The driving electrode driver 12 includes a plurality of determination switch circuits DT(0) to DT(2) corresponding to the common electrodes TL(0) to TL(2). Since the determination switch circuits DT(0) to DT(2) have the same configuration, the configuration of the determination switch circuit DT(0) will be representatively described herein.

The determination switch circuit DT(0) includes a flip-flop circuit FF3 having a reset terminal rst, and one pair of switches S15-1 and S15-2 that are controlled by outputs of data output terminals Q and /Q of the flip-flop circuit FF3. The flip-flop circuit FF3 outputs a signal, which is obtained by inverting a phase of a signal that is output from the data output terminal Q, from the data output terminal /Q. Therefore, the switches S15-1 and S15-2 are controlled so as to be complementarily turned on/off.

The control signal VCOMSEL is supplied to the reset terminal rst and a data input terminal D of the flip-flop circuit FF3, and the driving signal Tx(0) corresponding to the corresponding common electrode TL(0) is supplied to a clock terminal ck thereof. In addition, the driving signal Tx(0) is supplied to the corresponding common electrode TL(0) through the switch S15-1 that is controlled by the output signal from the data output terminal Q of the flip-flop circuit FF3. Furthermore, the corresponding common electrode TL(0) is connected to the third voltage line 504 through the switch S15-2 that is controlled by the output signal from the data output terminal /Q of the flip-flop circuit FF3.

The control signal VCOMSEL is changed to a high level in the touch detection period. When the driving signal Tx(0) is the signal, whose voltage is periodically changed so as to designate the common electrode TL(0) as the selected common electrode, the flip-flop circuit FF3 fetches a high level supplied to the data input terminal D due to the voltage rise of the driving signal Tx(0), stores a logic value "1", sets the voltage of the data output terminal Q to a high level, and sets the voltage of the data output terminal /Q to a low level. Since the high level is supplied to the switch S15-1, the switch S15-1 is turned on. Therefore, the driving signal Tx(0) is supplied to the common electrode TL(0). By determining the detection signal of the detection electrode at this time, it is determined whether or not the vicinity of the common electrode TL(0) is touched.

On the other hand, when the common electrode TL(0) is designated as the unselected common electrode, the driving signal Tx(0) is at a low level. Therefore, even when the control signal VCOMSEL is at a high level, the voltage of the clock terminal ck does not rise. Thus, the flip-flop circuit FF3 maintains a logic value "0" of when reset, the data output terminal Q is at a low level, and the data output terminal /Q is at a high level. Therefore, the switch S15-2 is turned on, and the corresponding common electrode TL(0) is connected to the third voltage line 504.

The determination switch circuit DT(0) has been described, but the same applies to the other determination switch circuits DT(1) and DT(2) constituting the driving electrode driver 12.

Even in the fourth embodiment, in the touch detection period, the unselected common electrodes are connected to the third voltage line 504. Therefore, the unselected common electrodes are not charged to the third voltage VCOMDC2 by the voltage of the driving signal, but charged to the third voltage VCOMDC2 by the third voltage line 504. The driving capability required for the driving signal forming circuit 1500 may be reduced, and the size reduction can be achieved.

In the first to third embodiments, the switches, the logic circuits and the flip-flop circuits, which constitute the first driving electrode driver 12 and the second driving electrode driver 12-U, are configured by MOSFETs. In this case, the MOSFETs are formed in the TFT substrate 300 (FIGS. 3 and 4). In particular, the MOSFET constituting the first driving electrode driver 12 is formed in a portion covered by the driver semiconductor device DDIC. In addition, the MOSFET constituting the second driving electrode driver 12-U is formed in a region between the short side 501-U of the region 501 of the liquid crystal panel 2 (FIG. 5) and the short side of the module. However, the present invention is not limited thereto.

In addition, the vertical COM arrangement in which the common electrodes TL(0) to TL(p) and the signal lines SL(0) to SL(p) are arranged in parallel has been described as an example, but the first to fourth embodiments are not limited thereto. The present invention can also be applied to the horizontal COM arrangement in which the common electrodes TL(0) to TL(p) are arranged so as to intersect with the signal lines SL(0) to SL(p).

In the category of the idea of the present invention, a person with ordinary skill in the art can conceive various modification examples and revised examples, and such modification examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

For example, in the embodiments, the case where the common electrodes TL(0) to TL(p) and the signal lines SL(0) to SL(p) extend in the column direction and are arranged in the row direction has been described, but the row direction and the column direction are changed according to the point of view. A case where the point of view is changed and the common electrodes TL(0) to TL(p) and the signal lines SL(0) to SL(p) extend in the row direction and are arranged in the column direction also falls within the scope of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detection device comprising:
   a plurality of driving electrodes extending in a first direction and arranged in a second direction, the plurality of driving electrodes are supplied with driving signals for detecting an external proximity object;
   a first voltage line configured to supply a first voltage;
   a second voltage line configured to supply a second voltage different from the first voltage; and
   a third voltage line being a voltage line different from the first voltage line and the second voltage line and configured to supply a third voltage,
   wherein a selected driving electrode among the plurality of driving electrodes is electrically connected to one of the first voltage line and the second voltage line, and the selected driving electrode is supplied with the driving signal, and
   unselected driving electrodes among the plurality of driving electrodes are electrically connected to the third voltage line, and wherein a line width of the third voltage line is narrower than a line width of the second voltage line.

2. The touch detection device according to claim 1, further comprising:
a plurality of detection electrodes extending in the second direction and crossing the plurality of driving electrodes to detect the external proximity object on the basis of capacitance change between the plurality of driving electrodes and the plurality of detection electrodes.

3. The touch detection device according to claim 1, wherein the second voltage and the third voltage are direct-current voltage.

4. The touch detection device according to claim 3, further comprising: a low-pass filter,
wherein the second voltage line, the third voltage line, and the low-pass filter are electrically connected to one another in an outside of an array including the plurality of driving electrodes.

5. The touch detection device according to claim 1, further comprising: a first driving circuit connected to the plurality of driving electrodes,
wherein the first driving circuit electrically connects the unselected driving electrodes to the third voltage line in a period of detecting the external proximity object, and alternately electrically connects the selected driving electrode to the first voltage line and the second voltage line in the period of detecting the external proximity object.

6. The touch detection device according to claim 5, wherein the first driving circuit sequentially shifts the selected driving electrode among the plurality of driving electrodes in the second direction.

7. The touch detection device according to claim 5, wherein the first driving circuit includes a plurality of determination circuits respectively corresponding to the plurality of driving electrodes, and
the plurality of determination circuits determine whether or not a corresponding driving electrode is a selected driving electrode, based on received selection signals in the period of detecting the external proximity object.

8. The touch detection device according to claim 7, wherein the plurality of driving electrodes are arranged in a column of an array, and
the first driving circuit is arranged along one side of the touch detection device in the second direction.

9. The touch detection device according to claim 8, further comprising:
a second driving circuit arranged along the other side of the touch detection device in the second direction,
wherein the second driving circuit receives a selection signal, the selection signal alternately electrically connects a driving electrode to the first voltage line and the second voltage line, and connects unselected driving electrodes to the third voltage line.

10. The touch detection device according to claim 7, further comprising:
an amplification unit configured to amplify a change in voltages of the driving electrodes.

11. The touch detection device according to claim 3, wherein the second voltage and the third voltage have the same voltage value.

12. A liquid crystal display device comprising:
a plurality of common electrodes extending in a first direction and arranged in a second direction, the plurality of common electrodes are supplied with driving signals for detecting an external proximity object;
a first voltage line configured to supply a first voltage;
a second voltage line configured to supply a second voltage different from the first voltage; and
a third voltage line being a voltage line different from the first voltage line and the second voltage line and configured to supply a third voltage,
wherein a selected common electrode among the plurality of common electrodes is electrically connected to one of the first voltage line and the second voltage line, and the selected common electrode is supplied with the driving signal, and
unselected common electrodes among the plurality of common electrodes are electrically connected to the third voltage line, and
wherein a line width of the third voltage line is narrower than a line width of the second voltage line.

13. The liquid crystal display device according to claim 12, further comprising:
a plurality of detection electrodes extending in the second direction and crossing the plurality of common electrodes to detect the external proximity object on the basis of capacitance change between the plurality of common electrodes and the plurality of detection electrodes.

14. The liquid crystal display device according to claim 13, further comprising: a first driving circuit connected to the plurality of common electrodes,
wherein the first driving circuit electrically connects the unselected driving electrodes to the third voltage line in a period of detecting the external proximity object, and alternately electrically connects the selected driving electrode to the first voltage line and the second voltage line in the period of detecting the external proximity object.

15. The liquid crystal display device according to claim 14, further comprising:
a second driving circuit arranged along the other side of the touch detection device in the second direction,
wherein the second driving circuit receives a selection signal, the selection signal alternately electrically connects the selected common electrode to the first voltage line and the second voltage line, and connects unselected driving electrodes to the third voltage line.

* * * * *